United States Patent
Bai et al.

(10) Patent No.: US 12,224,964 B2
(45) Date of Patent: Feb. 11, 2025

(54) DYNAMIC DECODING TIMELINE SYSTEMS AND METHODS

(71) Applicant: QUALCOMM Incorporated, San Diego, CA (US)

(72) Inventors: Tianyang Bai, Somerville, NJ (US); Hua Wang, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 17/652,666

(22) Filed: Feb. 25, 2022

(65) Prior Publication Data
US 2023/0275734 A1 Aug. 31, 2023

(51) Int. Cl.
| | |
|---|---|
| *H04L 5/00* | (2006.01) |
| *H04L 1/16* | (2023.01) |
| *H04L 1/1607* | (2023.01) |
| *H04W 72/23* | (2023.01) |

(52) U.S. Cl.
CPC .......... *H04L 5/0055* (2013.01); *H04L 1/1607* (2013.01); *H04L 5/0048* (2013.01); *H04W 72/23* (2023.01)

(58) Field of Classification Search
CPC .............................. H04L 5/0055; H04W 72/23
See application file for complete search history.

(56) References Cited

U.S. PATENT DOCUMENTS

| | | | | |
|---|---|---|---|---|
| 2009/0209256 A1* | 8/2009 | Nakashima | ....... | H04W 36/0088 |
| 2018/0323938 A1* | 11/2018 | Takeda | ..................... | H04J 11/00 |
| 2019/0007963 A1* | 1/2019 | Akkarakaran | ........ | H04W 72/20 |
| 2020/0119856 A1* | 4/2020 | Zhou | ..................... | H04L 1/1621 |
| 2020/0145138 A1* | 5/2020 | Bhattad | ................. | H04L 1/1614 |
| 2021/0266943 A1* | 8/2021 | Khoshnevisan | .... | H04W 72/535 |
| 2021/0376967 A1* | 12/2021 | Ahn | ..................... | H04W 72/21 |
| 2021/0400709 A1* | 12/2021 | Namjoshi | ............. | H04W 72/23 |
| 2022/0007403 A1* | 1/2022 | Li | ......................... | H04W 72/20 |
| 2023/0091988 A1* | 3/2023 | Li | ......................... | H04L 1/1861 |

* cited by examiner

*Primary Examiner* — Ronald B Abelson
(74) *Attorney, Agent, or Firm* — Procopio, Cory, Hargreaves & Savitch LLP

(57) ABSTRACT

A UE receives, from a network entity, control information scheduling a downlink transmission and indicating a first feedback resource for a first decoding scheme of the UE and a second feedback resource for a second decoding scheme of the UE. The UE may receive a downlink transmission from the network entity. The UE may decode the downlink transmission using at least one of the first decoding scheme or the second decoding scheme. The UE may transmit, to the network entity, a first ACK/NACK response based on the decoded downlink transmission. The UE may transmit the first ACK/NACK response using the first feedback resource if decoding the downlink transmission using the first decoding scheme. The UE may transmit the first ACK/NACK response using the second feedback resource if decoding the downlink transmission using the second decoding scheme.

28 Claims, 27 Drawing Sheets

DYNAMIC DECODING TIMELINE SYSTEMS AND METHODS

TECHNICAL FIELD

The present disclosure relates generally to communication systems, and more particularly, to a decoding system that uses acknowledgement/negative acknowledgement (ACK/NACK) feedback resources.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A network entity that sends a transmission to a device may schedule a feedback resource (e.g., a time period, a frequency) that may be used by a receiving device to transmit an acknowledgement (ACK) that the transmission was decoded successfully or a negative acknowledgment (NACK) that the transmission was not decoded successfully. Such a receiving device may use one of a plurality of decoders to decode the received transmission. Different decoders may require different amounts of time to complete decoding the transmission. If the receiving device uses a decoder that uses a smaller amount of time to decode the transmission, the device may waste time being idle until the device uses the feedback resource to transmit an ACK/NACK response. If the receiving device uses a decoder that uses a larger amount of time to decode the transmission, the opportunity to use the feedback resource to transmit an ACK/NACK response may pass before the device is able to transmit the ACK/NACK response.

In an aspect of the disclosure, a method, a computer-readable medium, and an apparatus for wireless communication at a user equipment (UE) are provided. The apparatus may have a memory and at least one processor coupled to the memory and configured to receive, from a network entity, control information scheduling a downlink transmission and indicating a first feedback resource for a first decoding scheme of the UE and a second feedback resource for a second decoding scheme of the UE. The at least one processor and the memory may also be configured to receive, from the network entity, a downlink transmission. The at least one processor and the memory may also be configured to decode the downlink transmission using at least one of the first decoding scheme or the second decoding scheme. The at least one processor and the memory may also be configured to transmit, to the network entity, a first ACK/NACK response based on the decoded downlink transmission using the first feedback resource if decoding the downlink transmission using the first decoding scheme or using the second feedback resource if decoding the downlink transmission using the second decoding scheme.

In another aspect of the disclosure, a method, a computer-readable medium, and an apparatus for wireless communication at a network entity are provided. The apparatus may have a memory and at least one processor coupled to the memory and configured to receive timing information for a UE indicating a first minimum K1 value associated with a first decoding scheme and a second minimum K1 value associated with a second decoding scheme. The at least one processor and the memory may be further configured to transmit control information for a downlink transmission of the UE indicating a first feedback resource based on the first minimum K1 value and a second feedback resource based on the second minimum K1 value. The at least one processor and the memory may be further configured to transmit the downlink transmission of the UE. The at least one processor and the memory may be further configured to receive an ACK/NACK response for the downlink transmission using the first feedback resource or the second feedback resource.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
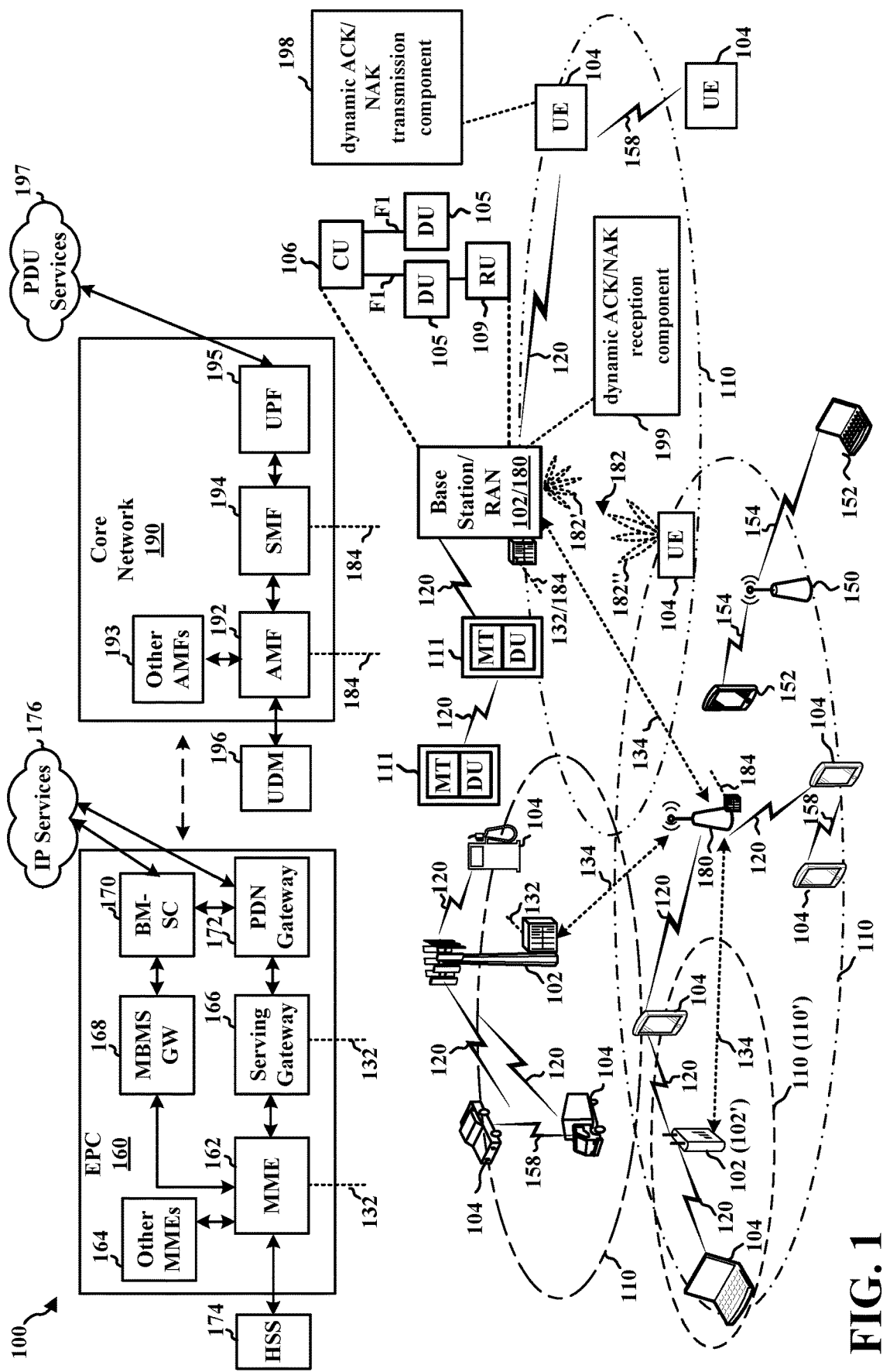
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media.

Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station 102 may include and/or be referred to as a gNB, Node B, eNB, an access point, a base transceiver station, a radio base station, a radio transceiver, a transceiver function, BSS, an ESS, a TRP, network node, network entity, network equipment, or some other suitable terminology. The base station 102 can be implemented as an IAB node, a relay node, a sidelink node, an aggregated (monolithic) base station with a baseband unit (BBU) (including a CU and a DU) and an RU, or as a disaggregated base station including one or more of a CU, a DU, and/or an RU.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to dynamically transmit an ACK/NACK response using one of a plurality of feedback resources via a dynamic ACK/NACK transmission component 198. In certain aspects, the base station 180 may be configured to dynamically receive an ACK/NACK response using one of a plurality of feedback resources via a dynamic ACK/NACK reception component 199. Although the following description may be focused on 5G NR, the concepts described herein may be applicable to other similar areas, such as LTE, LTE-A, CDMA, GSM, and other wireless technologies.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), eNB, NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
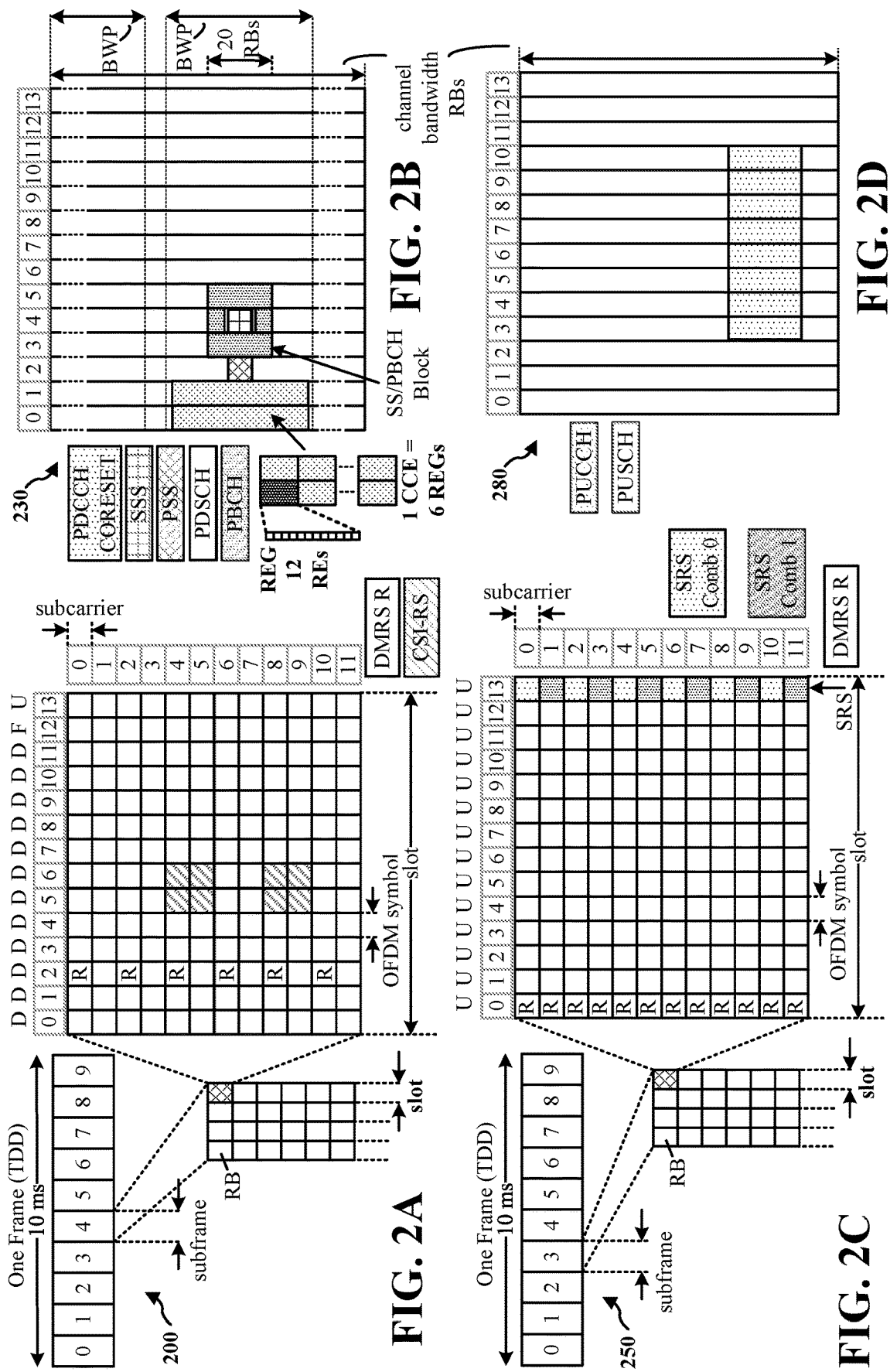
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
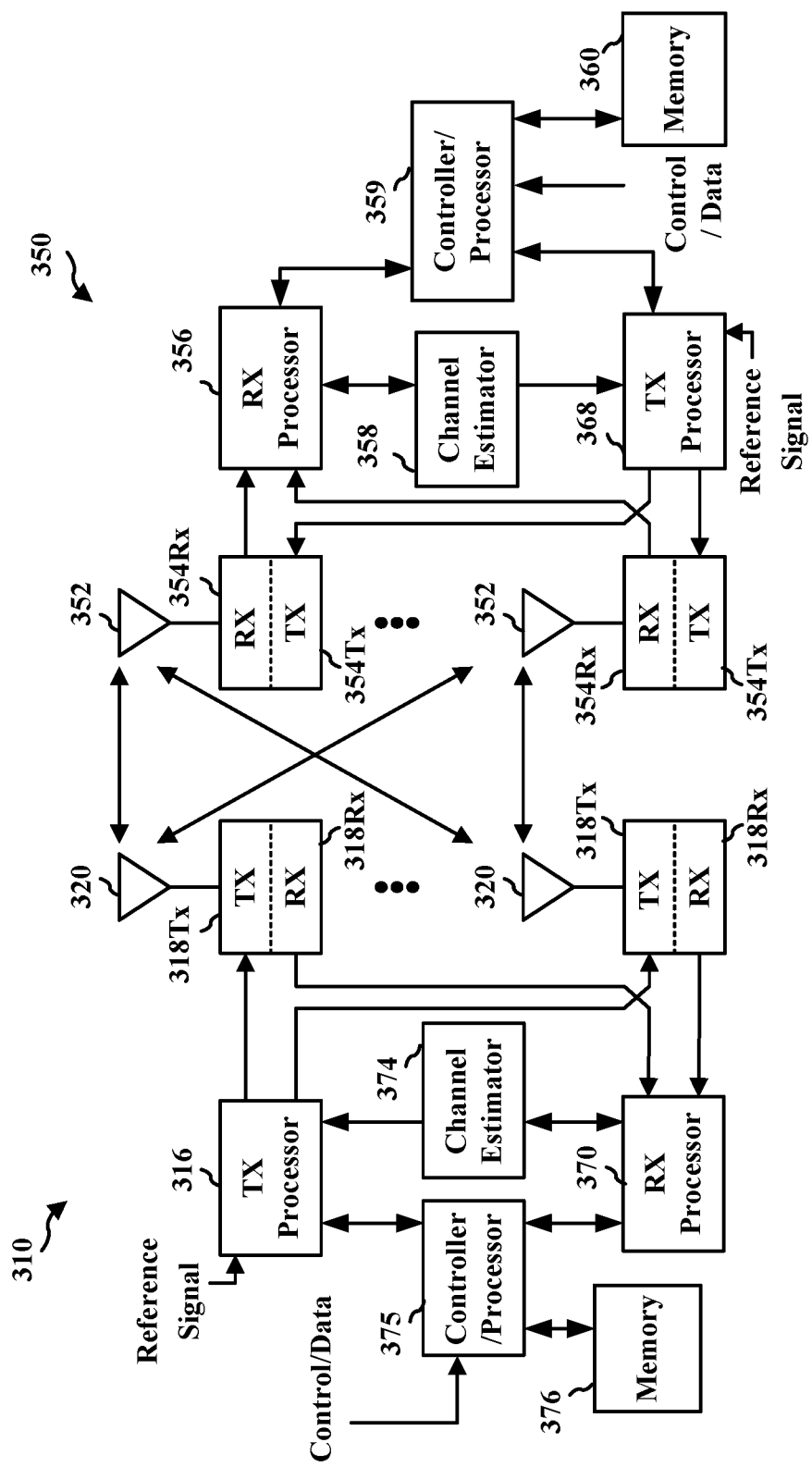
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes an RRC layer, and layer 2 includes an SDAP layer, a PDCP layer, an RLC layer, and a MAC layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a PHY layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (iFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal may include a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the Tx processor 368, the Rx processor 356, and the controller/processor 359 may be configured to perform aspects in connection with dynamic ACK/NACK transmission component 198 of FIG. 1.

At least one of the Tx processor 316, the Rx processor 370, and the controller/processor 375 may be configured to perform aspects in connection with dynamic ACK/NACK reception component 199 of FIG. 1.

Figure 4:
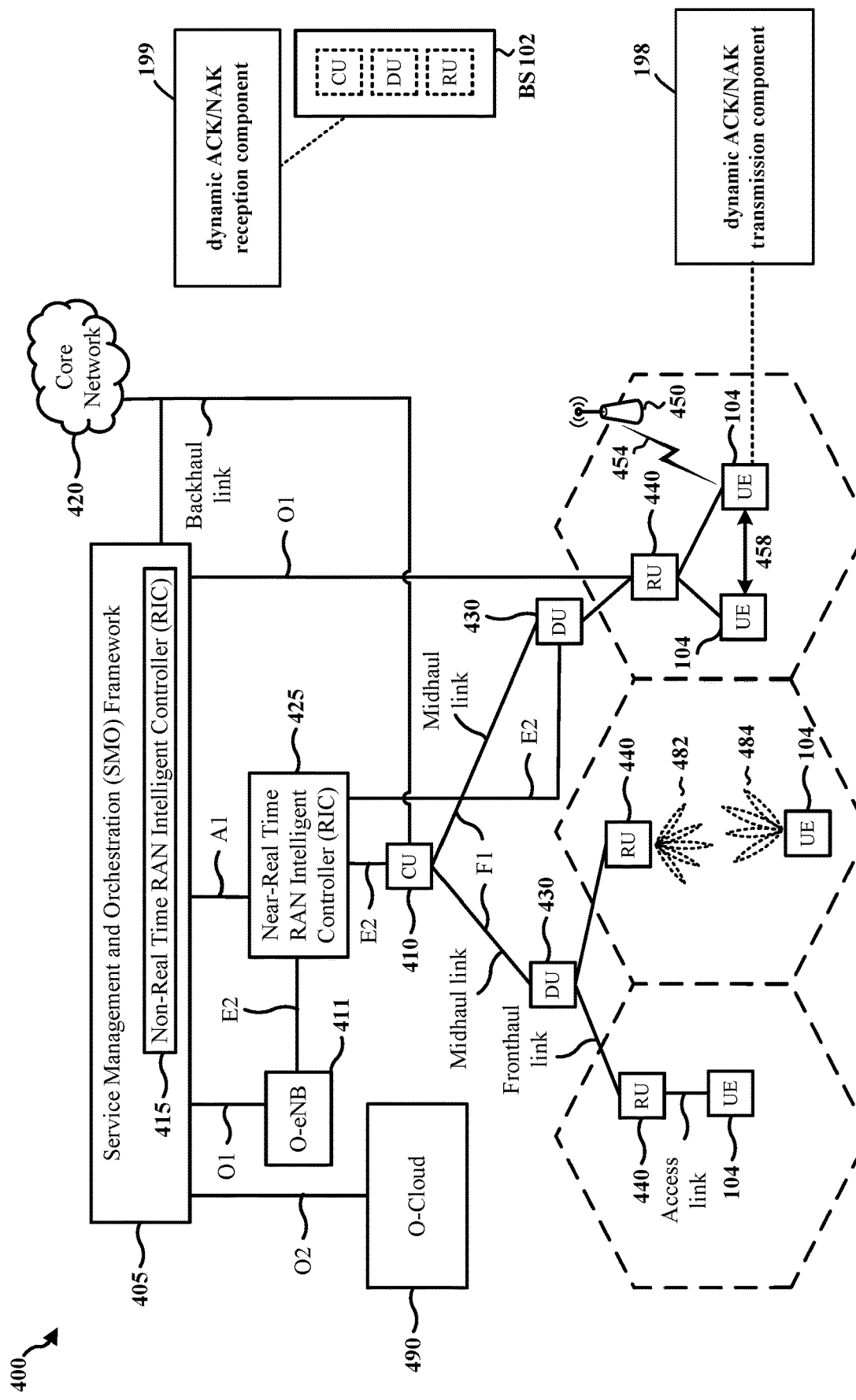
FIG. 4 is a diagram illustrating another example of a disaggregated base station and UE in an access network.

FIG. 4 is a diagram 400 illustrating another example of a wireless communications system and an access network. The illustrated wireless communications system includes a disaggregated base station architecture. The disaggregated base station architecture may include one or more CUs 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more DUs 430 via respective midhaul links, such as an F1 interface. The DUs 430 may communicate with one or more RUs 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUs 410, the DUs 430, the RUs 440, as well as the Near-RT RICs 425, the Non-RT RICs 415, and the SMO Framework 405, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 410 may host one or more higher layer control functions. Such control functions can include RRC, PDCP, SDAP, or the like. Each control function can be implemented with an interface configured to communicate signals with other control functions hosted by the CU 410.

The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as an E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of an RLC layer, a MAC layer, and one or more high PHY layers (such as modules for FEC encoding and decoding, scrambling, modulation, demodulation, or the like) depending, at least in part, on a functional split, such as those defined by 3GPP. In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing FFT, inverse iFFT, digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements that may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

At least one of the CU 410, the DU 430, and the RU 440 may be referred to as a base station 102. Accordingly, a base station 102 may include one or more of the CU 410, the DU 430, and the RU 440 (each component indicated with dotted lines to signify that each component may or may not be included in the base station 102), or combination thereof. The base station 102 provides an access point to the core network 420 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include HeNBs, which may provide service to a restricted group known as a CSG. The communication links between the RUs 440 and the UEs 104 may include uplink (UL) (also referred to as reverse link) transmissions from a UE 104 to an RU 440 and/or downlink (DL) (also referred to as forward link) transmissions from an RU 440 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a PCell and a secondary component carrier may be referred to as an SCell.

Certain UEs 104 may communicate with each other using D2D communication link 458. The D2D communication link 458 may use the DL/UL WWAN spectrum. The D2D communication link 458 may use one or more sidelink channels, such as a PSBCH, a PSDCH, a PSSCH, and a PSCCH. D2D communication may be through a variety of wireless D2D communications systems, such as for example, Bluetooth, Wi-Fi based on the IEEE 802.11 standard, LTE, or NR.

The wireless communications system may further include a Wi-Fi AP 450 in communication with UEs 104 (i.e., STAs) via communication link 454, e.g., in a 5 GHz unlicensed frequency spectrum or the like. When communicating in an unlicensed frequency spectrum, the UEs 104/AP 450 may perform a CCA prior to communicating in order to determine whether the channel is available.

The base station 102 and the UE 104 may each include a plurality of antennas, such as antenna elements, antenna panels, and/or antenna arrays to facilitate beamforming. The base station 102 may transmit a beamformed signal 482 to the UE 104 in one or more transmit directions. The UE 104 may receive the beamformed signal from the base station 102 in one or more receive directions. The UE 104 may also transmit a beamformed signal 484 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

A feedback resource for an ACK/NACK response may be scheduled based on a decoding time of a PDSCH. A decoding time of a PDSCH may depend on the type of UE decoding implementation (i.e., a decoding scheme that a UE uses to decode the PDSCH). For example, a UE may use a linear minimum mean square error (MMSE) decoding scheme to decode a downlink transmission. A MMSE decoding scheme may use less time or computation resources than other decoding schemes, but may result in a higher decoding failure rate. In another aspect, a UE may use a non-linear (NL) decoding scheme, such as a maximum likelihood type with different sizes of candidate modulations. An NL decoding scheme may use more time or computation resources than other decoding schemes, but may result in a lower decoding failure rate in some cases (i.e., may help decode some cases which an MMSE decoding scheme would miss decoding). In another aspect, a UE may use a decoding scheme that compensates for NL impairments due to a power amplifier (PA), which may also increase decoding time. Similar considerations may be made for a UE configured to use a low density parity check (LDPC) decoding step performed after a demodulation step when decoding a downlink transmission. For example, use of a first LDPC decoding scheme may use less time or computation resources than use of a second LDPC decoding scheme.

A UE may be configured to dynamically select an optimal decoder or decoding scheme to use for each PDSCH decoding occasion. For example, a UE may be configured to balance the trade-off between a decoding cost (e.g., time and/or power) and a decoding performance. In one aspect, a UE may select a decoding scheme that has a decoding performance metric that meets or exceeds a threshold performance value (e.g. likelihood of decoding success), which has a lowest decoding cost value (e.g., time, power, a weighted sum of both time and power). A UE may select an optimal decoder based on a real-time status, such as channel realizations (delay and/or Doppler profile), battery status of the UE, and/or a modulation and coding scheme (MCS). In other words, a UE may dynamically select a decoder based on one or more current environmental condition metrics.

Any suitable environmental condition metrics may be used to trigger a selection of one decoder over another, such as a UE battery status, a type of encoder used by the network entity, or a determined channel delay. In one aspect, a UE may be configured to select a decoding scheme that has a lowest decoding power value in response to a battery status meeting or falling below a threshold power value. In one aspect, a UE may be configured to select a decoding scheme that has a lowest decoding time value in response to a channel delay meeting or exceeding a threshold time value. In one aspect, a UE may be configured to predict that an NL demodulation scheme provides less gain over an MMSE demodulation scheme based on one or more current condition metrics, and select the MMSE demodulation scheme in response to the prediction. In one aspect, a UE may be configured to predict that an NL demodulation scheme leads to successful decoding (or meets or exceeds a threshold likelihood value) while an MMSE demodulation scheme does not (or meets or is below a threshold likelihood value), and select the NL demodulation scheme in response to the prediction, even at the cost of a longer time cost and a higher power cost.

A network entity (e.g., a base station, a component of a base station, such as a CU, DU, or RU, or a combination of base station components) may or may not have access to all the information that a UE may use to make such a decision (e.g., decoder implementation, battery, channel realizations). A machine learning classification algorithm may be trained and implemented at a UE to make an optimal decision when only partial information is known by the UE. For example, a network node (NN) algorithm may be implemented by the UE to use a power delay profile (PDP) and a Doppler profile of a communication channel as an input to select a decoding scheme from various decoding scheme candidates for a series of transmissions in response to changes of environmental condition metrics of the communication channel over time.

Figure 5:
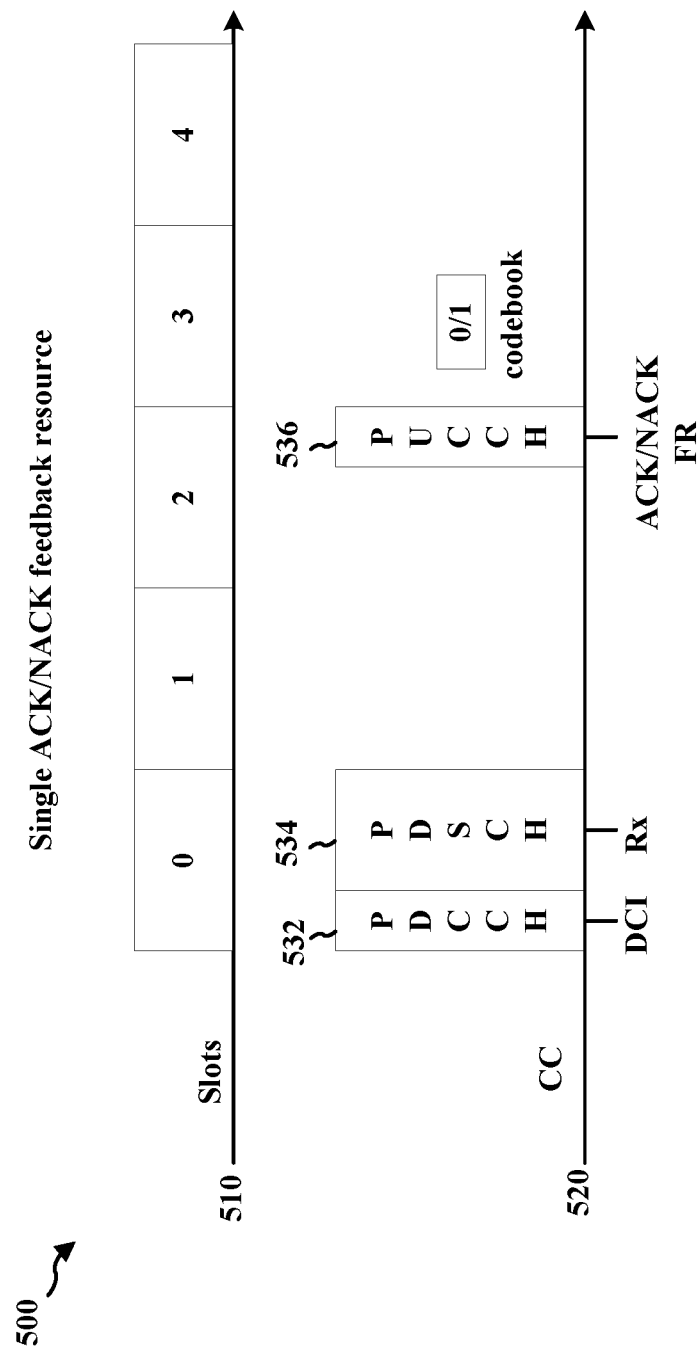
FIG. 5 is a diagram illustrating an example of a transmission feedback scenario for a component carrier of a UE using one ACK/NACK feedback resource.
Figure 7:
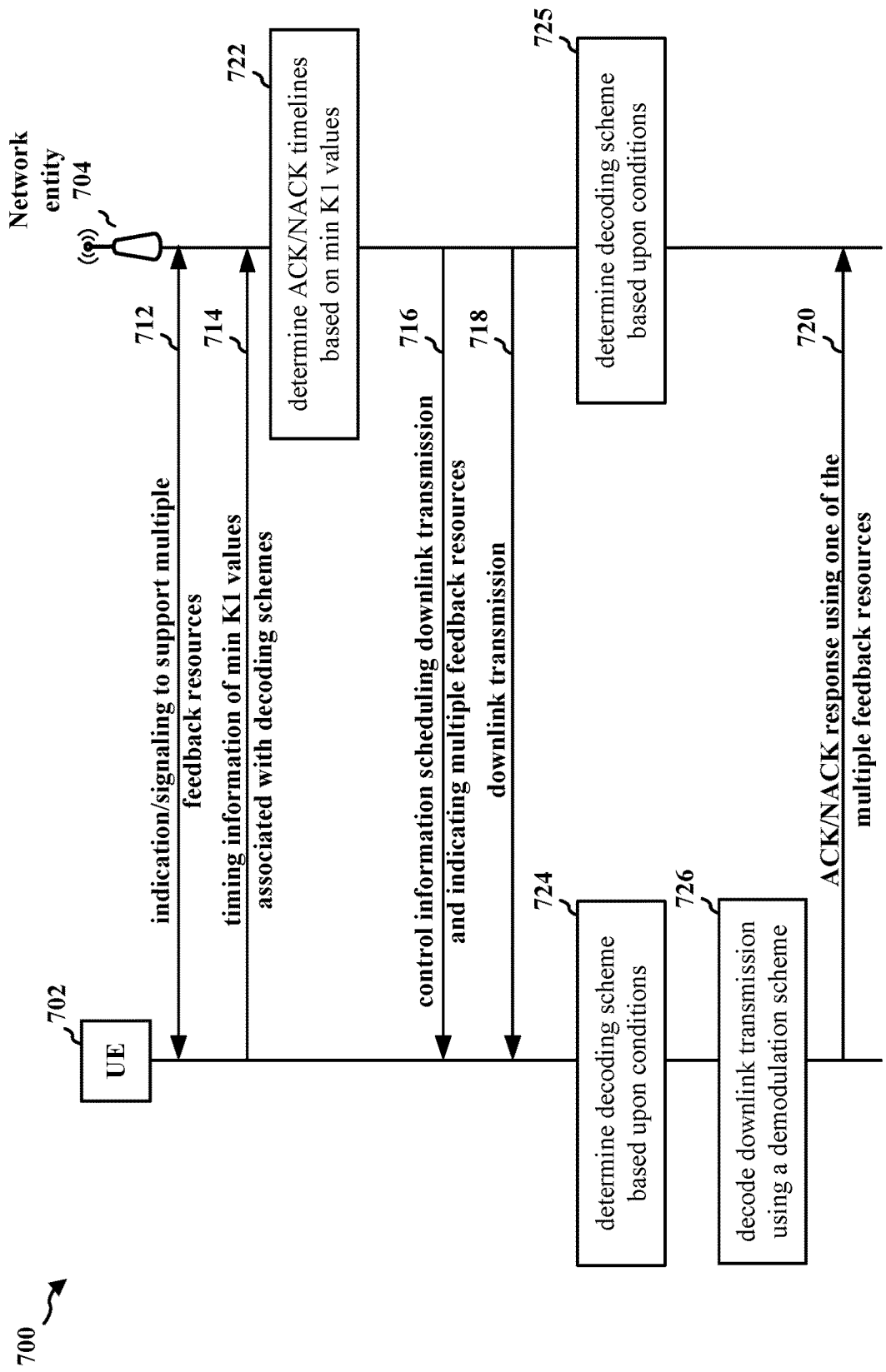
FIG. 7 illustrates a network connection flow diagram showing a UE configured to use a plurality of feedback resources to transmit an ACK/NACK response to a network entity.

FIG. 5 is a diagram 500 illustrating an example of a transmission feedback scenario for a CC 520 of a UE, such as UE 104 in FIGS. 1 and 4 or UE 702 in FIG. 7, having a single ACK/NACK feedback resource at PUCCH 536. The slots 510 show slot timing for the transmission feedback scenario from slot 0 to slot 4. At slot 0, the CC 520 may receive a PDCCH 532 which may carry DCI that schedules a downlink transmission, such as PDSCH 534, in the same slot. The PDCCH 532 may use one symbol in the beginning of slot 0 while the PDSCH 534 may be scheduled using multiple symbols of slot 0, such as symbols 1-5 of slot 0. While PDSCH 534 is shown here as scheduled for slot 0, in other aspects a PDSCH may be scheduled in a different slot as the PDCCH (e.g. PDCCH in the first symbol of slot 0 and PDSCH in the first eight symbols of slot 2). The DCI of the PDCCH 532 may also indicate a feedback resource that the UE may use to transmit an ACK/NACK response—an ACK if the UE successfully decodes the downlink transmission, and a NACK if the UE fails to decode the downlink transmission. Here, the DCI of the PDCCH 532 may schedule a downlink transmission illustrated as PDSCH 534, and may indicate a feedback resource illustrated as PUCCH 536 scheduled at slot 2 (e.g., the last one or two symbols of slot 2). After the UE decodes the downlink transmission of PDSCH 534, the UE may transmit an ACK/NACK response based on the decoded downlink transmission using the feedback resource of PUCCH 536. For example, the UE may transmit an ACK using a 1 and a NACK using a 0 during slot 2 via PUCCH 536.

The time offset between the PDSCH 534 and its ACK/NACK feedback resource of PUCCH 536 resource may be dynamically selected and indicated in the scheduling DCI of the PDCCH 532. A DCI field or sub-field (e.g., "PDSCH-to-HARQ_feedback timing indicator") may be used to down-select a slot offset value from a preconfigured list. Such a list may have a value from 1 to 8 for DCI format 1_0. Such a list may be RRC configured, for example using PUCCH-Config.dl-DataToUL-ACK for DCI format 1_1. An RRC list having 8 values may contain values {1,2,3,4,5,6, 7,8}. For a PDSCH assignment, the scheduling DCI of PDCCH 532 may down-select a value from the list, such that a PUCCH in slot N may be used to transmit an ACK/NACK response for the PDSCH 534 in slot {N−1, N−2, N−3, N−4, N−5, N−6, N−7, N−8}. Here, the DCI of the PDCCH 532 may select a slot that indicates a feedback resource having a 2-slot offset from the PDSCH 534, scheduling slot 2 for the PUCCH 536 which may be used to transmit an ACK/NACK response based on decoding the PDSCH 534.

Different PDSCH decoding schemes may require different decoding times. The potential decoding times for each decoding scheme may be used to determine when a feedback resource, such as PUCCH 536, may be scheduled for the UE to transmit an ACK/NACK response. A network entity, such as a BS 102 or 180 in FIG. 1 or 4, or a network entity 704 in FIG. 7, may be configured to schedule an earlier feedback resource for a decoding scheme that has a shorter decoding time and may be configured to schedule a later feedback resource for a decoding scheme that has a longer decoding time. A network entity may not know a UE's selected decoding scheme when the network entity makes PDSCH scheduling, but may be configured to allocate at least one feedback resource in the PDSCH scheduling DCI for the UE to transmit an ACK/NACK response. For example, the UE's decision of what decoding scheme to use may be dependent upon real-time information (e.g., DL channel, battery power) that the network entity does not know. A network entity may be configured to schedule a feedback resource for an ACK/NACK response of a downlink transmission based on the longest possible decoding time (i.e., worst case scenario). For example, the network entity may have access to the decoding time, or minimum K1 value, for each decoding scheme that a UE may use (i.e., a set of minimum K1 values). The network entity may be configured to schedule the feedback resource to be at least as long as the greatest minimum K1 value of the set of minimum K1 values. Such a configuration may result in longer delays, as decoding schemes having long decoding times (e.g., an NL decoder) may be rarely used. In another aspect, the network entity may be configured to schedule a feedback resource for an ACK/NACK response of a downlink transmission based on the shortest possible decoding time (i.e., the shortest timeline). For example, if the network entity has access to the decoding time, or minimum K1 value, for each decoding scheme that a UE may, the network entity may be configured to schedule the feedback resource to be at least as long as the smallest minimum K1 value of the set of minimum K1 values. Such a configuration may prevent a UE from using an advanced decoding scheme having a longer decoding time, which may result in more re-transmissions (Re-Tx) due to avoidable decoding failures. Such an increase in Re-Tx transmissions may increase transmission delays, overhead, and/or power consumption in the system. Minimum K1 values may be obtained by either the UE or the network entity via a table, or may be generated by repeatedly decoding downlink transmissions using various decoding schemes.

Figure 6:
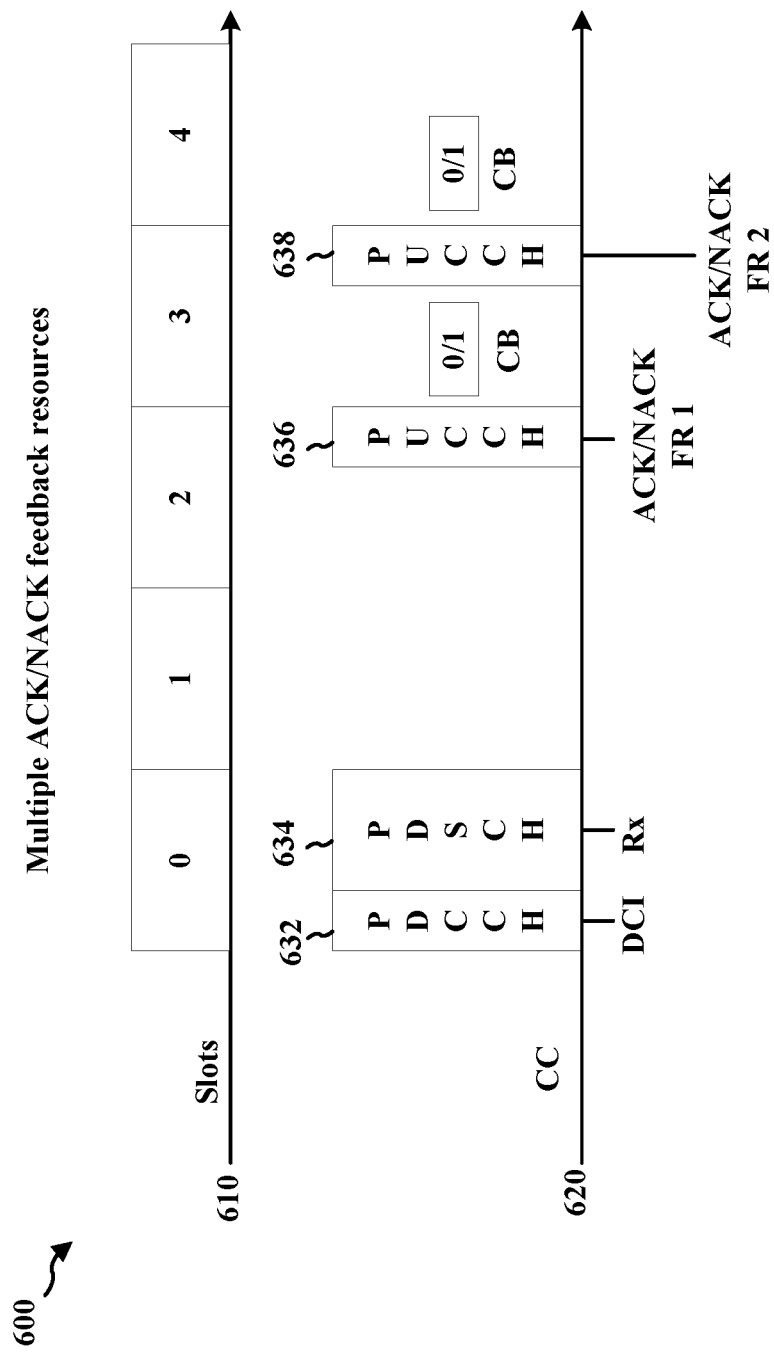
FIG. 6 is a diagram illustrating another example of a transmission feedback scenario for a component carrier of a UE using a plurality of ACK/NACK feedback resources.

FIG. 6 is a diagram 600 illustrating an alternative example of a transmission feedback scenario for a CC 620 of a UE, such as UE 104 in FIGS. 1 and 4 or UE 702 in FIG. 7, having multiple ACK/NACK feedback resources at PUCCH 636 and PUCCH 638. The slots 610 show slot timing for the transmission feedback scenario from slot 0 to slot 4. At slot 0, the CC 620 may receive a PDCCH 632 which may carry DCI that schedules a downlink transmission, such as the PDSCH 634 of the same slot. The DCI of the PDCCH 632 may also indicate a plurality of feedback resources that the UE may use to transmit an ACK/NACK response—an ACK if the UE successfully decodes the downlink transmission, and a NACK if the UE fails to decode the downlink transmission. Here, the DCI of the PDCCH 632 may schedule a downlink transmission illustrated as PDSCH 634 and may indicate a feedback resource 1 illustrated as PUCCH 636 at slot 2 and a feedback resource 2 illustrated as PUCCH 638 at slot 3. After the UE decodes the downlink transmission of PDSCH 634, the UE may transmit an ACK/NACK response based on the decoded downlink transmission using either the feedback resource 1 of PUCCH 636 or the feedback resource 2 of PUCCH 638. For example, the UE may transmit an ACK using a 1 and a NACK using a 0 using either the feedback resource 1 of PUCCH 636 scheduled for slot 2 or the feedback resource 2 of PUCCH 638 scheduled for slot 3.

A network entity, such as the BS 102 or 180 of FIGS. 1 and 4, or the network entity 704 in FIG. 7, may be configured to schedule or allocate multiple feedback resources to a UE, such as the UE 104 of FIG. 1 or FIG. 4. For example, one feedback resource may be allocated for a shorter timeline decoder and another feedback resource may be allocated for a longer timeline. While only two feedback resources, feedback resource 1 of PUCCH 636 and feedback resource 2 of PUCCH 638, are shown in diagram 600, any number of feedback resources may be scheduled for a downlink transmission, such as the downlink transmission of PDSCH 634. Allowing a flexible ACK/NACK response scheme may achieve an optimal trade-off point in terms of decoding time and performance. For example, to reduce delay, a UE may use the earlier possible A/N occasion to feedback if a shorter timeline decoder works out, or when a UE misses the scheduling PDCCH for the occasion. In other words, a UE 104 of FIG. 1 or FIG. 4 may use the PUCCH 636 to transmit an ACK if the UE successfully uses a decoding scheme with a short timeline to decode the downlink transmission of PDSCH 634, or a NACK if the UE does not successfully receive and/or decode the downlink transmission of PDSCH 634. Alternatively, the UE 104 of FIG. 1 or FIG. 4 may use the PUCCH 638 to transmit an ACK of the UE successfully uses a decoding scheme with a long timeline to decode the downlink transmission of PDSCH 634, or a NACK if the UE does not successfully receive and/or decode the downlink transmission of PDSCH 634. To allow for better performance, a longer decoding timeline may not be excluded in case that UE decides that NL will work best. In other words, the network entity may be configured to include a feedback resource corresponding with a longer decoding scheme, such as the PUCCH 638, if the UE selects a decoding scheme with a longer timeline instead of a decoding scheme with a shorter timeline.

Each of the ACK/NACK feedback resources—feedback resource 1 of PUCCH 636 and feedback resource 2 of PUCCH 638—may be associated with a decoding scheme and/or a minimum K1 value. For example, the PUCCH 636 may be scheduled to accommodate the time a UE takes to decode the PDSCH 634 using a first decoding scheme, and the PUCCH 638 may be scheduled to accommodate the time a UE takes to decode the PDSCH 634 using a second decoding scheme.

FIG. 7 illustrates a network connection flow diagram 700 showing a UE 702 configured to use a plurality of feedback resources to transmit an ACK/NACK response to a network entity 704. The UE 702 may be configured to transmit an indication in a transmission 712 that the UE 702 supports receiving a plurality of feedback resources for a downlink transmission. For example, the UE 702 may indicate to the network entity 704, such as a gNB, whether it supports the feature of having multiple potential ACK/NACK response occasions for a PDSCH. Such information may be transmitted, for example, as UE capability information. The network entity 704 may also transmit a signal in a transmission 712 that enables a configuration of the plurality of feedback resources for a PDSCH. Such signals may be transmitted, for example, as a portion of an RRC or a MAC-CE. For example, the network entity 704 may transmit an RRC in a transmission 712 to the UE 702 that includes a set of K1 values (e.g., in a list) where each element of the list may correspond to one or multiple K1 values. Additionally, or alternatively, the network entity 704 may transmit a MAC-CE in a transmission 712 to the UE 702 that enables or disables the feature of having multiple feedback resources for a downlink transmission. While the UE 702 and the network entity 704 are shown here as transmitting indication/signaling in a transmission 712 to support multiple feedback resources simultaneously, the UE 702 may transmit an indication before the network entity 704 transmits a signal, and/or vice-versa.

The indications transmitted by the UE 702 in a transmission 712 may include conditional triggers that will trigger use of one decoding scheme or another in response to a detected environmental condition. For example, a satisfied conditional trigger of an MCS value or a rank value meeting or falling below a threshold value may trigger use of an MMSE decoding scheme, or a satisfied conditional trigger of an MCS value or a rank value meeting or exceeding a threshold value may trigger use of an NL decoding scheme.

The network entity 704 may be configured to enable multiple feedback resources if it receives an indication from the UE 702 that the network entity 704 supports multiple feedback resources (e.g., UE capability information that indicates such support). Additionally, or alternatively, the UE 702 may be configured to enable multiple feedback resources if it receives a signal from the network entity 704 that the UE 702 supports multiple feedback resources (e.g., an RRC having a list or a set of K1 values). Additionally, or alternatively, the UE 702 and the network entity 704 may be preconfigured to enable multiple feedback resources, or may be configured to enable multiple feedback resources upon detecting a conditional trigger.

The UE 702 may be configured to transmit timing information in a transmission 714 of min K1 values associated with decoding schemes to the network entity 704. For example, the UE 702 may indicate to the network entity 704, such as a base station or a component of a base station, its capability of minimum K1 values for different decoder implementations. The minimum K1 values may be presented as time offsets between PDSCH and an ACK/NACK response. In one aspect, where the UE 702 reports two K1 values, the UE may report a first K1 value for an MMSE based demodulation scheme and a second K1 value for a NL based demodulation scheme. The network entity 704 may be configured to interpret receipt of a single K1 value from the UE 702 as an indication that the UE 702 does not support dynamic selection of a decoding scheme. The UE 702 may be configured to update and report such capability dynamically. The UE 702 may use conditional triggers to enable or disable decoding schemes to use for decoding a downlink transmission from the network entity 704. For example, the UE 702 may determine that a battery level of the UE 702 has met or exceeded a threshold value, and in response may transmit timing information of a plurality of min K1 values in a transmission 714. Alternatively, or additionally, the UE 702 may determine that a battery level of the UE 702 has met or fallen below a threshold value, and in response may transmit timing information of less min K1 values (e.g., disabling an NL based demodulation scheme), or just one K1 value, in a transmission 714. The UE 702 may additionally or alternatively use such conditional triggers to trigger a transmission 712 to update the indication to the network entity 704 of whether the UE 702 supports multiple feedback resources.

The UE 702 may be configured to indicate to the network entity 704, such as a base station or a component of a base station, any conditions a specific K1 value will or will not apply to. For example, the UE 702 may be configured to never use an NL demodulation scheme or decoding scheme or a larger timeline corresponding with the NL decoding scheme with an MCS value or rank value that meets or falls below a threshold value. The UE 702 may transmit an indication of such a conditional trigger to the network entity 704, allowing the network entity 704 to determine that the UE 702 will not use the NL demodulation scheme (or decoding scheme or larger timeline corresponding with the NL decoding scheme) when the network entity 704 transmits a downlink transmission having an MCS value or rank value that meets or falls below a threshold value. In another aspect, the UE 702 may be configured to only use an NL demodulation scheme or decoding scheme or larger timeline corresponding with the NL decoding scheme with an MCS value or rank value that meets or exceeds a threshold value. The UE 702 may transmit an indication of such a conditional trigger to the network entity 704, allowing the network entity 704 to determine that the UE 702 will use the NL demodulation scheme (or decoding scheme or larger timeline corresponding with the NL decoding scheme) when the network entity 704 transmits a downlink transmission having an MCS value or rank value that meets or exceeds a threshold value. The network entity 704 may then use such conditional triggers to predict what types of feedback resources to schedule (e.g., do not schedule feedback resources for a decoding scheme that the UE 702 will conditionally not use, or schedule feedback resources for a decoding scheme that the UE 702 will conditionally use).

At 722, the network entity 704 may be configured to determine ACK/NACK timelines or feedback resources based on the min K1 values received from the UE 702. For example, the network entity 704 may be configured to allocate or schedule a feedback resource for each min K1 value, where each min K1 value is associated with a decoding scheme. Additionally, or alternatively, the network entity 704 may be configured to allocate or schedule a feedback resource for each min K1 value that is conditionally possible based upon conditions detected by the network entity 704.

The network entity 704 may be configured to transmit, in a transmission 716, control information (e.g., DCI) that schedules a downlink transmission and indicates multiple feedback resources for the UE to use for the downlink transmission. For example, the network entity 704 may be configured to dynamically indicate multiple K1 values as time offsets in a scheduling DCI. The network entity 704 may set a field or sub-field in a DCI that may be used by the UE 702 to down-select one or more elements from an RRC list for each PDSCH (i.e., a selection of a K1 value from a set of K1 values). In one aspect, a field/sub-field in the DCI may select an element from the RRC list that includes multiple K1 values, or the field/sub-field may select multiple K1 values from the RRC list. In response, the UE 702 may be configured to select any of the indicated K1 values for use. In another aspect, the network entity 704 may be configured to schedule a DCI that contains multiple fields or subfields, where each field/sub-field may correspond to a candidate K1 value. The UE 702 may use each field/sub-field to down-select a K1 value from an RRC list, or from different RRC lists. For example, the UE 702 may be configured to use a field1 to select a K1 value from a list1 of a first RRC for a short timeline decoding scheme, and use a field2 to select a K1 value from a list2 of a second RRC, or from the same list1, for a long timeline decoding scheme. The field1 may designate list1 and the field2 may designate list2. In some aspects, the network entity 704 may be configured to use a reserved index for field2 under conditions where the network entity 704 is configured to schedule only one K1 candidate value, or feedback resource.

One or more K1 values may be implicitly or statically indicated to the UE 702. For example, when the multiple feedback resource feature is enabled on the UE 702 and the network entity 704 and certain conditions are met for a scheduled PDSCH, one or more ACK/NACK response feedback resources may be implicitly allowed. A shorter K1 value (or associated decoding scheme) may be indicated in a DCI transmitted, in a transmission, in a transmission 716, as control information and a longer K1 value (or associated decoding scheme) may be determined at 724 by the UE 702 and/or determined at 725 by the network entity 704 based on a UE capability report or as the largest one in one or more RRC lists of K1 values. In other words, one K1 value may be scheduled by a DCI transmitted by the network entity 704, in a transmission 716, while another K1 value may be implicitly scheduled by a conditional trigger. In one aspect, the network entity 704 may not need to transmit, in a transmission 716, feedback resources to the UE 702, as the feedback resources may be implicitly (e.g., via one or more conditional triggers) or statically indicated (e.g., via one or more RRC configurations).

At 726 the UE 702 may decode the downlink transmission 718 using a demodulation scheme, such as an MMSE decoding scheme or an NL decoding scheme. The UE 702 may determine what demodulation scheme to use using any of the means described herein, for example based on detecting that a conditional trigger of an environmental condition has been satisfied, to optimize a decoding cost, and/or to optimize a decoding performance. The UE may be configured to transmit an ACK/NACK response 720 using a feedback resource associated with the demodulation scheme.

Figure 8:
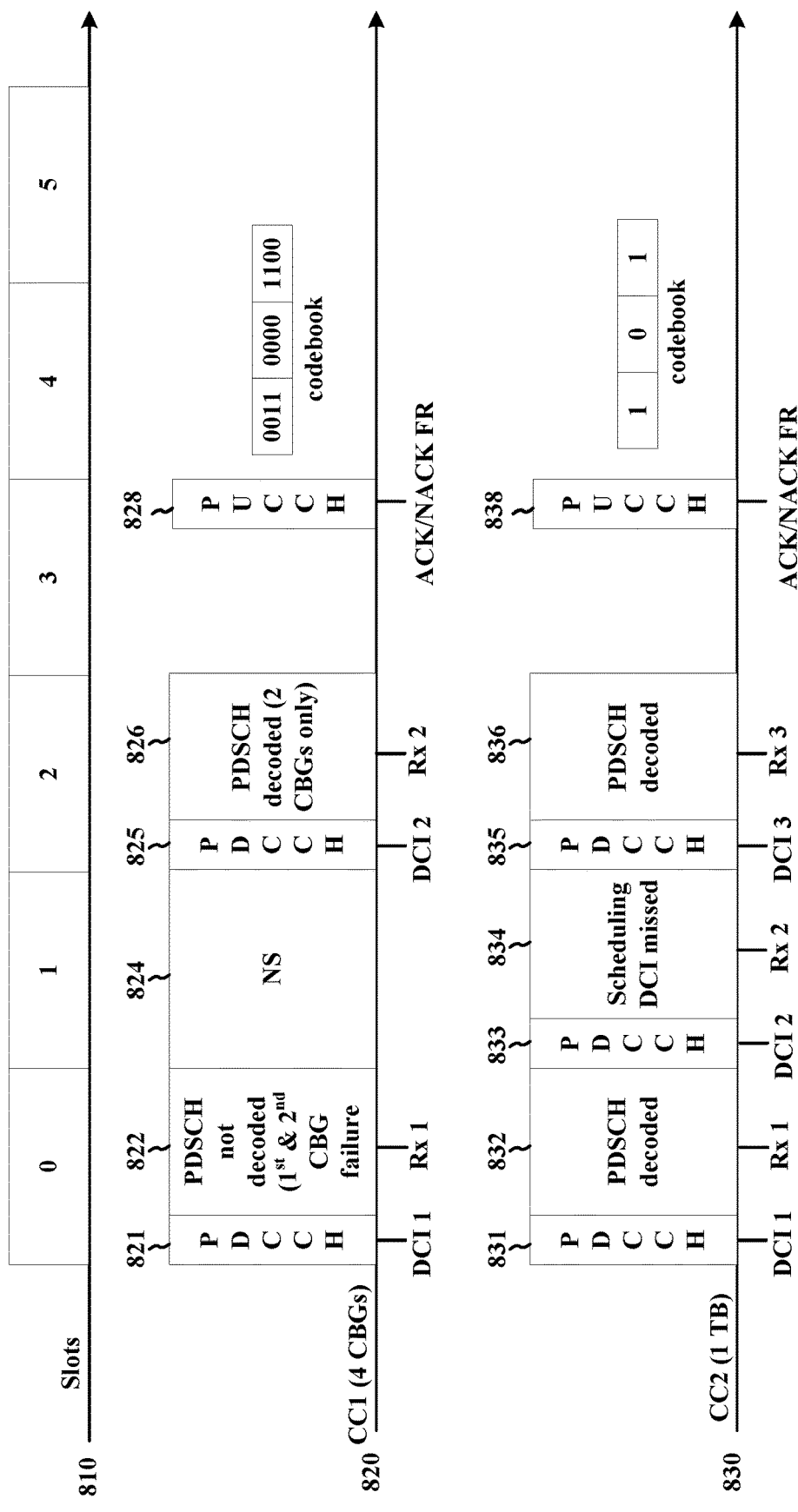
FIG. 8 is a diagram illustrating an example of a transmission feedback scenario for two component carriers (CCs) of a UE configured to use a static codebook (CB) and one ACK/NACK feedback resource.

At least two types of HARQ codebooks (CBs) may be used in 3GPP NR R15—CB type 1 or CB type 2. FIG. 8 shows a diagram 800 illustrating an example of a transmission feedback scenario for CC1 820 and CC2 830 of a UE, such as UE 104 in FIGS. 1 and 4 or UE 702 in FIG. 7, configured to use a CB type 1. CC1 820 has a single ACK/NACK feedback resource at PUCCH 828 and CC2 830 has a single ACK/NACK feedback resource at PUCCH 838. The slots 810 show the slot timing for the transmission feedback scenario in diagram 800 from slot 0 to slot 5. At slot 0, the CC1 may receive a PDCCH 821 which may carry a first DCI (DCI 1) that schedules a downlink transmission (Rx 1) illustrated as PDSCH 822. At slot 1 the network entity, such as BS 102 or 180 in FIG. 1 or 4, or network entity 704 in FIG. 7, may not have scheduled any activity for the UE, providing a not scheduled (NS) 824 slot. At slot 2, the CC1 may receive a PDCCH 825 which may carry a second DCI (DCI 2) that schedules a downlink transmission (Rx 2) illustrated as PDSCH 826. The DCI 1 and the DCI 2 of the PDCCH 821 and PDCCH 825, respectively, may also indicate a feedback resource of PUCCH 828 at slot 3 that the UE may use to transmit ACK/NACK responses for each codebook group (CBG) received by the UE at PDSCH 822 and PDSCH 826.

The UE may be configured to use a type 1, or a static CB, shown to the right of PUCCH 828 of CC1 820. The CB may have a fixed number of ACK/NACK bits (i.e., CB size) regardless of a scheduling decision. For example, the UE may configure CC1 820 as having a maximum of four CBGs per transmission time interval (TTI), such as four bits per TTI—one bit per CBG. If fewer CBGs are scheduled, the UE may be configured to fill in NACKs for the remaining bits. For an ACK/NACK response occasion, the UE may further be configured to report associated slots for potential PDSCH scheduling. The UE may further be configured to report the same number of bits for each PDSCH occasion in the same CC or BWP. For example, for PDSCH 822, where the UE failed to decode the $1^{st}$ and $2^{nd}$ CBG and successfully decoded the $3^{rd}$ and $4^{th}$ CBG, the UE may report 0011 as two NACKs for the $1^{st}$ and $2^{nd}$ failed CBGs and two ACKs for the $3^{rd}$ and $4^{th}$ successful CBGs. For NS 824 where the network entity failed to schedule any PDSCH, the UE may report 0000 as four NACKS for the unscheduled CBGs. For PDSCH 822, where the UE successfully decoded the $1^{st}$ and $2^{nd}$ CBG and the network entity failed to schedule any transmission for the $3^{rd}$ and $4^{th}$ CBG, the UE may report 1100 as two ACKs for the $1^{st}$ and $2^{nd}$ successful CBG and two NACKs for the $3^{rd}$ and $4^{th}$ unscheduled CBGs. Here, after the UE decodes the downlink transmission Rx 1 of PDSCH 822 (failing to decode the first two CBGs and successfully decoding the second two CBGs) and the downlink transmission Rx 2 of PDSCH 826 (successfully decoding the first two CBGs), the UE may transmit an ACK/NACK response for CC1 based on the decoded downlink transmission using the feedback resource of PUCCH 828 with 001100001100, or [0011][0000][1100].

At slot 0, the CC2 may receive a PDCCH 831 which may carry a first DCI (DCI 1) that schedules a downlink transmission (Rx 1) illustrated as PDSCH 832. At slot 1, the CC2 may be transmitted a PDCCH 833 which may carry a second DCI (DCI 2) that schedules a downlink transmission (Rx 2) illustrated as PDSCH 834. At slot 2, the CC2 may receive a PDCCH 835 which may carry a third DCI (DCI 3) that schedules a downlink transmission (Rx 3) illustrated as PDSCH 836. The DCI 1, DCI 2, and DCI 3 of the PDCCH 831, PDCCH 833, and PDCCH 825, respectively, may also indicate a feedback resource that the UE may use to transmit a ACK/NACK responses for each TB received by the UE, such as the ACK/NACK feedback resource of PUCCH 838 at slot 3.

The UE may configure CC2 830 as having one TB per TTI, such as one bit per TTI. For an ACK/NACK response occasion, the UE may further be configured to report associated slots for potential PDSCH scheduling. The UE may further be configured to report the same number of bits for each PDSCH occasion in the same CC or BWP. For example, for PDSCH 832, where the UE succeeded in decoding the TB, the UE may report 1 as an ACK for the successful TB. For PDSCH 834, where the UE failed to receive/decode the PDCCH 833, the UE may report 0 as an NACK for an unscheduled (from the UE's perspective) TB or TTI. For PDSCH 836, where the UE succeeded in decoding the TB, the UE may report 1 as an ACK for the successful TB. Here, after the UE successfully decodes the downlink transmission Rx 1 of PDSCH 832, misses the scheduling DCI 2 of PDCCH 833, and successfully decodes the downlink transmission Rx 3 of PDSCH 836, the UE may transmit an ACK/NACK response for CC2 based on the decoded downlink transmission using the feedback resource of PUCCH 838 with 101, or [1][0][1].

Figure 9:
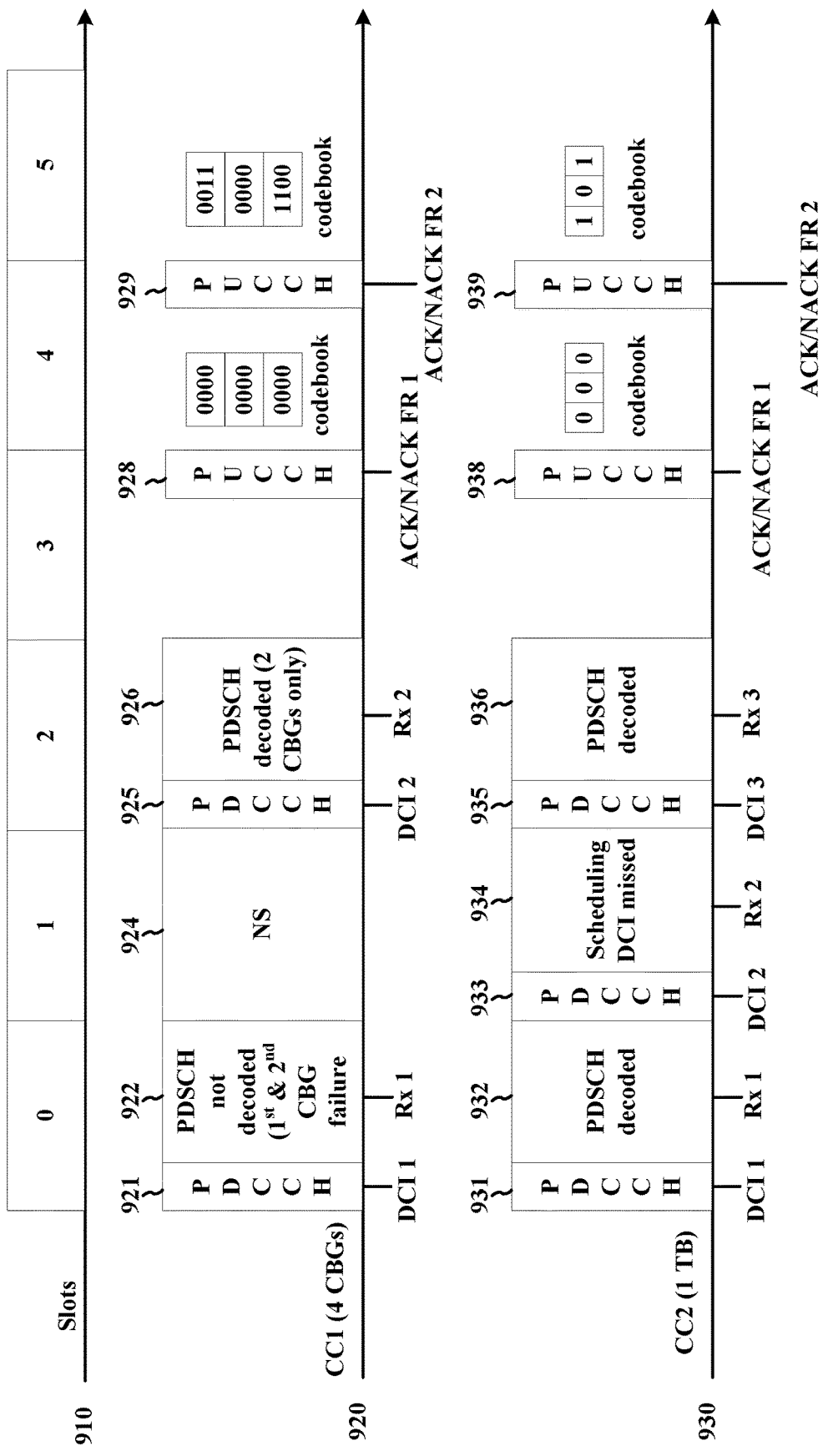
FIG. 9 is a diagram illustrating an example of a transmission feedback scenario for two CCs of a UE configured to use a static codebook (CB) and a plurality of ACK/NACK feedback resources.

As previously explained, different PDSCH decoding schemes may require different decoding times, and only providing a single feedback resource per group of PDSCH downlink transmissions may introduce needless delays or decoding failures. FIG. 9 is a diagram 900 illustrating an alternative example of a transmission feedback scenario for a CC1 920 and CC2 930 of a UE, such as UE 104 in FIGS. 1 and 4 or UE 702 in FIG. 7, configured to use a static CB type 1. CC1 920 has multiple ACK/NACK feedback resources, ACK/NACK feedback resource 1 at PUCCH 928 at slot 3 and ACK/NACK feedback resource 2 at PUCCH 929 at slot 4. CC2 930 also has multiple ACK/NACK feedback resources, ACK/NACK feedback resource 1 at PUCCH 938 at slot 3 and ACK/NACK feedback resource 2 at PUCCH 939 at slot 4.

The slots 910 show the slot timing for the transmission feedback scenario in diagram 900 from slot 0 to slot 5. At slot 0, the CC1 may similarly receive a PDCCH 921 which may carry a first DCI (DCI 1) that schedules a downlink transmission (Rx 1) illustrated as PDSCH 922. At slot 1 the network entity, such as BS 102 or 180 in FIG. 1 or 4, or network entity 704 in FIG. 7, may not have scheduled any activity for the UE, providing a not scheduled (NS) 924 slot. At slot 2, the CC1 may receive a PDCCH 925 which may carry a second DCI (DCI 2) that schedules a downlink transmission (Rx 2) illustrated as PDSCH 926. The DCI 1 and the DCI 2 of the PDCCH 921 and PDCCH 925, respectively, may also indicate a plurality of feedback resources—feedback resource 1 at PUCCH 928 and feedback resource 2 at PUCCH 929—that the UE may use to transmit ACK/NACK responses for each codebook group (CBG) received by the UE. The UE may be configured to use either feedback resource 1 of PUCCH 928 at slot 3 or feedback resource 2 of PUCCH 929 at slot 4 to provide ACK/NACK responses for the downlink transmission Rx 1 of PDSCH 922 and the downlink transmission Rx 2 of PDSCH 926.

The UE may be similarly configured to use a type 1, or a static CB, shown to the right of PUCCH 928 and PUCCH 929 of CC1 920, similar to the CB used for the ACK/NACK response of PUCCH 828 of CC1 820 in FIG. 8.

At slot 0, the CC2 may receive a PDCCH 931 which may carry a first DCI (DCI 1) that schedules a downlink transmission (Rx 1) illustrated as PDSCH 932. At slot 1, the CC2 may be transmitted a PDCCH 933 which may carry a second DCI (DCI 2) that schedules a downlink transmission (Rx 2) illustrated as PDSCH 934. At slot 2, the CC2 may receive a PDCCH 935 which may carry a third DCI (DCI 3) that schedules a downlink transmission (Rx 3) illustrated as PDSCH 936. The DCI 1, DCI 2, and DCI 3 of the PDCCH 931, PDCCH 933, and PDCCH 935, respectively, may also indicate a plurality of feedback resources—feedback resource 1 at PUCCH 938 and feedback resource 2 at PUCCH 939—that the UE may use to transmit ACK/NACK responses for each TB received by the UE. The UE may be configured to use either feedback resource 1 of PUCCH 938 at slot 3 or feedback resource 2 of PUCCH 939 at slot 4 to provide ACK/NACK responses for the downlink transmission Rx 1 of PDSCH 932, the downlink transmission Rx 2 of PDSCH 934, and the downlink transmission Rx 3 of PDSCH 936.

The UE may be similarly configured to use a type 1, or a static CB, shown to the right of PUCCH 938 and PUCCH 939 of CC2 930, similar to the CB used of PUCCH 838 of CC2 830 in FIG. 8.

In one aspect, the UE may be configured to indicate a pending status for any ACK/NACK response occasions before it finishes the corresponding PDSCH decoding. For example, if the UE has not finished decoding the downlink transmission Rx 1 of PDSCH 922 and the downlink transmission Rx 2 of PDSCH 926 before slot 3, the UE may be configured to transmit a pending status using the scheduled feedback resource 1 of PUCCH 928. Similarly, if the UE has not finished decoding the downlink transmission Rx 1 of PDSCH 932, the downlink transmission Rx 2 of PDSCH 934, and the downlink transmission Rx 3 of PDSCH 936 before slot 3, the UE may be configured to transmit a pending status using the scheduled feedback resource 1 of PUCCH 938. The UE may be configured to indicate a pending status to a network entity in any suitable manner.

In one aspect, the UE may be configured to report a NACK to the network entity when the status is pending. For the scheduled feedback resource 1 of PUCCH 928, such a response may be 000000000000 or [0000][0000][0000]. For the scheduled feedback resource 1 of PUCCH 938, such a response may be 000 or [0][0][0]. Such a configuration is simple to program and uses less power, but may introduce longer latency to report an actual NACK for some aspects as the network entity may be configured to wait for an ACK/NACK response to be transmitted during the last scheduled feedback resource to determine whether a previous NACK indicates a pending status or indicates a true NACK that should trigger a retransmission. A true NACK may occur if the UE finishes decoding early but fails to successfully decode any received transmissions, or if a UE misses all the scheduled DCIs of associated transmissions. Later, in response to the UE finishing decoding the PDSCH 922 and the PDSCH 926 of CC1 920, the UE may be configured to transmit an ACK/NACK response using the scheduled feedback resource 2 of PUCCH 929 with 001100001100, or [0011][0000][1100]. Likewise, in response to the UE finishing decoding the PDSCH 932 and the PDSCH 936 of CC2 930, the UE may be configured to transmit an ACK/NACK response using the scheduled feedback resource 2 of PUCCH 939 with 101, or [1][0][1].

Figure 10:
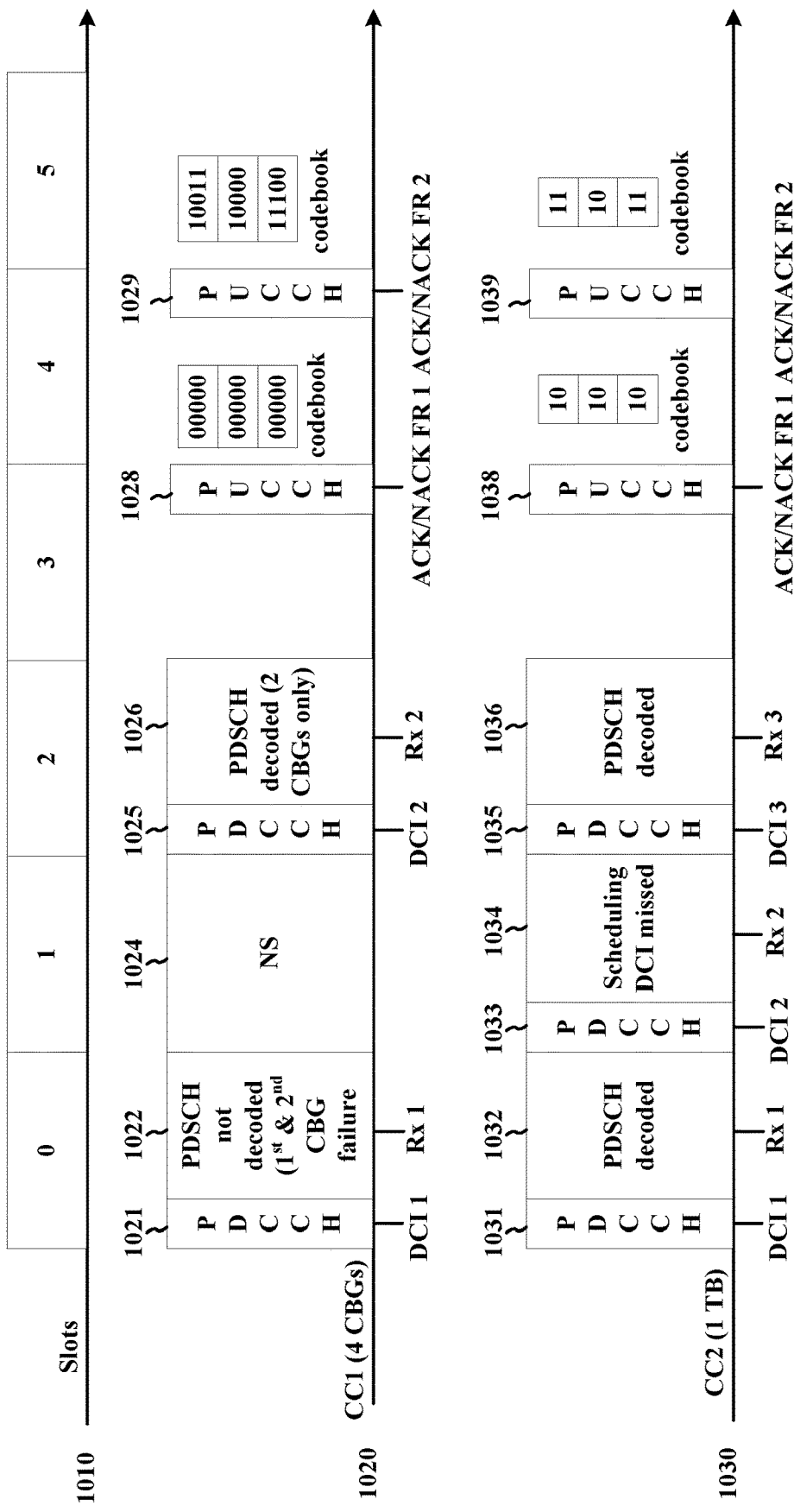
FIG. 10 is a diagram illustrating an example of a transmission feedback scenario for two CCs of a UE configured to use an alternative static CB and a plurality of ACK/NACK feedback resources.

FIG. 10 is a diagram 1000 illustrating an alternative example of a transmission feedback scenario, having slots 1010, CC1 1020, PDCCH 1021, PDSCH 1022, NS 1024, PDCCH 1025, PDSCH 1026, CC2 1030, PDCCH 1031, PDSCH 1032, PDCCH 1033, PDSCH 1034, PDCCH 1035, and PDSCH 1036 similar to slots 910, CC1 920, PDCCH 921, PDSCH 922, NS 924, PDCCH 925, PDSCH 926, CC2 930, PDCCH 931, PDSCH 932, PDCCH 933, PDSCH 934, PDCCH 935, and PDSCH 936, respectively of FIG. 9.

In the diagram 1000, the UE, such as the UE 104 in FIG. 1 or FIG. 4, or the UE 702 in FIG. 7, may be configured to have one or more additional bit in an ACK/NACK codebook to indicate a pending status. The UE may receive transmissions from a network entity, such as BS 102 or 180 in FIG. 1 or 4, or network entity 704 in FIG. 7. The UE may configure CC1 1020 as having a maximum of five bits per TTI-one bit per CBG and one bit to indicate a pending status.

A 1 for the pending status bit may be used to indicate that the UE has finished decoding and the subsequent bits may be used to indicate whether there is a decoding failure for each CBG. In another aspect, a 0 for the pending status bit may be used to indicate that the UE has not finished decoding and is in a pending status, and the subsequent bits may be reserved or may be used to indicate other status conditions. For the scheduled feedback resource 1 of PUCCH 1028, such a pending status response may be 000000000000000 or [00000][00000][00000]. Later, in response to the UE finishing decoding the PDSCH 1022 and the PDSCH 1026 of CC1 1020, the UE may be configured to transmit an ACK/NACK response using the scheduled feedback resource 2 of PUCCH 1029 with 100111000011100, or [10011][10000][11100].

In another aspect the UE may configure CC1 1020 as having a codebook having a pending status bit and three sets of codebook ACK/NACK responses each having four bits per TTI-one bit per CBG. Similarly, a 1 for the pending status bit may be used to indicate that the UE has finished decoding and the subsequent bits may be used to indicate whether there is a decoding failure for each CB G. In another aspect, a 0 for the pending status bit may be used to indicate that the UE has not finished decoding and is in a pending status, and the subsequent bits may be reserved or may be used to indicate other status conditions. For the scheduled feedback resource 1 of PUCCH 1038, such a response may be 000000 or [00][00][00]. Later, in response to the UE finishing decoding the PDSCH 1032, the PDSCH 1034, and the PDSCH 1036 of CC2 1030, the UE may be configured to transmit an ACK/NACK response using the scheduled feedback resource 2 of PUCCH 1039 with 111011, or [11][10][11].

Figure 11:
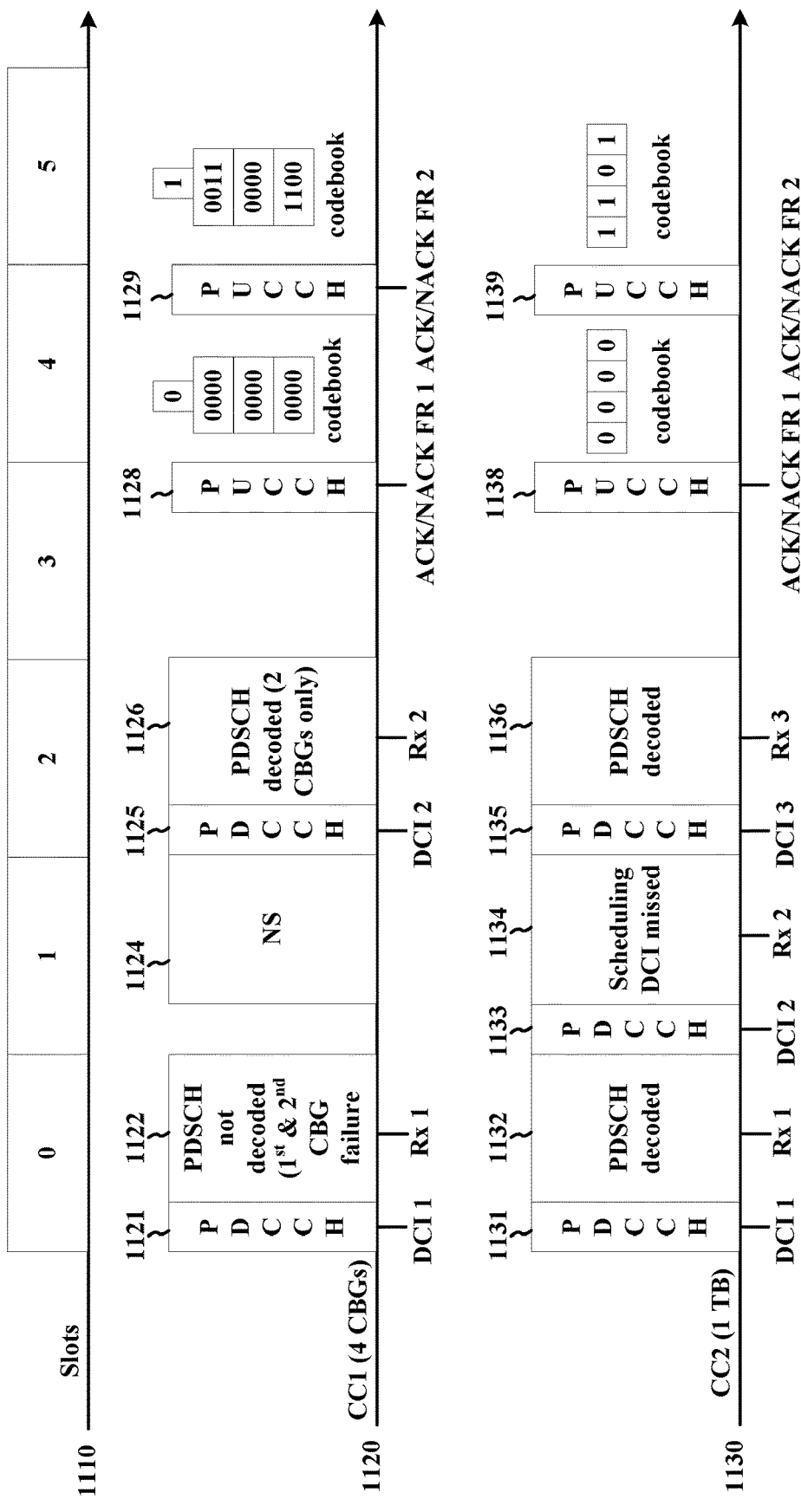
FIG. 11 is a diagram illustrating an example of a transmission feedback scenario for two CCs of a UE configured to use an alternative static CB and a plurality of ACK/NACK feedback resources.

FIG. 11 is a diagram 1100 illustrating an alternative example of a transmission feedback scenario, having slots 1110, CC1 1120, PDCCH 1121, PDSCH 1122, NS 1124, PDCCH 1125, PDSCH 1126, CC2 1130, PDCCH 1131, PDSCH 1132, PDCCH 1133, PDSCH 1134, PDCCH 1135, and PDSCH 1136 similar to slots 910, CC1 920, PDCCH 921, PDSCH 922, NS 924, PDCCH 925, PDSCH 926, CC2 930, PDCCH 931, PDSCH 932, PDCCH 933, PDSCH 934, PDCCH 935, and PDSCH 936, respectively of FIG. 9.

In the diagram 1100, the UE, such as UE 104 in FIGS. 1 and 4 or UE 702 in FIG. 7, may be configured to have one or more additional bit in an ACK/NACK codebook to indicate a pending status. The UE may receive transmissions from a network entity, such as BS 102 or 180 in FIG. 1 or 4, or network entity 704 in FIG. 7. The UE may configure CC1 1120 as having a maximum of five bits per TTI-one bit per CBG and one bit to indicate a pending status. A 1 for the pending status bit may be used to indicate that the UE has finished decoding and the subsequent bits may be used to indicate whether there is a decoding failure for each CBG. In another aspect, a 0 for the pending status bit may be used to indicate that the UE has not finished decoding and is in a pending status, and the subsequent bits may be reserved or may be used to indicate other status conditions. For the scheduled feedback resource 1 of PUCCH 1128, such a pending status response may be 0000000000000 or [0][0000][0000][0000]. Later, in response to the UE finishing decoding the PDSCH 1122 and the PDSCH 1126 of CC1 1120, the UE may be configured to transmit an ACK/NACK response using the scheduled feedback resource 2 of PUCCH 1129 with 1001100001100, or [1][0011][0000][1100].

In another aspect, the UE may configure CC2 1130 as having a maximum of two bits per TB or TTI—one bit per TB and one bit to indicate a pending status. A 1 for the pending status bit may be used to indicate that the UE has finished decoding and the other bit may be used to indicate whether there is a decoding failure for each TB. In another aspect, a 0 for the pending status bit may be used to indicate that the UE has not finished decoding and is in a pending status, and the other bit may be reserved or may be used to indicate other status conditions. In another aspect, 00 may be used for NACK, 11 may be used for ACK, 01 may be used to indicate a pending status, and 10 may be used as a reserved index or may be used to indicate a missed DCI for each CBG. For the scheduled feedback resource 1 of PUCCH 1138, such a response may be 0000 or [0][0][0][0]. Later, in response to the UE finishing decoding the PDSCH 1132, the PDSCH 1134, and the PDSCH 1136 of CC2 1130, the UE may be configured to transmit an ACK/NACK response using the scheduled feedback resource 2 of PUCCH 1139 with 101, or [1][1][0][1].

Figure 12:
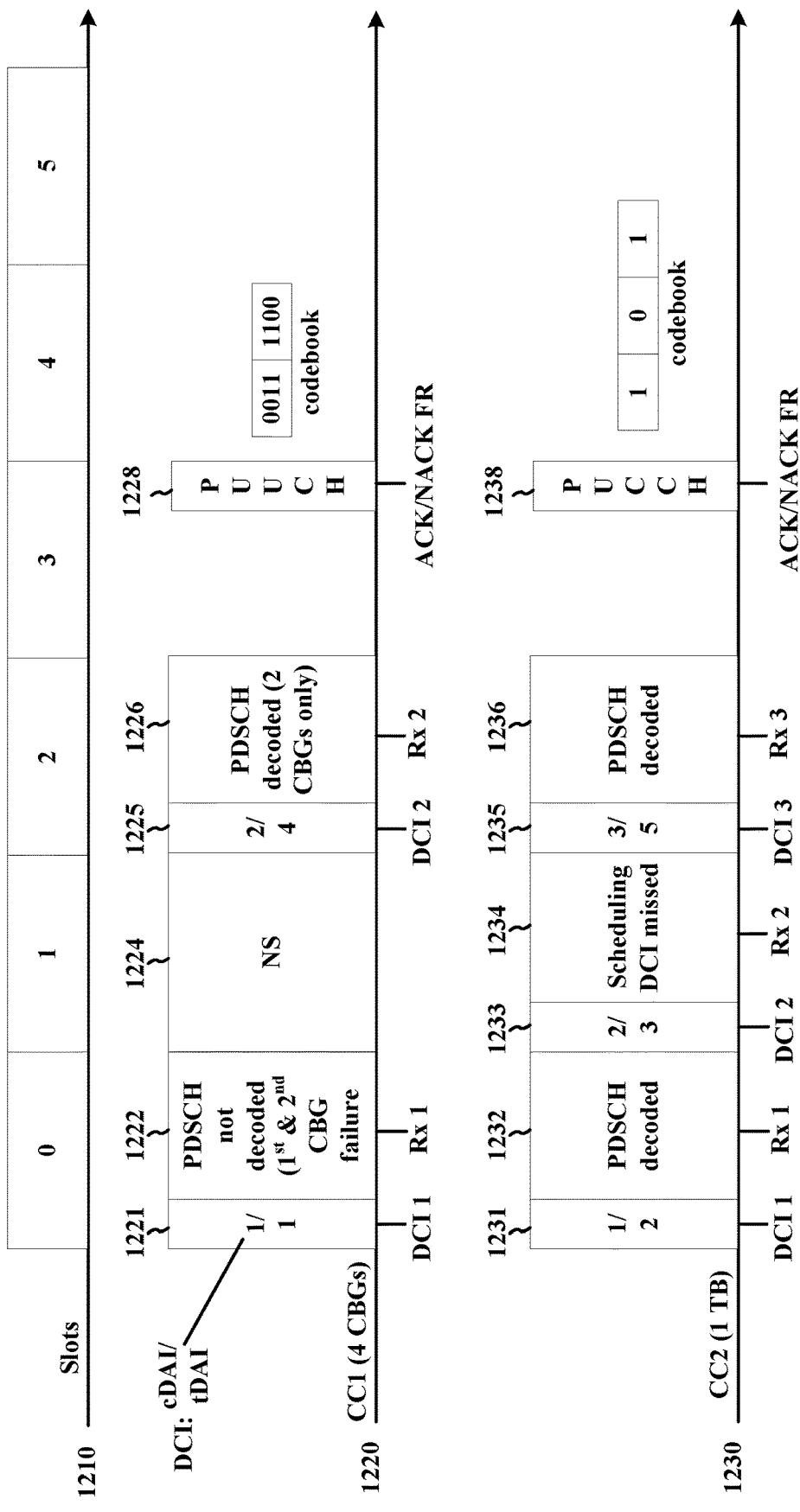
FIG. 12 is a diagram illustrating an example of a transmission feedback scenario for two CCs of a UE configured to use a dynamic CB and one ACK/NACK feedback resource.

FIG. 12 shows a diagram 1200 illustrating an example of a transmission feedback scenario for CC1 1220 and CC2 1230 of a UE, such as UE 104 in FIGS. 1 and 4 or UE 702 in FIG. 7, configured to use a CB type 2. The UE may receive transmissions from a network entity, such as BS 102 or 180 in FIG. 1 or 4, or network entity 704 in FIG. 7. CC1 1220 has a single ACK/NACK feedback resource at PUCCH 1228 and CC2 1230 has a single ACK/NACK feedback resource at PUCCH 1238. The slots 1210 show the slot timing for the transmission feedback scenario in diagram 1200 from slot 0 to slot 5. At slot 0, the CC1 may receive a PDCCH 1221 which may carry a first DCI (DCI 1) that schedules a downlink transmission (Rx 1) illustrated as PDSCH 1222. At slot 1 the network entity may not have scheduled any activity for the UE, providing not scheduled (NS) 1224 slot. At slot 2, the CC1 may receive a PDCCH 1225 which may carry a second DCI (DCI 2) that schedules a downlink transmission (Rx 2) illustrated as PDSCH 1226. The DCI 1 and the DCI 2 of the PDCCH 1221 and PDCCH 1225, respectively, may also indicate a feedback resource of PUCCH 1228 at slot 3 that the UE may use to transmit ACK/NACK responses for each codebook group (CBG) received by the UE.

At slot 0, the CC2 may receive a PDCCH 1231 which may carry a first DCI (DCI 1) that schedules a downlink transmission (Rx 1) illustrated as PDSCH 1232. At slot 1, the CC2 may be transmitted a PDCCH 1233 which may carry a second DCI (DCI 2) that schedules a downlink transmission (Rx 2) illustrated as PDSCH 1234. At slot 2, the CC2 may receive a PDCCH 1235 which may carry a third DCI (DCI 3) that schedules a downlink transmission (Rx 3) illustrated as PDSCH 1236. The DCI 1, DCI 2, and DCI 3 of the PDCCH 1231, PDCCH 1233, and PDCCH 1235, respectively, may also indicate a feedback resource of PUCCH 1238 at slot 3 that the UE may use to transmit a ACK/NACK responses for each TB received by the UE.

The UE may be configured to use a type 2, or a dynamic CB, which may alter the size of the CB depending on the number of scheduled transmissions. For example, the CB for the ACK/NACK response of PUCCH 1228 may be configured to be two CBs, as the network entity only scheduled two associated PDSCHs for CC1 1220 during slots 0 to 2. This differs from the ACK/NACK response of PUCCH 828 of FIG. 8 which has three CBs, as the UE is unable to confirm that the network entity only scheduled two associated PDSCHs for CC1 820 during slots 0 to 2. As such, the UE may be configured to only transmit CBs for ACK/NACK responses of actual scheduled transmissions, as opposed to the NACK 0000 response transmitted for the unscheduled NS 824 in FIG. 8 using the ACK/NACK feedback resource of PUCCH 828. A network entity may be configured to transmit at least one downlink assignment index (DAI) with each DCI to help the UE identify an unscheduled PDSCH. The DAI may correspond to a field/sub-field in the scheduling DCI, and may indicate a count of how many PDSCH scheduling that the UE should ACK/NACK in the same ACK/NACK occasion. For example, the scheduling DCI 1 of PDCCH 1221 for CC1 1220, DCI 2 of PDCCH 1225 for CC1 1220, DCI 1 of PDCCH 1231 for CC2 1230, DCI2 of PDCCH 1233 for CC2 1230, and DCI 3 of PDCCH 1235 for CC2 1230 each may be configured to have a DAI field/sub-field that corresponds with two counters—a total DAI (tDAI) and a counter DAI (cDAI). The tDAI and cDAI transmitted by the network entity may be used by a UE to determine if a DCI for a CC has been missed. The network entity may be configured to provide multiple DAI counter values for a DCI, such as the cDAI value and the tDAI value of DCI 1 of PDCCH 1221.

For example, in diagram 1200, the network entity may transmit the DCI 1 of PDCCH 1221 for CC1 1220. The network entity may set the cDAI to 1 as the first DCI of CC1 and the tDAI to 1 as the first associated DCI. The network entity may also transmit the DCI 1 of PDCCH 1231 for CC2 1230. The network entity may set the cDAI to 1 as the first DCI of CC2 and the tDAI to 2 as the second associated DCI. The network entity may also transmit the DCI 2 of PDCCH 1233 for CC2 1230. The network entity may set the cDAI to 2 as the second DCI of CC2 and the tDAI to 3 as the third associated DCI. The network entity may also transmit the DCI 2 of PDCCH 1225 for CC1 1220. The network entity may set the cDAI to 2 as the second DCI of CC1 and the tDAI to 4 as the fourth associated DCI. The network entity may also transmit the DCI 3 of PDCCH 1235 for CC2 1230. The network entity may set the cDAI to 3 as the third DCI of CC2 and the tDAI to 5 as the fifth associated DCI. The UE may use the DAI counters to determine that the network entity did not schedule a download transfer PDSCH between the PDSCH 1222 and the PDSCH 1226, and may also use the DAI counters to determine that the ACK/NACK response should contain only two TTIs of 4 CBGs, as only two TTIs were scheduled by the network entity.

Figure 13:
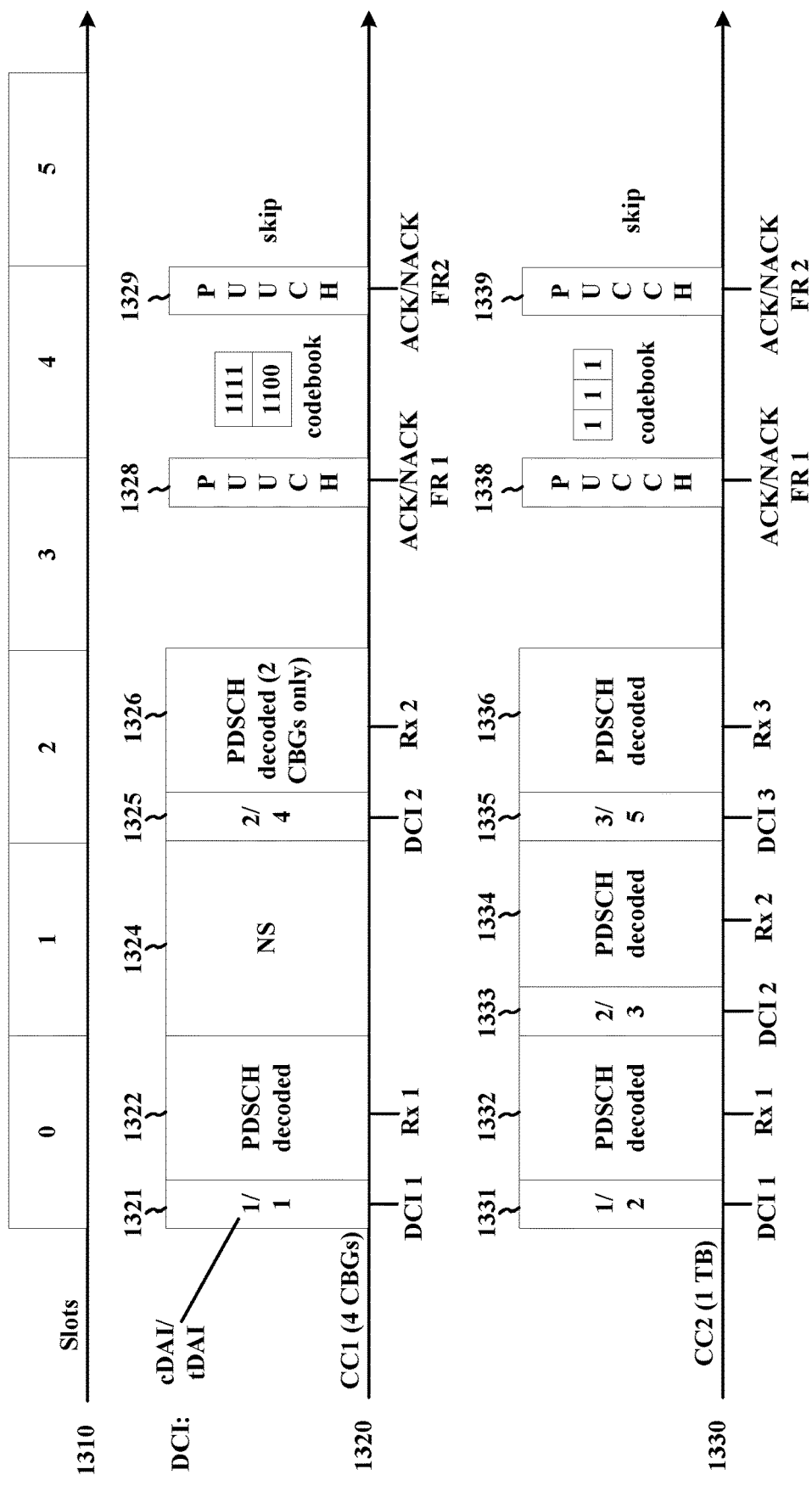
FIG. 13 is a diagram illustrating an example of a transmission feedback scenario for two CCs of a UE configured to use a dynamic CB and multiple ACK/NACK feedback resources.

As previously explained, different PDSCH decoding schemes may require different decoding times, and only providing a single feedback resource per group of PDSCH downlink transmissions may introduce needless delays or decoding failures. FIG. 13 is a diagram 1300 illustrating an alternative example of a transmission feedback scenario for a CC1 1320 and CC2 1330 of a UE, such as UE 104 in FIGS. 1 and 4 or UE 702 in FIG. 7, configured to use a dynamic CB type 2. The UE may receive transmissions from a network entity, such as BS 102 or 180 in FIG. 1 or 4, or network entity 704 in FIG. 7. CC1 1320 has multiple ACK/NACK feedback resources, ACK/NACK feedback resource 1 at PUCCH 1328 and ACK/NACK feedback resource 2 at PUCCH 1329. CC2 1330 also has multiple ACK/NACK feedback resources, ACK/NACK feedback resource 1 at PUCCH 1338 and ACK/NACK feedback resource 2 at PUCCH 1339.

The slots 1310 show the slot timing for the transmission feedback scenario in diagram 1300 from slot 0 to slot 5. At slot 0, the CC1 may similarly receive a PDCCH 1321 which may carry a first DCI (DCI 1) that schedules a downlink transmission (Rx 1) illustrated as PDSCH 1322. At slot 1, the network entity may not have scheduled any activity for the UE, providing not scheduled (NS) 1324 slot. At slot 2, the CC1 may receive a PDCCH 1325 which may carry a second DCI (DCI 2) that schedules a downlink transmission (Rx 2) for the following three slots 9-11 illustrated as PDSCH 1326. The DCI 1 and the DCI 2 of the PDCCH 1321 and PDCCH 1325, respectively, may also indicate a plurality of feedback resources—feedback resource 1 at PUCCH 1328 and feedback resource 2 at PUCCH 1329—that the UE may use to transmit ACK/NACK responses for each codebook group (CBG) received by the UE. The UE may be configured to use either feedback resource 1 of PUCCH 1328 at slot 3 or feedback resource 2 of PUCCH 1329 at slot 4 to provide ACK/NACK responses for the downlink transmission Rx 1 of PDSCH 1322 and the downlink transmission Rx 2 of PDSCH 1326.

The UE may be similarly configured to use a type 2, or a dynamic CB, shown to the right of PUCCH 1328 and PUCCH 1329 of CC1 1320, similar to the CB used of PUCCH 1228 of CC1 1220 in FIG. 12.

At slot 0, the CC2 may receive a PDCCH 1331 which may carry a first DCI (DCI 1) that schedules a downlink transmission (Rx 1) illustrated as PDSCH 1332. At slot 1, the CC2 may receive a PDCCH 1333 which may carry a second DCI (DCI 2) that schedules a downlink transmission (Rx 2) illustrated as PDSCH 1334. At slot 2, the CC2 may receive a PDCCH 1335 which may carry a third DCI (DCI 3) that schedules a downlink transmission (Rx 3) illustrated as PDSCH 1336. The DCI 1, DCI 2, and DCI 3 of the PDCCH 1331, PDCCH 1333, and PDCCH 1325, respectively, may also indicate a plurality of feedback resources—feedback resource 1 at PUCCH 1338 and feedback resource 2 at PUCCH 1339—that the UE may use to transmit ACK/NACK responses for each TB received by the UE. The UE may be configured to use either feedback resource 1 of PUCCH 1338 at slot 3 or feedback resource 2 of PUCCH 1339 at slot 4 to provide ACK/NACK responses for the downlink transmission Rx 1 of PDSCH 1332, the downlink transmission Rx 2 of PDSCH 1334, and the downlink transmission Rx 3 of PDSCH 1326.

The UE may be similarly configured to use a type 2, or a dynamic CB, shown to the right of PUCCH 1338 and PUCCH 1339 of CC2 1330, similar to the CB used of PUCCH 1238 of CC2 1230 in FIG. 12.

In one aspect, the UE may be configured to change its behavior for a subsequent PUCCH candidate based on whether the UE reported an ACK/NACK in an earlier PUCCH occasion. For example, a UE may be configured to skip the ACK/NACK bit for a PDSCH that has been reported in a previous PUCCH candidate. For example, here the UE may have decoded the PDSCH 1322 and the PDSCH 1326 using a decoding scheme associated with the earlier feedback resource 1 of PUCCH 1328. The UE may have then transmitted, to the network entity, 00111100 or [0011][1100] using the feedback resource 1 of PUCCH 1328. Later, the UE may be configured to skip transmitting an ACK/NACK response using the feedback resource 2 of PUCCH 1329 in response to determining that the UE already transmitted the ACK/NACK response earlier. Likewise, the UE may have decoded the PDSCH 1332, the PDSCH 1334, and the PDSCH 1336 using a decoding scheme associated with the earlier feedback resource 1 of PUCCH 1338. The UE may have then transmitted, to the network entity, 101 or [1][0][1] using the feedback resource 1 of PUCCH 1338. Later, the UE may be configured to skip transmitting an ACK/NACK response using the feedback resource 2 of PUCCH 1339 in response to determining that the UE already transmitted the ACK/NACK response earlier. Such a configuration saves power, but the previous ACK/NACK response transmitted using the feedback resource 1 of PUCCH 1328 or the feedback resource 1 of PUCCH 1338 may not have been received and/or may not have been correctly decoded by the network entity, which may cause a codebook size mismatch issue.

A UE may be configured to generate more than one HARQ codebook. Where a UE has at least two HARQ codebooks, the UE may be configured to associate each HARQ codebook with a different PUCCH PHY priority. The UE may be configured to ensure each codebook has its own dedicated PUCCH/PUSCH resource association. The UE may also be configured to generate and/or encode ACK/NACK bits in each codebook separately or independently.

Figure 14:
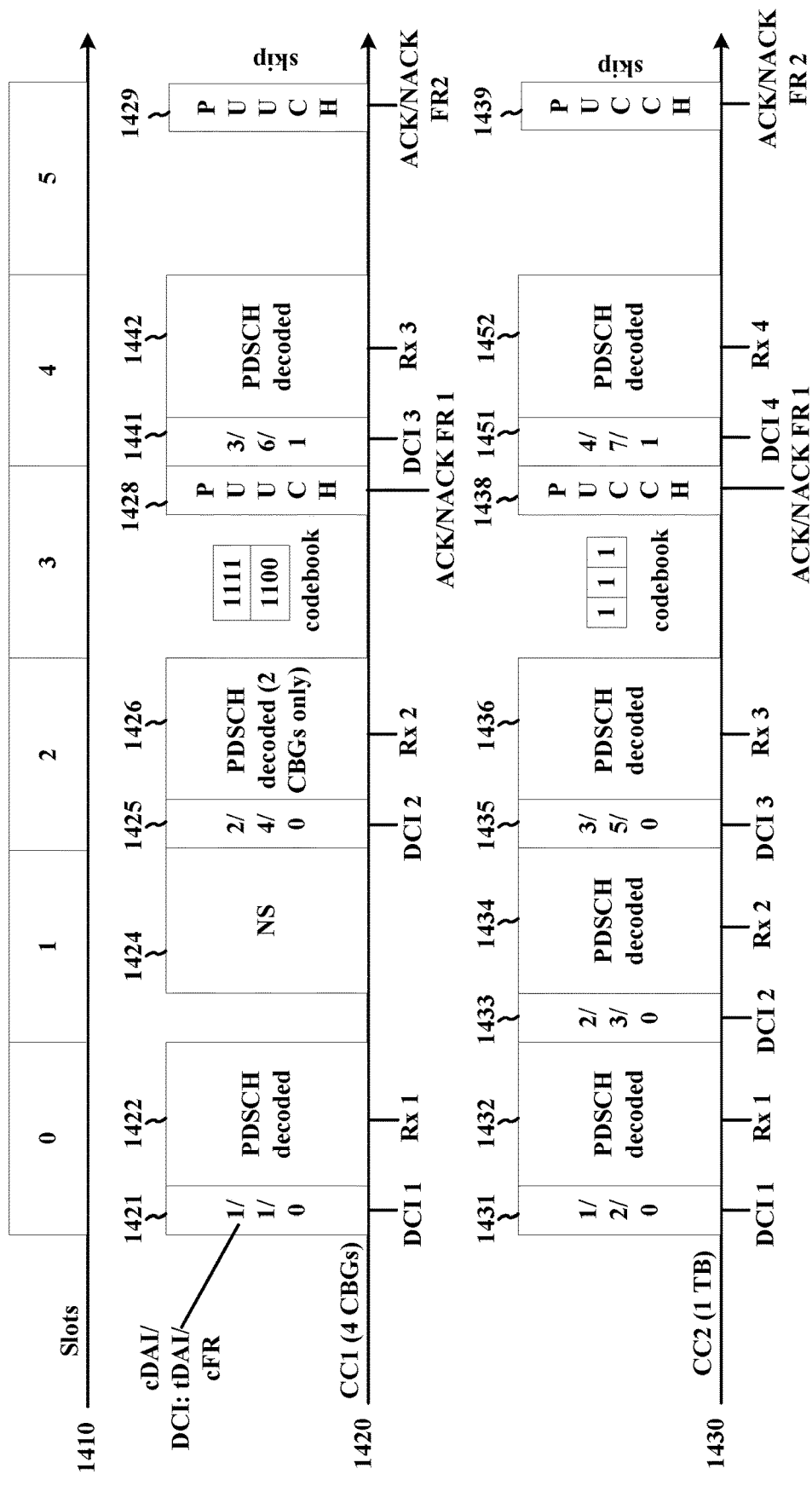
FIG. 14 is a diagram illustrating another example of a transmission feedback scenario for two CCs of a UE configured to use a dynamic CB and multiple ACK/NACK feedback resources.

FIG. 14 is a diagram 1400 illustrating an alternative example of a transmission feedback scenario, having slots 1410, CC1 1420, PDCCH 1421, PDSCH 1422, NS 1424, PDCCH 1425, PDSCH 1426, CC2 1430, PDCCH 1431, PDSCH 1432, PDCCH 1433, PDSCH 1434, PDCCH 1435, and PDSCH 1436 similar to slots 1310, CC1 1320, PDCCH 1321, PDSCH 1322, NS 1324, PDCCH 1325, PDSCH 1326, CC2 1330, PDCCH 1331, PDSCH 1332, PDCCH 1333, PDSCH 1334, PDCCH 1335, and PDSCH 1336, respectively of FIG. 13. The DCI 1 and the DCI 2 of the PDCCH 1421 and PDCCH 1425, respectively, may also indicate a plurality of feedback resources— feedback resource 1 of PUCCH 1428 at slot 3 and feedback resource 2 of PUCCH 1329 at slot 5—that the UE may use to transmit ACK/NACK responses for each codebook group (CBG) received by the UE. Similarly, the DCI 1, DCI 2, and DCI 3 of the PDCCH 1431, PDCCH 1433, and PDCCH 1425, respectively, may also indicate a plurality of feedback resources—feedback resource 1 of PUCCH 1438 at slot 3 and feedback resource 2 of PUCCH 1439 at slot 5—that the UE may use to transmit ACK/NACK responses for each TB received by the UE.

In one aspect, the UE, such as UE 104 in FIGS. 1 and 4 or UE 702 in FIG. 7, may be configured to change its behavior for a subsequent PUCCH candidate based on whether the UE reported an ACK/NACK in an earlier PUCCH occasion. The UE may receive transmissions from a network entity, such as BS 102 or 180 in FIG. 1 or 4, or network entity 704 in FIG. 7. The network entity may be configured to add another counter to the scheduling DCI to indicate how many ACK/NACK responses associated with the current PUCCH occasion have been received previously. The UE may use such counters to skip repetitive ACK/NACK responses in subsequent feedback resources. Here, the network entity may be configured to increment a counter feedback resource (cFR) for CC1 1420 after the UE transmits an ACK/NACK response using the feedback resource 1 of PUCCH 1428, and may be configured to increment a cFR for CC2 1430 after the UE transmits an ACK/NACK response using the feedback resource 1 of PUCCH 1438.

In diagram 1400, in response to receiving the ACK/NACK response of [1111][1100] using PUCCH 1428 from the UE, the network entity may transmit the DCI 3 of PDCCH 1441 for CC1 1420 to schedule the PDSCH 1442. The network entity may set the cDAI to 3 as the third DCI of CC1, the tDAI to 6 as the sixth associated DCI, and the cFR to 1 as the first feedback resource has been used by the UE to transmit an ACK/NACK response for CC1 1420. Later, the UE may be configured to skip transmitting an ACK/NACK response using the feedback resource 2 of PUCCH 1429 in response to determining that the network entity already confirmed receipt of the ACK/NACK response for CC1 1420 earlier by transmitting the updated cFR. Similarly, in response to receiving the ACK/NACK response of [1][1][1] using PUCCH 1438 from the UE, the network entity may transmit the DCI 4 of PDCCH 1451 for CC2 1430 to schedule the PDSCH 1452. The network entity may set the cDAI to 4 as the fourth DCI of CC2, the tDAI to 7 as the seventh associated DCI, and the cFR to 1 as the first feedback resource has been used by the UE to transmit an ACK/NACK response for CC2 1430. Later, the UE may be configured to skip transmitting an ACK/NACK response using the feedback resource 2 of PUCCH 1439 in response to determining that the network entity already confirmed receipt of the ACK/NACK response for CC2 1430 earlier by transmitting the updated cFR.

For type 2 HARQ CBs, in response to determining that multiple ACK/NACK candidates are configured for a PDSCH, the network entity may be configured to use the scheduling DCI to indicate multiple DAI counter values, where each counter value may correspond with an ACK/NACK candidate occasion.

Figure 15:
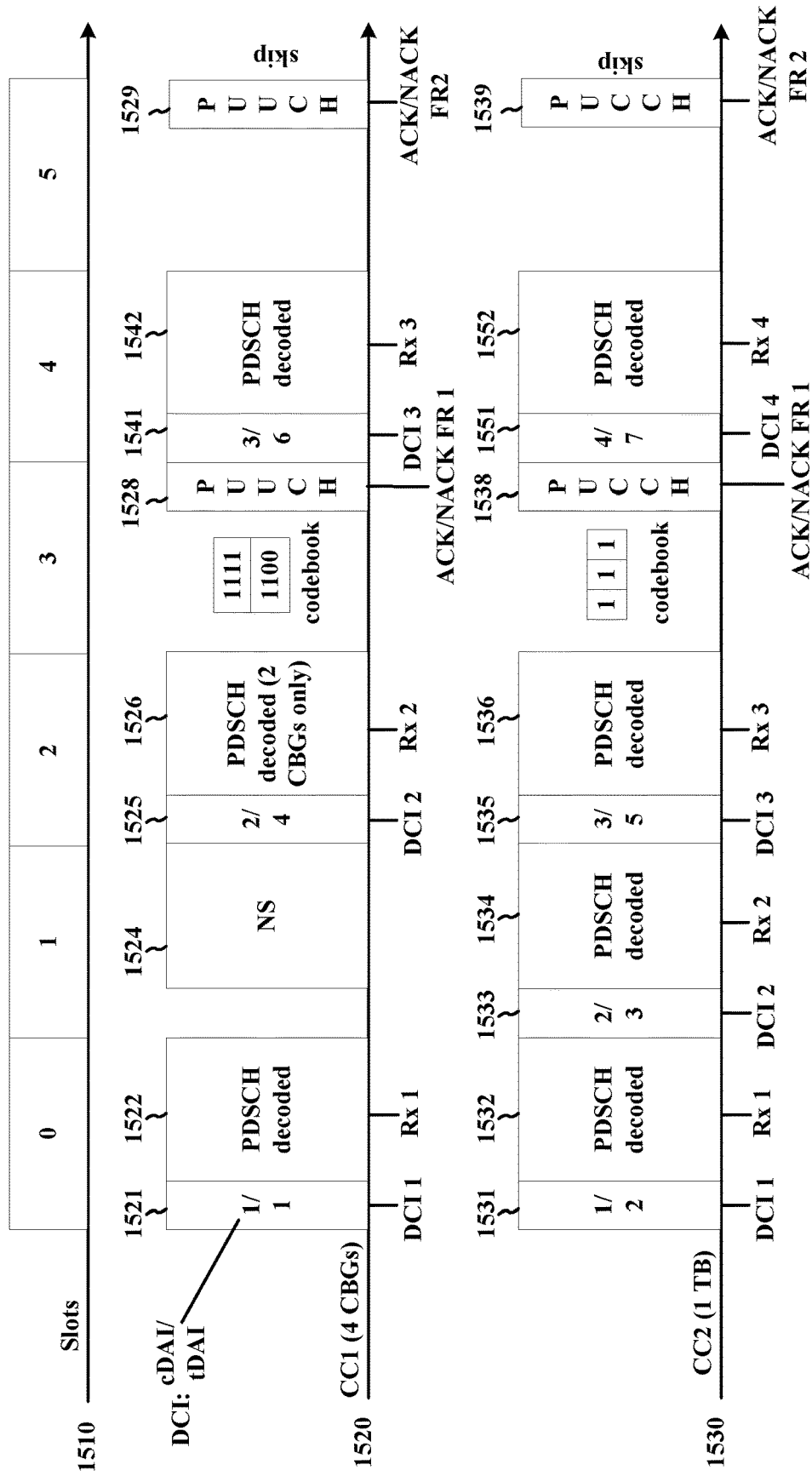
FIG. 15 is a diagram illustrating another example of a transmission feedback scenario for two CCs of a UE configured to use a dynamic CB and multiple ACK/NACK feedback resources.

FIG. 15 is a diagram 1500 illustrating an alternative example of a transmission feedback scenario, having slots 1510, CC1 1520, PDCCH 1521, PDSCH 1522, NS 1524, PDCCH 1525, PDSCH 1526, CC2 1530, PDCCH 1531, PDSCH 1532, PDCCH 1533, PDSCH 1534, PDCCH 1535, and PDSCH 1536 similar to slots 1310, CC1 1320, PDCCH 1321, PDSCH 1322, NS 1324, PDCCH 1325, PDSCH 1326, CC2 1330, PDCCH 1331, PDSCH 1332, PDCCH 1333, PDSCH 1334, PDCCH 1335, and PDSCH 1336, respectively of FIG. 13. The DCI 1 and the DCI 2 of the PDCCH 1521 and PDCCH 1525, respectively, may also indicate a plurality of feedback resources-feedback resource 1 of PUCCH 1528 at slot 3 and feedback resource 2 of PUCCH 1529 at slot 5—that the UE may use to transmit ACK/NACK responses for each codebook group (CBG) received by the UE. Similarly, the DCI 1, DCI 2, and DCI 3 of the PDCCH 1531, PDCCH 1533, and PDCCH 1525, respectively, may also indicate a plurality of feedback resources-feedback resource 1 of PUCCH 1538 at slot 3 and feedback resource 2 of PUCCH 1539 at slot 5—that the UE may use to transmit ACK/NACK responses for each TB received by the UE.

In one aspect, the UE, such as UE 104 in FIGS. 1 and 4 or UE 702 in FIG. 7, may be configured to repeat an ACK/NACK response using subsequent feedback resources until the UE receives a DCI that schedules a new transmission or a retransmission of the same HARQ_ID. The UE may receive transmissions from a network entity, such as BS 102 or 180 in FIG. 1 or 4, or network entity 704 in FIG. 7. The UE may transmit an ACK using the feedback resource 1 of PUCCH 1528, and the UE may then receive a DCI of PDCCH 1541 to schedule a new downlink transmission of PDSCH 1542. Later, the UE may be configured to skip transmitting an ACK/NACK response using the feedback resource 2 of PUCCH 1529 in response to determining that the network entity impliedly confirmed receipt of the ACK response by scheduling a new transmission using PDCCH 1541. In another aspect, the UE may transmit an ACK using the feedback resource 1 of PUCCH 1538, and the UE may then receive a DCI of PDCCH 1551 to schedule a new downlink transmission of PDSCH 1552. Later, the UE may be configured to skip transmitting an ACK/NACK response using the feedback resource 2 of PUCCH 1539 in response to determining that the network entity impliedly confirmed receipt of the ACK response by scheduling a new transmission.

In another aspect, the UE may transmit a NACK using the feedback resource 1 of PUCCH 1528, and the UE may then receive a DCI of PDCCH 1541 to schedule a retransmission of PDSCH 1522 using PDSCH 1542. Later, the UE may be configured to skip transmitting an ACK/NACK response using the feedback resource 2 of PUCCH 1529 in response to determining that the network entity impliedly confirmed receipt of the NACK by scheduling a retransmission using PDCCH 1551. In another aspect, the UE may transmit a NACK using the feedback resource 1 of PUCCH 1538, and the UE may then receive a DCI of PDCCH 1551 to schedule a retransmission of PDSCH 1532 using PDSCH 1552. Later, the UE may be configured to skip transmitting an ACK/NACK response using the feedback resource 2 of PUCCH 1539 in response to determining that the network entity impliedly confirmed receipt of the NACK response by scheduling a new transmission.

Figure 16:
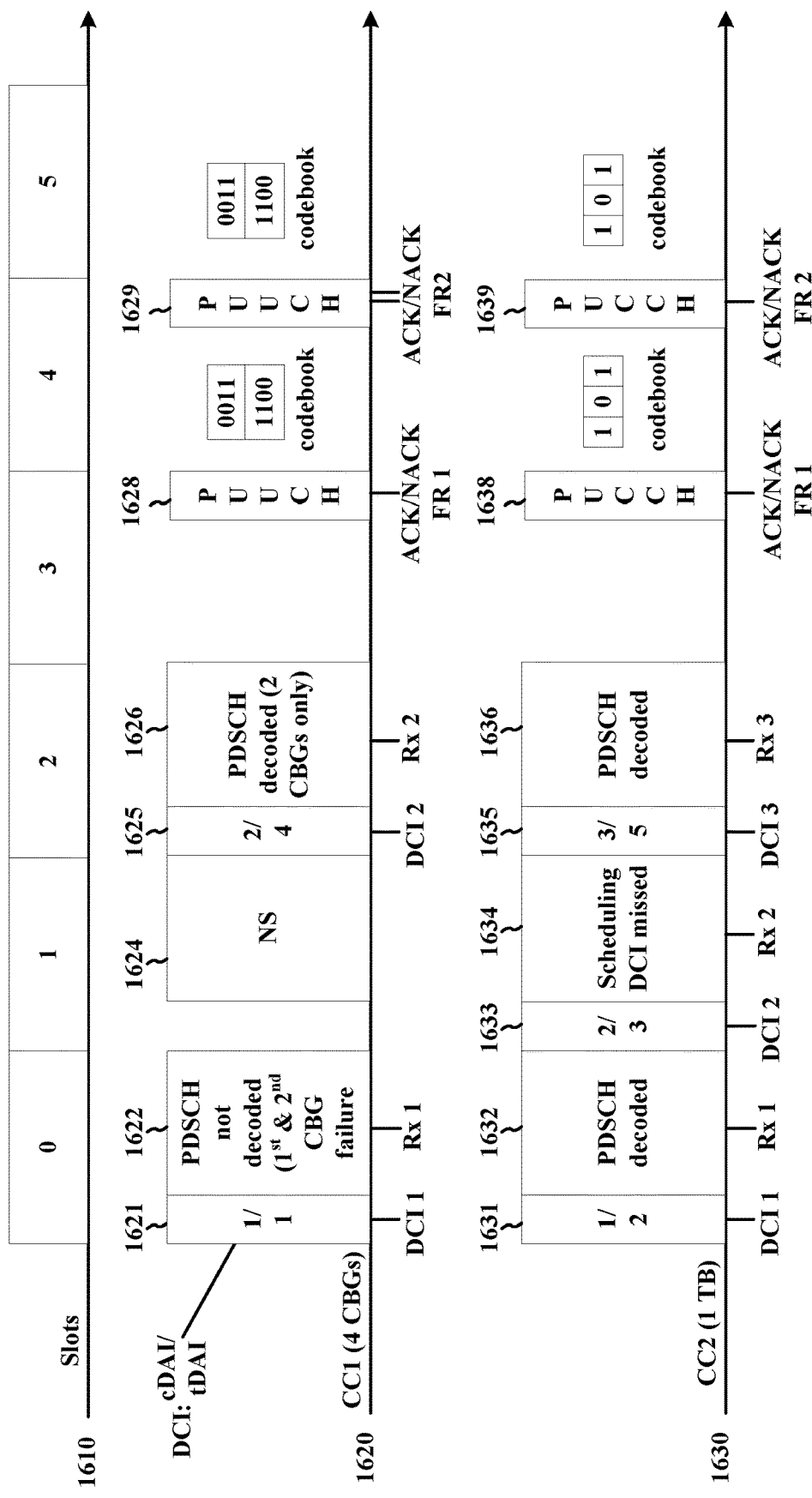
FIG. 16 is a diagram illustrating another example of a transmission feedback scenario for two CCs of a UE configured to use a dynamic CB and multiple ACK/NACK feedback resources.

FIG. 16 is a diagram 1600 illustrating an alternative example of a transmission feedback scenario, having slots 1610, CC1 1620, PDCCH 1621, PDSCH 1622, NS 1624, PDCCH 1625, PDSCH 1626, CC2 1630, PDCCH 1631, PDSCH 1632, PDCCH 1633, PDSCH 1634, PDCCH 1635, and PDSCH 1636 similar to slots 1310, CC1 1320, PDCCH 1321, PDSCH 1322, NS 1324, PDCCH 1325, PDSCH 1326, CC2 1330, PDCCH 1331, PDSCH 1332, PDCCH 1333, PDSCH 1334, PDCCH 1335, and PDSCH 1336, respectively of FIG. 13. The DCI 1 and the DCI 2 of the PDCCH 1621 and PDCCH 1625, respectively, may also indicate a plurality of feedback resources-feedback resource 1 of PUCCH 1628 at slot 3 and feedback resource 2 of PUCCH 1629 at slot 4—that the UE may use to transmit ACK/NACK responses for each codebook group (CBG) received by the UE. Similarly, the DCI 1, DCI 2, and DCI 3 of the PDCCH 1631, PDCCH 1633, and PDCCH 1625, respectively, may also indicate a plurality of feedback resources-feedback resource 1 of PUCCH 1638 at slot 3 and feedback resource 2 of PUCCH 1639 at slot 4—that the UE may use to transmit ACK/NACK responses for each TB received by the UE.

In one aspect, the UE, such as UE 104 in FIGS. 1 and 4 or UE 702 in FIG. 7, may be configured to repeat an ACK/NACK response using subsequent feedback resources to provide redundancy. The UE may receive transmissions from a network entity, such as BS 102 or 180 in FIG. 1 or 4, or network entity 704 in FIG. 7. The UE may transmit an ACK/NACK response using the feedback resource 1 of PUCCH 1628, and may later retransmit transmit the ACK/NACK response using the feedback resource 2 of PUCCH 1629. In another aspect, the UE may transmit an ACK/NACK response using the feedback resource 1 of PUCCH 1638, and may later retransmit transmit the ACK/NACK response using the feedback resource 2 of PUCCH 1639. Such a configuration may provide stability, but may also require more overhead as the UE may provide redundant ACK/NACK responses.

Figure 17:
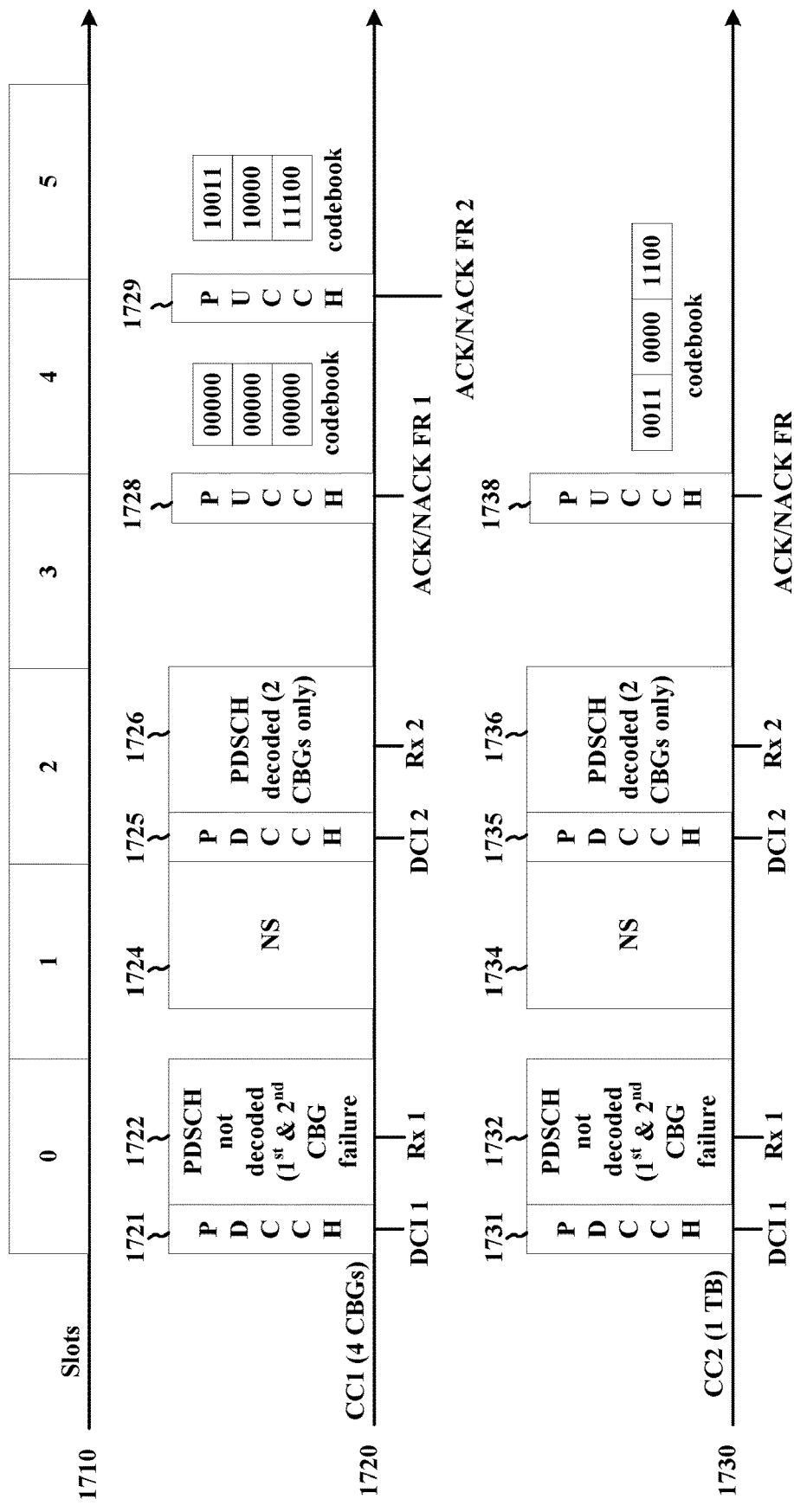
FIG. 17 is a diagram illustrating another example of a transmission feedback scenario for two CCs of a UE configured to use a plurality of CBs and multiple ACK/NACK feedback resources.

FIG. 17 is a diagram 1700 illustrating an alternative example of a transmission feedback scenario, having slots 1710, CC1 1720, PDCCH 1721, PDSCH 1722, NS 1724, PDCCH 1725, PDSCH 1726, PUCCH 1728, and PUCCH 1729 similar to slots 1010, CC1 1020, PDCCH 1021, PDSCH 1022, NS 1024, PDCCH 1025, PDSCH 1026, PUCCH 1028, and PUCCH 1029, respectively of FIG. 9. Diagram 1700 also has CC2 1730, PDCCH 1731, PDSCH 1732, NS 1734, PDCCH 1735, PDSCH 1736, and PUCCH 1738 similar to CC2 830, PDCCH 831, PDSCH 832, PDCCH 833, PDSCH 834, PDCCH 835, PDSCH 836, and PUCCH 838, respectively of FIG. 8.

In the diagram 1700, the UE, such as UE 104 in FIGS. 1 and 4 or UE 702 in FIG. 7, may be configured to have one or more additional bit in an ACK/NACK codebook for CC1 1720 to indicate a pending status. The UE may receive transmissions from a network entity, such as BS 102 or 180 in FIG. 1 or 4, or network entity 704 in FIG. 7. The UE may configure CC1 1020 as having a maximum of five bits per TTI-one bit per CBG and one bit to indicate a pending status. A 1 for the pending status bit may be used to indicate that the UE has finished decoding and the subsequent bits may be used to indicate whether there is a decoding failure for each CBG. In another aspect, a 0 for the pending status bit may be used to indicate that the UE has not finished decoding and is in a pending status, and the subsequent bits may be reserved or may be used to indicate other status conditions. For the scheduled feedback resource 1 of PUCCH 1028, such a pending status response may be 000000000000000 or [00000][00000][00000]. Later, in response to the UE finishing decoding the PDSCH 1022 and the PDSCH 1026 of CC1 1020, the UE may be configured to transmit an ACK/NACK response using the scheduled feedback resource 2 of PUCCH 1029 of 100111000011100, or [10011][10000] [11100].

The UE may also be configured to have no additional bit for CC2 1730 to indicate a pending status. In other words, the codebook for CC2 1730 may be configured to only use a single feedback resource for a set of associated PDSCH downlink transmissions, such as PDSCH 1732 and PDSCH 1736. The codebook for CC2 1730 does not need a pending status as the codebook for CC1 1720 does, as only one feedback resource may be scheduled for a set of associated PDSCH downlink transmissions. The UE may use the same decoding scheme to decode each of the PDSCH's 1722, 1726, 1732, and 1736, or may use different decoding schemes based upon trigger conditions.

In one aspect, the PUCCH resources for both codebooks may be overlapped, allowing for a UE to be configured to use a PUCCH resource for both codebooks. The UE may be configured to generate and/or encode the bits of the ACK/NACK response, and then multiplex the bits in the PUCCH. A network entity may be configured to de-multiplex the transmitted bits to separate the codebooks. The UE may be configured to select a HARQ codebook based on a scheduling DCI or a preconfiguration in a PUCCH resource. For example, the UE may be configured to determine that the scheduling DCI has only scheduled a single feedback resource for a set of associated PDSCH downlink transmissions, and in response may select the codebook for CC2 having a single feedback resource for a set of associated PDSCH downlink transmissions and no additional bit to indicate a pending status. In another aspect, the UE may be configured to determine a conditional trigger exists that allows the UE to use a plurality of decoding schemes to decode a downlink transmission, and in response may select the codebook for CC1 1720 having a plurality of feedback resources for a set of associated PDSCH downlink transmissions and an additional bit to indicate a pending status.

Figure 18:
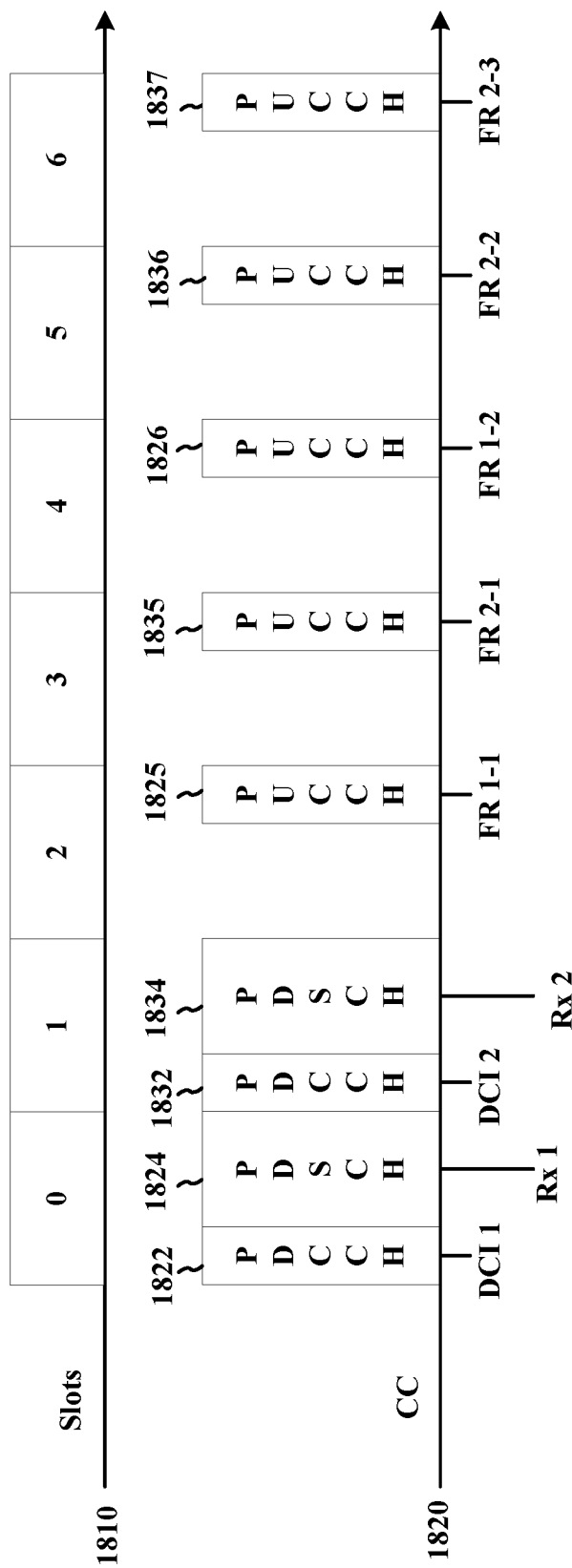
FIG. 18 is a diagram illustrating another example of a transmission feedback scenario for a component carrier of a UE using a plurality of ACK/NACK feedback resources

FIG. 18 is a diagram 1800 illustrating an alternative example of a transmission feedback scenario for a CC 1820 of a UE, such as UE 104 in FIG. 1. The slots 1810 show the slot timing for the transmission feedback scenario from slot 0 to slot 6. At slot 0, the CC 1820 may receive a PDCCH 1822 which may carry DCI that schedules a downlink transmission illustrated as PDSCH 1824 and may indicate a feedback resource 1-1 illustrated as PUCCH 1825 at slot 2 and a feedback resource 1-2 illustrated as PUCCH 1826 at slot 4. At slot 1, the CC 1820 may receive a PDCCH 1832 which may carry DCI that schedules a downlink transmission illustrated as PDSCH 1834 and may indicate a feedback resource 2-1 illustrated as PUCCH 1835 at slot 3, a feedback resource 2-2 illustrated as PUCCH 1836 at slot 5, and a feedback resource 2-3 illustrated as PUCCH 1837 at slot 6.

A network entity may be configured to follow an out of order rule (OOO) to schedule feedback resources for a plurality of scheduled PDSCH transmissions. For example, a network entity may be configured to ensure that a scheduled feedback resource for an ACK/NACK response in a later slot cannot proceed a scheduled feedback resource for an ACK/NACK response in an earlier slot. The OOO rule may also allow an ACK/NACK response for two PDSCH transmissions to occur within the same slot. For example, a UE using an OOO rule may be configured to schedule a PUCCH transmission for both PDSCH 1824 and PDSCH 1834 for slot 4 (e.g. a first PUCCH during the last 2 symbols of slot 4 and a second PUCCH during the second to last 2 symbols of slot 4). The UE, such as UE 104 in FIGS. 1 and 4 or UE 702 in FIG. 7, may be configured to relax the OOO rule when a PDSCH has multiple ACK/NACK feedback resources. The UE may receive transmissions from a network entity, such as BS 102 or 180 in FIG. 1, CU 410, DU 430, or RU 440 in FIG. 4, or network entity 704 in FIG. 7. Relaxing the OOO rule allows a network entity to schedule the feedback resource 1-2 of PUCCH 1826 at slot 5 to be later than the feedback resource 2-2 of PUCCH 1836 at slot 4. Here, the UE may have selected a decoding scheme associated with the feedback resource 1-2 of PUCCH 1826 at slot 15 to decode the downlink transmission data of PDSCH 1824. The UE may have also selected a decoding scheme associated with the feedback resource 2-1 of PUCCH 1835 at slot 11 to decode the downlink transmission data of PDSCH 1834. Ensuring that a network entity follows the OOO rule may cause later-received PDSCH downlink transmissions to have delayed ACK/NACK responses.

The UE may also be configured to not allow transmission of a feedback resource that has a k-th ACK/NACK occasion for an earlier PDSCH later than the k-th ACK/NACK occasion for a later PDSCH. In other words, a network entity may be configured to not schedules the $2^{nd}$ or $3^{rd}$ feedback resource 2-2 or 2-3 of PDSCH 1834 to be earlier than the $2^{nd}$ feedback resource 1-2 of PDSCH 1824.

Figure 19:
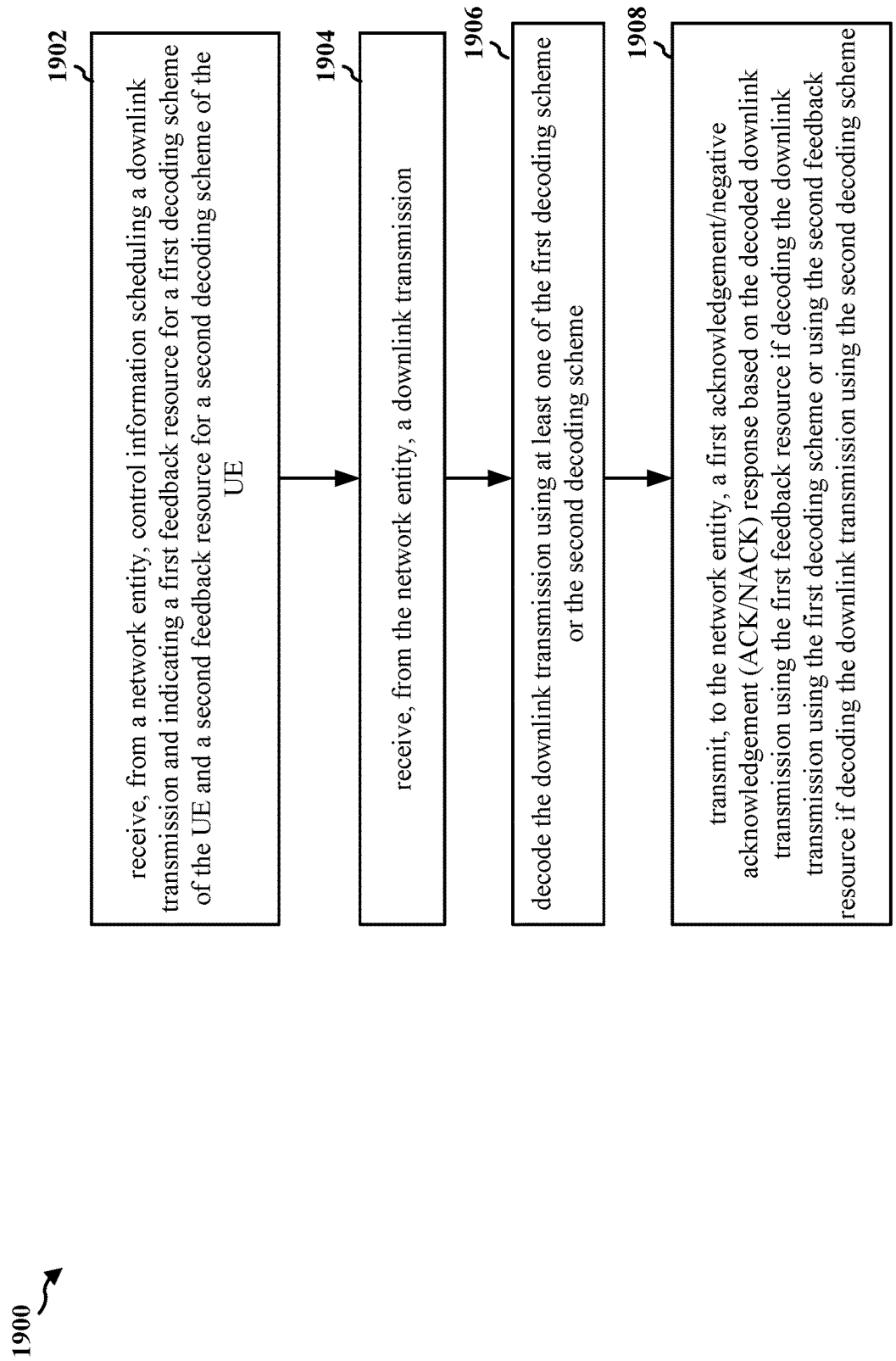
FIG. 19 is a flowchart of a method of wireless communication.

FIG. 19 is a flowchart 1900 of a method of wireless communication. The method may be performed by a UE (e.g., the UE 104; the UE 702; the apparatus 2602). At 1902, the UE may receive, from a network entity, control information scheduling a downlink transmission and indicating a first feedback resource for a first decoding scheme of the UE and a second feedback resource for a second decoding scheme of the UE. For example, 902 may be performed by the UE 702 in FIG. 7 which may receive a transmission from the network entity 704, in a transmission 716, having control information scheduling downlink transmission and indicating multiple feedback resources. The multiple feedback resources could be a first feedback resource 1 of PUCCH 636 in FIG. 6 for a first decoding scheme of the UE, such as an MMSE decoding scheme, and a second feedback resource 2 of PUCCH 638 for a second decoding scheme of the UE, such as an NL decoding scheme. Further, 1902 may be performed by the dynamic ACK/NACK transmission component 2640 in FIG. 26.

At 1904, the UE may receive, from the network entity, a downlink transmission. For example, 1904 may be performed by the UE 702 in FIG. 7 that may receive, from the network entity 704, a downlink transmission 718. Further, 1904 may be performed by the dynamic ACK/NACK transmission component 2640 in FIG. 26.

At 1906, the UE may decode the downlink transmission using at least one of the first decoding scheme or the second decoding scheme. For example, 1906 may be performed by the UE 702 in FIG. 7 that decodes at 726 the downlink transmission using a demodulation scheme, which may be an MMSE decoding scheme or an NL decoding scheme.

Figure 26:
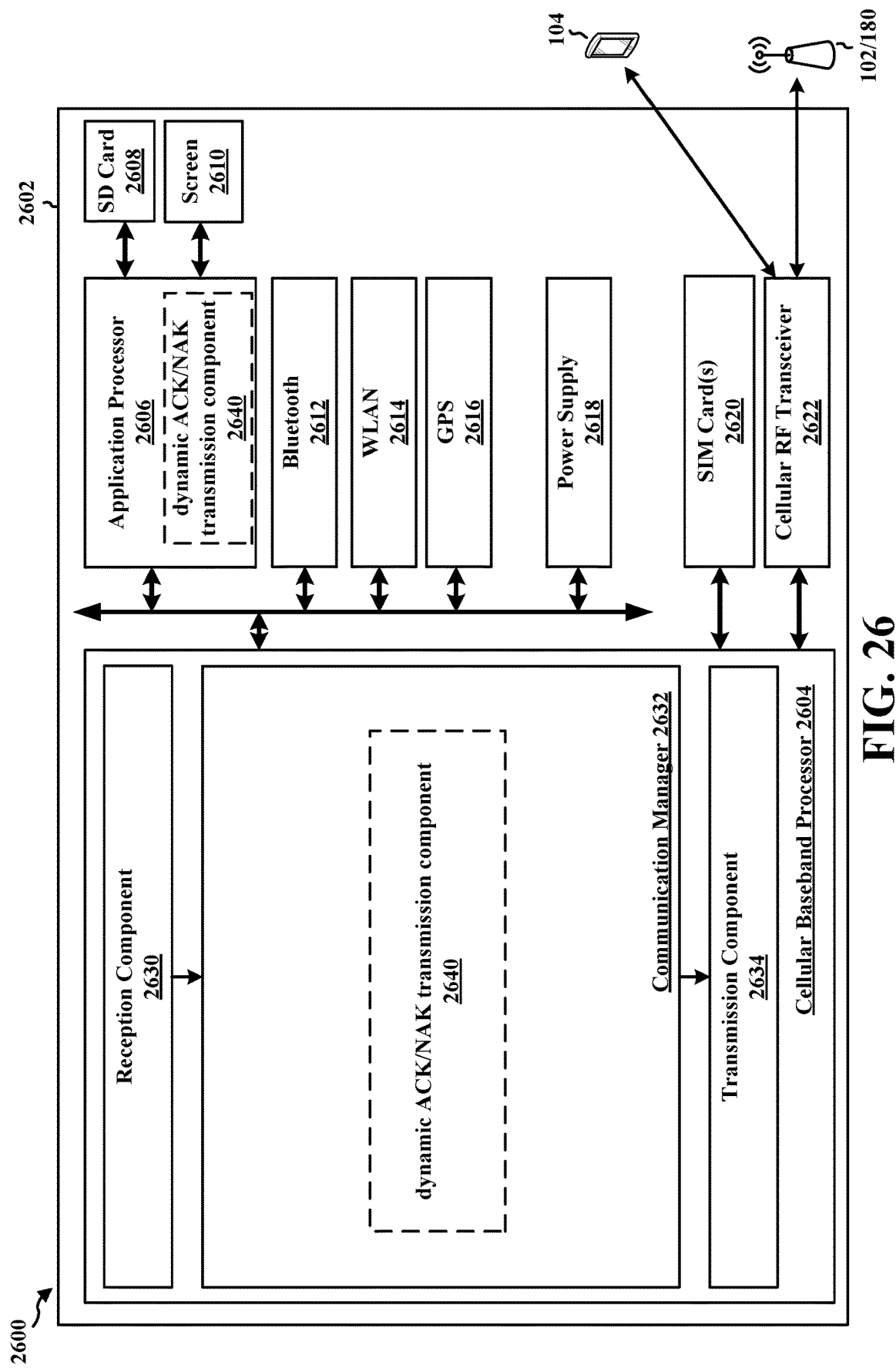
FIG. 26 is a diagram illustrating an example of a hardware implementation for an example apparatus.

Further, 902 may be performed by the dynamic ACK/NACK transmission component 2640 in FIG. 26.

At 1908, the UE may transmit, to the network entity, a first ACK/NACK response based on the decoded downlink transmission using the first feedback resource if decoding the downlink transmission using the first decoding scheme or using the second feedback resource if decoding the downlink transmission using the second decoding scheme. For example, 1908 may be performed by the UE 702 in FIG. 7, which may transmit an ACK/NACK response 720 using one of the multiple feedback resources. The multiple feedback resources could be a first feedback resource 1 of PUCCH 636 in FIG. 6 for a first decoding scheme of the UE, such as an MMSE decoding scheme, and a second feedback resource 2 of PUCCH 638 for a second decoding scheme of the UE, such as an NL decoding scheme. Further, 1908 may be performed by the dynamic ACK/NACK transmission component 2640 in FIG. 26.

Figure 20:
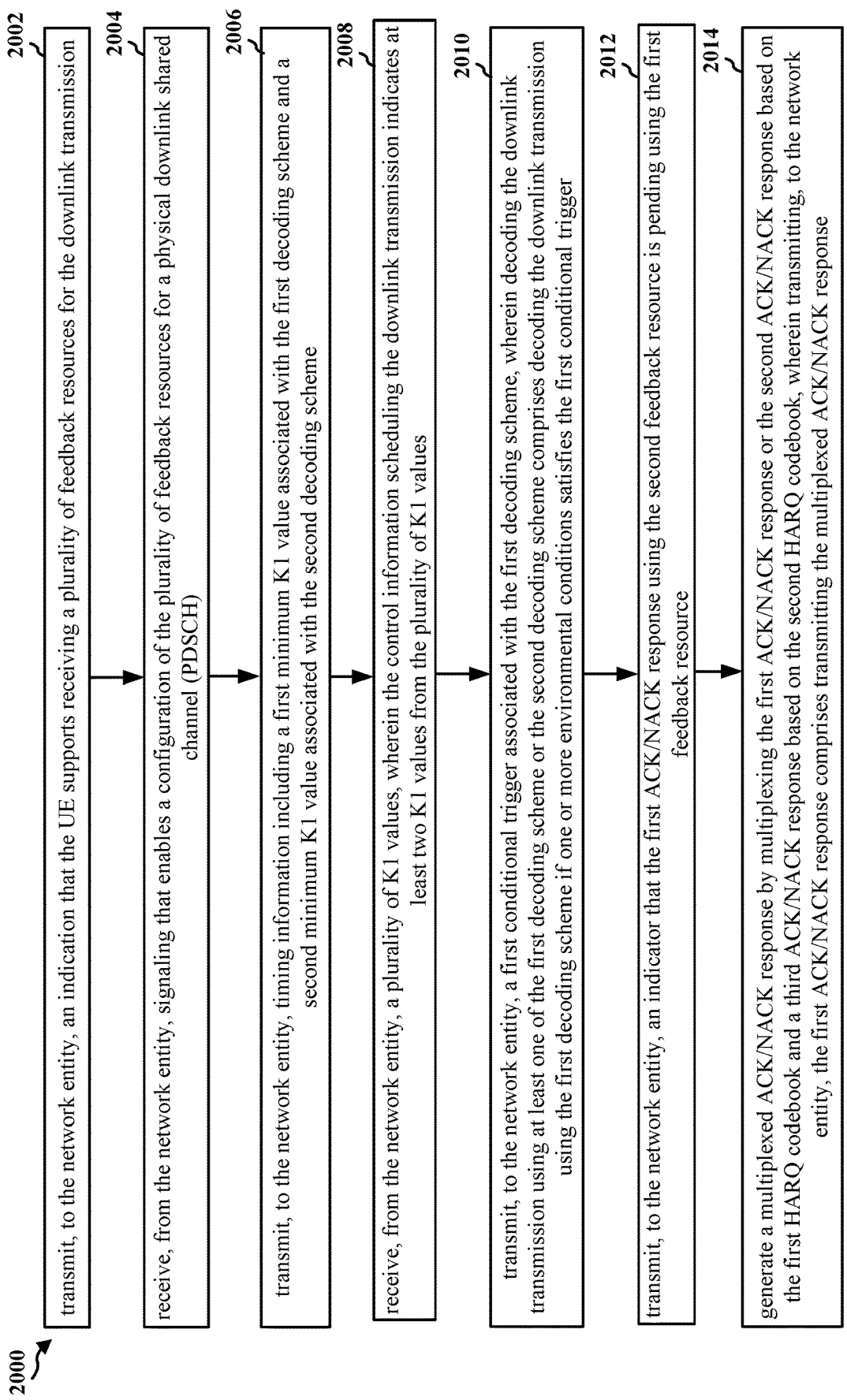
FIG. 20 is another flowchart of a method of wireless communication.

FIG. 20 is a flowchart 2000 of a method of wireless communication. The method may be performed by a UE (e.g., the UE 104; the UE 702; the apparatus 2602). At 2002, the UE may transmit, to the network entity, an indication that the UE supports receiving a plurality of feedback resources for the downlink transmission. For example, 2002 may be performed by the UE 702 in FIG. 7, which may transmit, to the network entity 704, an indication in a transmission 712 that the UE 702 supports receiving a plurality of feedback resources for the downlink transmission 718 transmitted from the network entity 704 to the UE 702. Further, 2002 may be performed by the dynamic ACK/NACK transmission component 2640 in FIG. 26.

At 2004, the UE may receive, from the network entity, signaling that enables a configuration of the plurality of feedback resources for a PDSCH. For example, 2004 may be performed by the UE 702 which may receive, from the network entity 704, signaling that enables a configuration of the plurality of feedback resources for a PDSCH. Further, 902 may be performed by the dynamic ACK/NACK transmission component 2640 in FIG. 26.

At 2006, the UE may transmit, to the network entity, timing information including a first minimum K1 value associated with the first decoding scheme and a second minimum K1 value associated with the second decoding scheme. For example, 2006 may be performed by the UE 702 in FIG. 7 that transmits timing information in a transmission 714, where the timing information includes a first minimum K1 value associated with a first decoding scheme, such as an MMSC decoding scheme, and a second minimum K1 value associated with the second decoding scheme, such as an NL decoding scheme. Further, 2006 may be performed by the dynamic ACK/NACK transmission component 2640 in FIG. 26.

At 2008, the UE may receive, from the network entity, a plurality of K1 values, where the control information scheduling the downlink transmission indicates at least two K1 values from the plurality of K1 values. For example, 2008 may be performed by the UE 702 in FIG. 7 that may receive, from the network entity 704, a plurality of K1 values via a transmission 714 of timing information of minimum K1 values associated with decoding schemes. The transmitted control information, in a transmission 716, scheduling downlink information may indicate at least two K1 values from the plurality of K1 values. For example, the network entity 704 may be configured to transmit a DCI in a transmission 716 to the UE 702 that selects a plurality of K1 values. Further, 2008 may be performed by the dynamic ACK/NACK transmission component 2640 in FIG. 26.

At 2010, the UE may transmit, to the network entity, a first conditional trigger associated with the first decoding scheme, where decoding the downlink transmission using at least one of the first decoding scheme or the second decoding scheme may include decoding the downlink transmission using the first decoding scheme if one or more environmental conditions satisfies the first conditional trigger. For example, 2010 may be performed by the UE 702 in FIG. 7 that may transmit a conditional trigger associated with the first decoding scheme in a transmission 712, which may be a MMSE decoding scheme. The UE may decode the downlink transmission using the MMSE decoding scheme if one or more environmental conditions satisfies the first conditional trigger, such as an MCS value, a rank value, a battery level of the UE, or channel statistics derived from channel measurements. Further, 2010 may be performed by the dynamic ACK/NACK transmission component 2640 in FIG. 26.

At 2012, the UE may transmit, to the network entity, an indicator that the first ACK/NACK response using the second feedback resource is pending using the first feedback resource. For example, 2012 may be performed by the UE 702 in FIG. 7 to transmit, to the network entity 704, and indicator, such as the ACK/NACK response using feedback resource 1 of PUCCH 1028 in FIG. 10 having a pending status bit. The pending status bit using the feedback resource 1 of PUCCH 1028 indicates that the ACK/NACK response using the feedback resource 2 of PUCCH 1029 is pending. Further, 2012 may be performed by the dynamic ACK/NACK transmission component 2640 in FIG. 26.

At 2014, the UE may generate a multiplexed ACK/NACK response by multiplexing the first ACK/NACK response or the second ACK/NACK response based on the first HARQ codebook and a third ACK/NACK response based on the second HARQ codebook, where transmitting, to the network entity, the first ACK/NACK response may include transmitting the multiplexed ACK/NACK response. For example, 2014 may be performed by the UE 702 in FIG. 7, which may generate a multiplexed ACK/NACK response by multiplexing a first ACK/NACK response, such as the ACK/NACK response transmitted using feedback resource 1 of PUCCH 1728, or a second ACK/NACK response, such as the ACK/NACK response transmitted using feedback resource 2 of PUCCH 1729, based on the codebook of CC1 1720, and a third ACK/NACK response, such as the ACK/NACK response transmitted using the feedback resource of PUCCH 1738 based on the codebook of CC2 1730. The UE 702 in FIG. 7 may transmit such a multiplexed ACK/NACK response to the network entity 704. Further, 902 may be performed by the dynamic ACK/NACK transmission component 2640 in FIG. 26.

Figure 21:
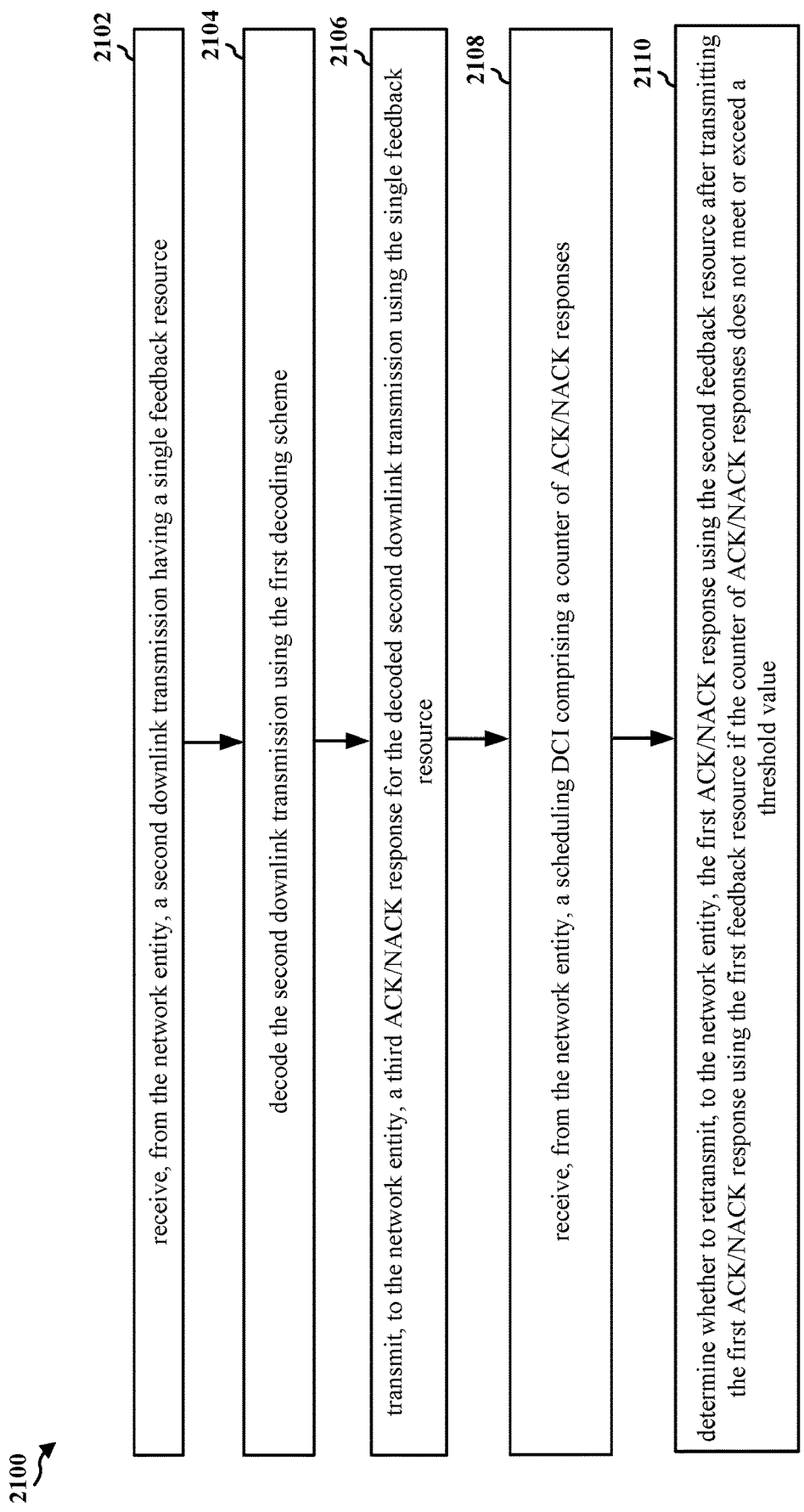
FIG. 21 is another flowchart of a method of wireless communication.

FIG. 21 is a flowchart 2100 of a method of wireless communication. The method may be performed by a UE (e.g., the UE 104; the UE 702; the apparatus 2602). At 2102, the UE may receive, from the network entity, a second downlink transmission having a single feedback resource. For example, 2102 may be performed by the UE 702 in FIG. 7 that may receive, from the network entity 704, a second downlink transmission, such as the PDSCH 1732 in FIG. 17, having a single feedback resource of PUCCH 1738. Further, 2102 may be performed by the dynamic ACK/NACK transmission component 2640 in FIG. 26.

At 2104, the UE may decode the second downlink transmission using the first decoding scheme. For example, 2104 may be performed by the UE 702 in FIG. 7 that may decode the second downlink transmission of PDSCH 1732 using the same decoding scheme that is used to decode the downlink transmission of PDSCH 1722. Further, 2104 may be performed by the dynamic ACK/NACK transmission component 2640 in FIG. 26.

At 2106, the UE may transmit, to the network entity, a third ACK/NACK response for the decoded second downlink transmission using the single feedback resource. For example, 2106 may be performed by the UE 702 in FIG. 7 that may transmit, to the network entity 704, a third ACK/NACK response, such as the ACK/NACK response for the decoding of the PDSCH 1732 using the feedback resource of PUCCH 1738. Further, 2106 may be performed by the dynamic ACK/NACK transmission component 2640 in FIG. 26.

At 2108, the UE may receive, from the network entity, a scheduling DCI may include a counter of ACK/NACK responses. For example, 2108 may be performed by the UE 702 in FIG. 7 receiving, from the network entity 704, a scheduling DCI that may include a counter of ACT/NACK responses, such as the cFR in the DCI 3 of PDCCH 1441 in FIG. 14. Further, 2108 may be performed by the dynamic ACK/NACK transmission component 2640 in FIG. 26.

At 2110, the UE may determine whether to retransmit, to the network entity, the first ACK/NACK response using the second feedback resource after transmitting the first ACK/NACK response using the first feedback resource if the counter of ACK/NACK responses does not meet or exceed a threshold value. For example, 2110 may be performed by the UE 702 in FIG. 7 that may determine whether to retransmit, to the network entity 704, the first ACK/NACK response using the ACK/NACK feedback resource 2 of PUCCH 1429 in FIG. 14 that was previously transmitted using the ACK/NACK feedback resource 1 of PUCCH 1428 if the counter cFR of ACK/NACK responses in the DCI of PDCCH 1441 does not meet or exceed the threshold value of 1. Further, 2110 may be performed by the dynamic ACK/NACK transmission component 2640 in FIG. 26.

Figure 22:
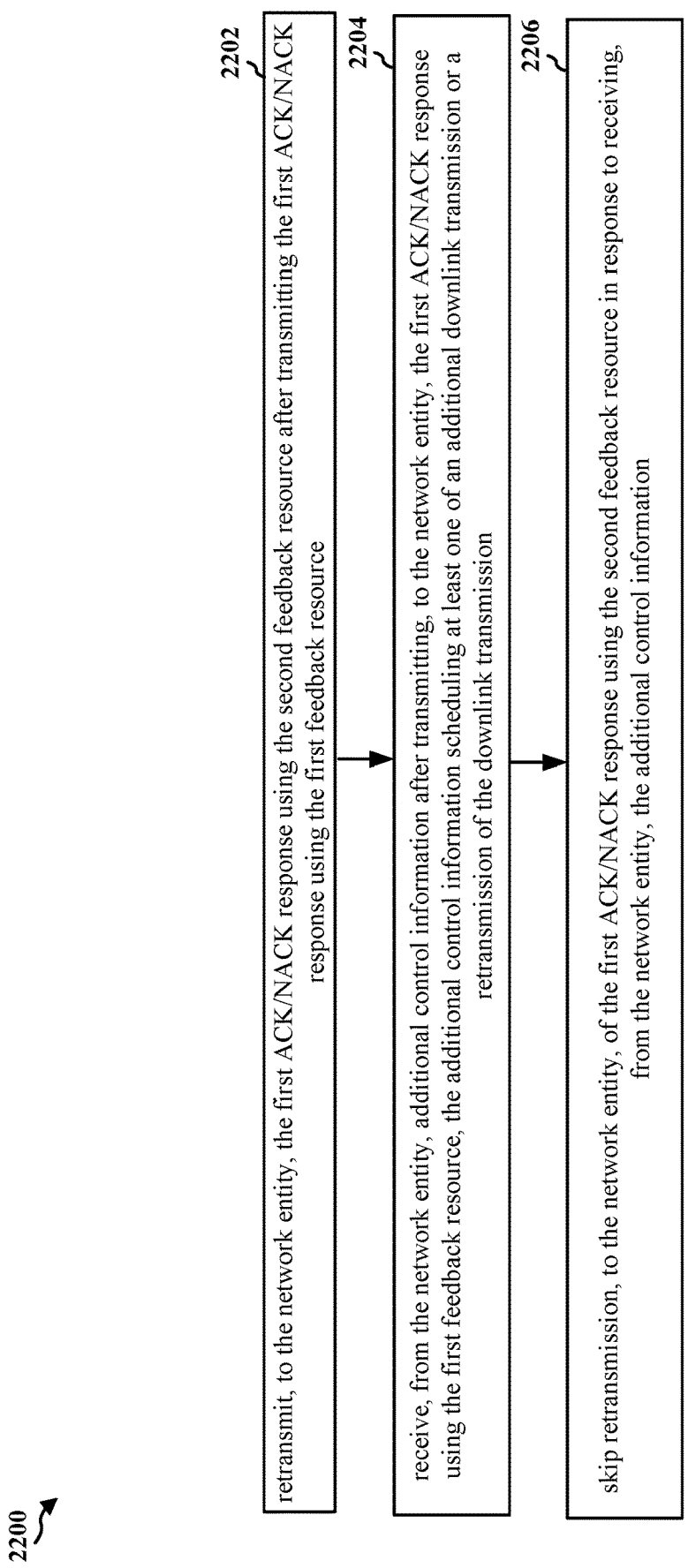
FIG. 22 is another flowchart of a method of wireless communication.

FIG. 22 is a flowchart 2200 of a method of wireless communication. The method may be performed by a UE (e.g., the UE 104; the UE 702; the apparatus 2602). At 2202, the UE may retransmit, to the network entity, the first ACK/NACK response using the second feedback resource after transmitting the first ACK/NACK response using the first feedback resource. For example, 2202 may be performed by the UE 702 in FIG. 7 that may retransmit, to the network entity 704, the ACK/NACK response using feedback resource 2 of PUCCH 1629 that was previously transmitted using feedback resource 1 of PUCCH 1628. Further, 2202 may be performed by the dynamic ACK/NACK transmission component 2640 in FIG. 26.

At 2204, the UE may receive, from the network entity, additional control information after transmitting, to the network entity, the first ACK/NACK response using the first feedback resource, the additional control information scheduling at least one of an additional downlink transmission or a retransmission of the downlink transmission. For example, 2204 may be performed by the UE 702 in FIG. 7 that may receive, from the network entity 704, additional control information in the DCI 3 of PDCCH 1541 in FIG. 15 after transmitting, to the network entity 704, the first ACK/NACK response using the feedback resource 1 of PUCCH 1528. The additional control information in the DCI 3 of PDCCH 1541 in FIG. 15 may be an additional new downlink transmission or a retransmission of a previous downlink transmission, such as a retransmission of PDSCH 1522 using PDSCH 1542. Further, 2204 may be performed by the dynamic ACK/NACK transmission component 2640 in FIG. 26.

At 2206, the UE may skip retransmission, to the network entity, of the first ACK/NACK response using the second feedback resource in response to receiving, from the network entity, the additional control information. For example, 2206 may be performed by the UE 702 in FIG. 7 that may skip retransmission, to the network entity 704, of the first ACK/NACK response using the feedback resource 2 of PUCCH 1529 in response to receiving, from the network entity 704, the additional control information in DCI 3 of PDCCH 1541. Further, 2206 may be performed by the dynamic ACK/NACK transmission component 2640 in FIG. 26.

Figure 23:
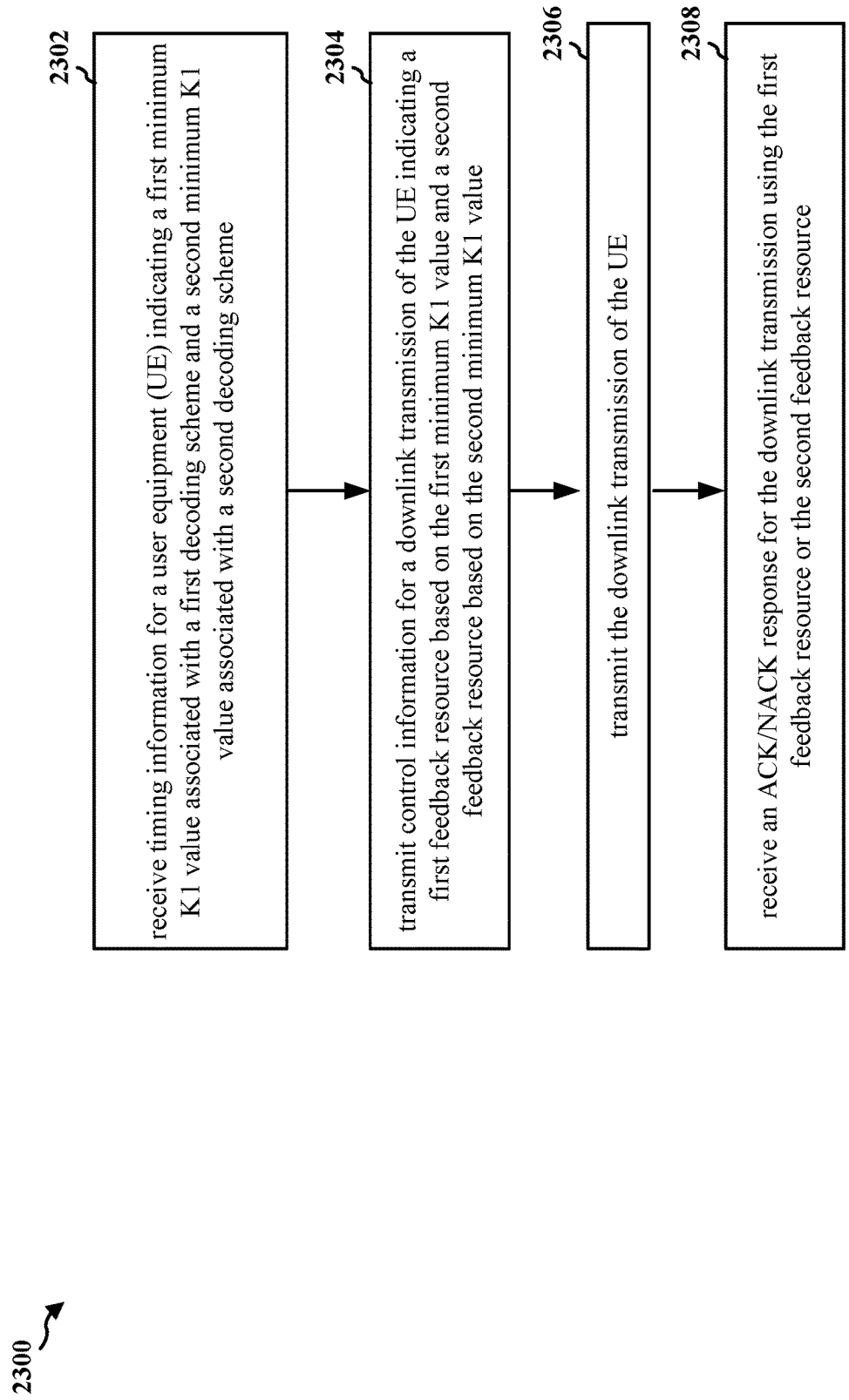
FIG. 23 is another flowchart of a method of wireless communication.

FIG. 23 is a flowchart 2300 of a method of wireless communication. The method may be performed by a network entity (e.g., the base station 102/180; the CU 410, the DU 430, the RU 440, any combination of the CU 410 and DU 430 and RU 440, the network entity 704, the apparatus 2702). The network entity or network node may be implemented as a base station (i.e., an aggregated base station), as a disaggregated base station, an IAB node, a relay node, a CU, a DU, a RU, a Near-RT RIC, or a Non-RT RIC in a disaggregated base station architecture, etc. At 2302, the network entity may receive timing information for a user equipment (UE) indicating a first minimum K1 value associated with a first decoding scheme and a second minimum K1 value associated with a second decoding scheme. For example, 2302 may be performed by the network entity 704 in FIG. 7 that may receive timing information in a transmission 714 for the UE 702 indicating minimum K1 values associated with decoding schemes of the UE 702. Further, 2302 may be performed by the dynamic ACK/NACK reception component 2740 in FIG. 27.

At 2304, the network entity may transmit control information for a downlink transmission of the UE indicating a first feedback resource based on the first minimum K1 value and a second feedback resource based on the second minimum K1 value. For example, 2304 may be performed by the network entity 704 in FIG. 7, which may transmit control information for downlink transmission of the UE 702 in a transmission 716 indicating a first feedback resource based on the first minimum K1 value, such as the ACK/NACK feedback resource 1 of PUCCH 636 and the ACK/NACK feedback resource 2 of PUCCH 638. Further, 902 may be performed by the dynamic ACK/NACK reception component 2740 in FIG. 27.

At 2306, the network entity may transmit the downlink transmission of the UE. For example, 2306 may be performed by the network entity 704 in FIG. 7 that may transmit the downlink transmission 718 of the UE 702. Further, 2306 may be performed by the dynamic ACK/NACK reception component 2740 in FIG. 27.

At 2308, the network entity may receive an ACK/NACK response for the downlink transmission using the first feedback resource or the second feedback resource. For example, 2308 may be performed by the network entity 704 in FIG. 7 that may receive an ACK/NACK response 720 for the downlink transmission 718 transmitted by the network entity 704 using one of the multiple feedback resources. Further, 2318 may be performed by the dynamic ACK/NACK reception component 2740 in FIG. 27.

Figure 24:
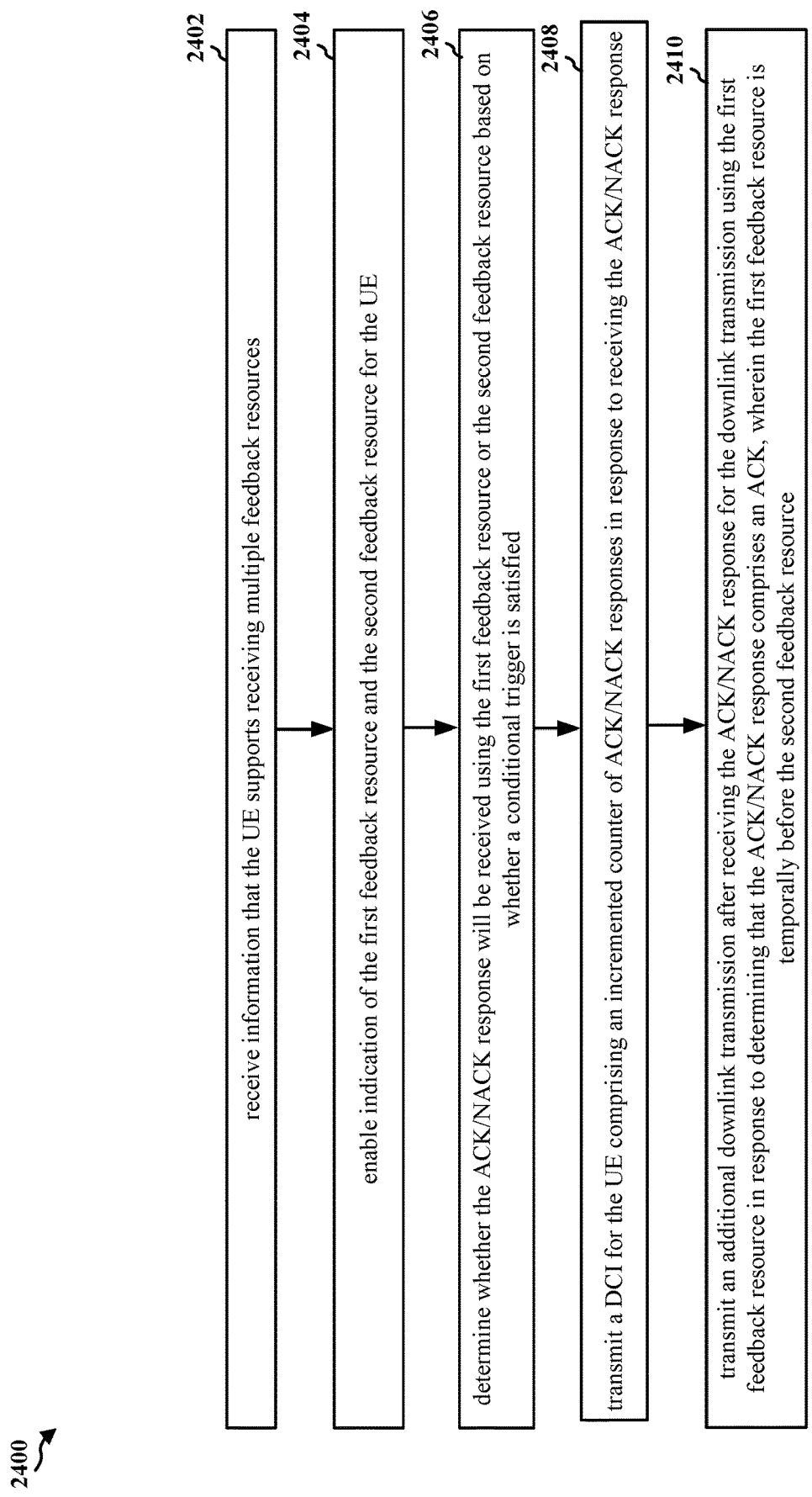
FIG. 24 is another flowchart of a method of wireless communication.

FIG. 24 is a flowchart 2400 of a method of wireless communication. The method may be performed by a network entity (e.g., the base station 102/180; the CU 410, the DU 430, the RU 440, any combination of the CU 410 and DU 430 and RU 440, the network entity 704, the apparatus 2702). The network entity or network node may be implemented as a base station (i.e., an aggregated base station), as a disaggregated base station, an IAB node, a relay node, a CU, a DU, a RU, a Near-RT RIC, or a Non-RT RIC in a disaggregated base station architecture, etc. At 2402, the network entity may receive information that the UE supports receiving multiple feedback resources. For example, 2402 may be performed by the network entity 704 in FIG. 7 that may receive information in a transmission 712 that the UE 702 supports receiving multiple feedback resources. Further, 2402 may be performed by the dynamic ACK/NACK reception component 2740 in FIG. 27.

At 2404, the network entity may enable indication of the first feedback resource and the second feedback resource for the UE. For example, 2404 may be performed by the network entity 704 in FIG. 7 that may enable indication of the first feedback resource and the second feedback resource for the UE 702 by transmitting control information, in a transmission 716, indicating multiple feedback resources. Further, 2404 may be performed by the dynamic ACK/NACK reception component 2740 in FIG. 27.

At 2406, the network entity may determine whether the ACK/NACK response will be received using the first feedback resource or the second feedback resource based on whether a conditional trigger is satisfied. For example, 2406 may be performed by the network entity 704 in FIG. 7 that may determine at 725 whether the ACK/NACK response will be received based upon conditions. Further, 2406 may be performed by the dynamic ACK/NACK reception component 2740 in FIG. 27.

At 2408, the network entity may transmit a DCI for the UE including an incremented counter of ACK/NACK responses in response to receiving the ACK/NACK response. For example, 2408 may be performed by the network entity 704 in FIG. 7, that may transmit control information, in a transmission 716, as a DCI for the UE 702. The DCI may include an incremented counter of ACK/NACK responses, such as the DCI 3 of PDCCH 1441 in FIG. 14 that increments the cFR after receiving an ACK/NACK response using feedback resource 1 of PUCCH 1428. Further, 2408 may be performed by the dynamic ACK/NACK reception component 2740 in FIG. 27.

At 2410, the network entity may transmit an additional downlink transmission after receiving the ACK/NACK response for the downlink transmission using the first feedback resource in response to determining that the ACK/NACK response includes an ACK, where the first feedback resource is temporally before the second feedback resource. For example, 2410 may be performed by the network entity 704 in FIG. 7 that may transmit an additional downlink transmission, such as PDSCH 1442 in FIG. 14, after receiving an ACK using feedback resource 1 of PUCCH 1428 for the downlink transmission PDSCH 1422. The feedback resource 1 of PUCCH 1428 is temporally before the feedback resource 2 of PUCCH 1429. Further, 2410 may be performed by the dynamic ACK/NACK reception component 2740 in FIG. 27.

Figure 25:
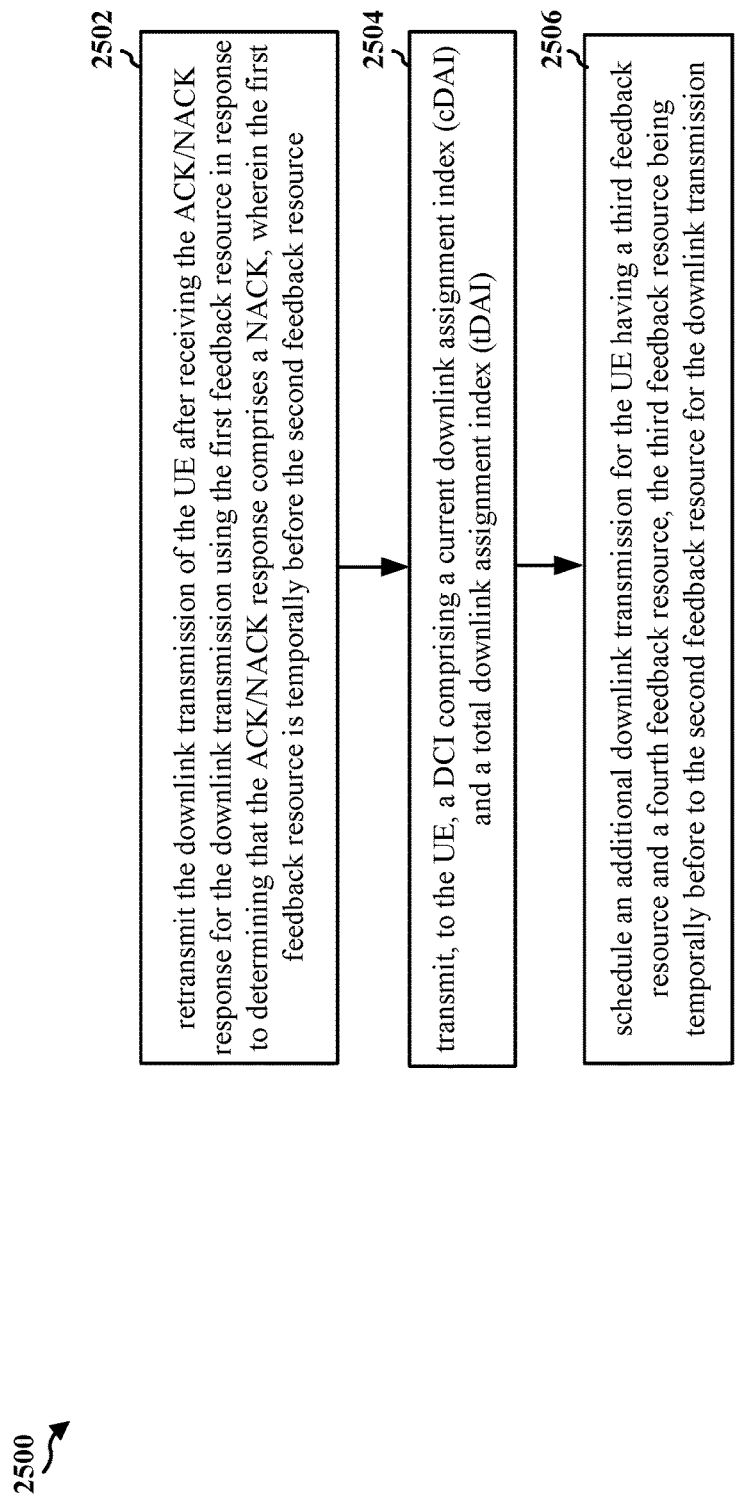
FIG. 25 is another flowchart of a method of wireless communication.

FIG. 25 is a flowchart 2500 of a method of wireless communication. The method may be performed by a network entity (e.g., the base station 102/180; the CU 410, the DU 430, the RU 440, any combination of the CU 410 and DU 430 and RU 440, the network entity 704, the apparatus 2702). The network entity or network node may be implemented as a base station (i.e., an aggregated base station), as a disaggregated base station, an IAB node, a relay node, a CU, a DU, a RU, a Near-RT RIC, or a Non-RT RIC in a disaggregated base station architecture, etc. At 2402, the network entity may retransmit the downlink transmission of the UE after receiving the ACK/NACK response for the downlink transmission using the first feedback resource in response to determining that the ACK/NACK response includes a NACK, where the first feedback resource is temporally before the second feedback resource. For example, 2502 may be performed by the network entity 704 in FIG. 7 that may retransmit the downlink transmission of PDSCH 1622 in response to determining that the ACK/NACK response transmitted using the feedback resource 1 of PUCCH 1628 includes a NACK. The feedback resource 1 of PUCCH 1628 is temporally before the feedback resource 2 of PUCCH 1629. Further, 902 may be performed by the dynamic ACK/NACK reception component 2740 in FIG. 27.

At 2504, the network entity may transmit, to the UE, a DCI includes a cDAI and a tDAI. For example, 2504 may be performed by the network entity 704 in FIG. 7 that may transmit, to the UE 702, a DCI, such as the DCI 3 of PDCCH 1441 that includes a cDAI and a tDAI. Further, 2504 may be performed by the dynamic ACK/NACK reception component 2740 in FIG. 27.

At 2506, the network entity may schedule an additional downlink transmission for the UE having a third feedback resource and a fourth feedback resource, the third feedback resource being temporally before the second feedback resource for the downlink transmission. For example, 2506 may be performed by network entity 704 in FIG. 7, which may schedule an additional downlink transmission of PDSCH 1834 in FIG. 18 for the UE 702 having a feedback resource 2-1 of PUCCH 1835 and feedback resource 2-2 of PUCCH 1836. The feedback resource 2-1 of PUCCH 1835 is temporally before the feedback resource 1-2 of PUCCH 1826. Further, 2506 may be performed by the dynamic ACK/NACK reception component 2740 in FIG. 27.

FIG. 26 is a diagram 2600 illustrating an example of a hardware implementation for an apparatus 2602. The apparatus 2602 may be a UE, a component of a UE, or may implement UE functionality. In some aspects, the apparatus 2602 may include a cellular baseband processor 2604 (also referred to as a modem) coupled to a cellular RF transceiver 2622. In some aspects, the apparatus 2602 may further include one or more subscriber identity modules (SIM) cards 2620, an application processor 2606 coupled to a secure digital (SD) card 2608 and a screen 2610, a Bluetooth module 2612, a wireless local area network (WLAN) module 2614, a Global Positioning System (GPS) module 2616, or a power supply 2618. The cellular baseband processor 2604 communicates through the cellular RF transceiver 2622 with the UE 104 and/or BS 102/180. The cellular baseband processor 2604 may include a computer-readable medium/memory. The computer-readable medium/memory may be non-transitory. The cellular baseband processor 2604 is responsible for general processing, including the execution of software stored on the computer-readable medium/memory. The software, when executed by the cellular baseband processor 2604, causes the cellular baseband processor 2604 to perform the various functions described supra. The computer-readable medium/memory may also be used for storing data that is manipulated by the cellular baseband processor 2604 when executing software. The cellular baseband processor 2604 further includes a reception component 2630, a communication manager 2632, and a transmission component 2634. The communication manager 2632 includes the one or more illustrated components. The components within the communication manager 2632 may be stored in the computer-readable medium/memory and/or configured as hardware within the cellular baseband processor 2604. The cellular baseband processor 2604 may be a component of the UE 350 and may include the memory 360 and/or at least one of the Tx processor 368, the Rx processor 356, and the controller/processor 359. In one configuration, the apparatus 2602 may be a modem chip and include just the baseband processor 2604, and in another configuration, the apparatus 2602 may be the entire UE (e.g., see UE 350 of FIG. 3) and include the additional modules of the apparatus 2602.

The communication manager 2632 includes a dynamic ACK/NACK transmission component 2640 that is configured to transmit ACK/NACK responses using a plurality of feedback resources scheduled for a downlink transmission, e.g., as described in connection with step 1908 in FIG. 19. The dynamic ACK/NACK transmission component 2640 may be within the cellular baseband processor _2604, the application processor _2606, or both the cellular baseband processor _2604 and the application processor _2606.

The apparatus may include additional components that perform each of the blocks of the algorithm in the flowcharts of FIGS. 19-24. As such, each block in the flowcharts of FIGS. 19-24 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2602 may include a variety of components configured for various functions. In one configuration, the apparatus 2602, and in particular the cellular baseband processor 2604, includes means for receiving, from a network entity, control information scheduling a downlink transmission and indicating a first feedback resource for a first decoding scheme of the UE and a second feedback resource for a second decoding scheme of the UE, means for receiving, from the network entity, a downlink transmission, means for decoding the downlink transmission using at least one of the first decoding scheme or the second decoding scheme, means for transmitting, to the network entity, a first ACK/NACK response based on the decoded downlink transmission using the first feedback resource if decoding the downlink transmission using the first decoding scheme or using the second feedback resource if decoding the downlink transmission using the second decoding scheme, means for transmitting, to the network entity, an indication that the UE supports receiving a plurality of feedback resources for the downlink transmission, means for receiving, from the network entity, signaling that enables a configuration of the plurality of feedback resources for a PDSCH, means for transmitting, to the network entity, timing information including a first minimum K1 value associated with the first decoding scheme and a second minimum K1 value associated with the second decoding scheme, means for receiving, from the network entity, a plurality of K1 values, where the control information scheduling the downlink transmission indicates at least two K1 values from the plurality of K1 values, means for transmitting, to the network entity, a first conditional trigger associated with the first decoding scheme, where decoding the downlink transmission using at least one of the first decoding scheme or the second decoding scheme includes decoding the downlink transmission using the first decoding scheme if one or more environmental conditions satisfies the first conditional trigger, means for transmitting, to the network entity, an indicator that the first ACK/NACK response using the second feedback resource is pending using the first feedback resource, means for generating a multiplexed ACK/NACK response by multiplexing the first ACK/NACK response or the second ACK/NACK response based on the first HARQ codebook and a third ACK/NACK response based on the second HARQ codebook, where transmitting, to the network entity, the first ACK/NACK response includes transmitting the multiplexed ACK/NACK response, means for receiving, from the network entity, a second downlink transmission having a single feedback resource, means for decoding the second downlink transmission using the first decoding scheme, means for transmitting, to the network entity, a third ACK/NACK response for the decoded second downlink transmission using the single feedback resource, means for receiving, from the network entity, a scheduling DCI including a counter of ACK/NACK responses, means for determining whether to retransmit, to the network entity, the first ACK/NACK response using the second feedback resource after transmitting the first ACK/NACK response using the first feedback resource if the counter of ACK/NACK responses does not meet or exceed a threshold value, means for retransmitting, to the network entity, the first ACK/NACK response using the second feedback resource after transmitting the first ACK/NACK response using the first feedback resource, means for receiving, from the network entity, additional control information after transmitting, to the network entity, the first ACK/NACK response using the first feedback resource, the additional control information scheduling at least one of an additional downlink transmission or a retransmission of the downlink transmission, and means for skipping retransmission, to the network entity, of the first ACK/NACK response using the second feedback resource in response to receiving, from the network entity, the additional control information. The means may be one or more of the components of the apparatus 2602 configured to perform the functions recited by the means. As described supra, the apparatus 2602 may include the Tx processor 368, the Rx processor 356, and the controller/processor 359. As such, in one configuration, the means may be the Tx processor 368, the Rx processor 356, and the controller/processor 359 configured to perform the functions recited by the means.

Figure 27:
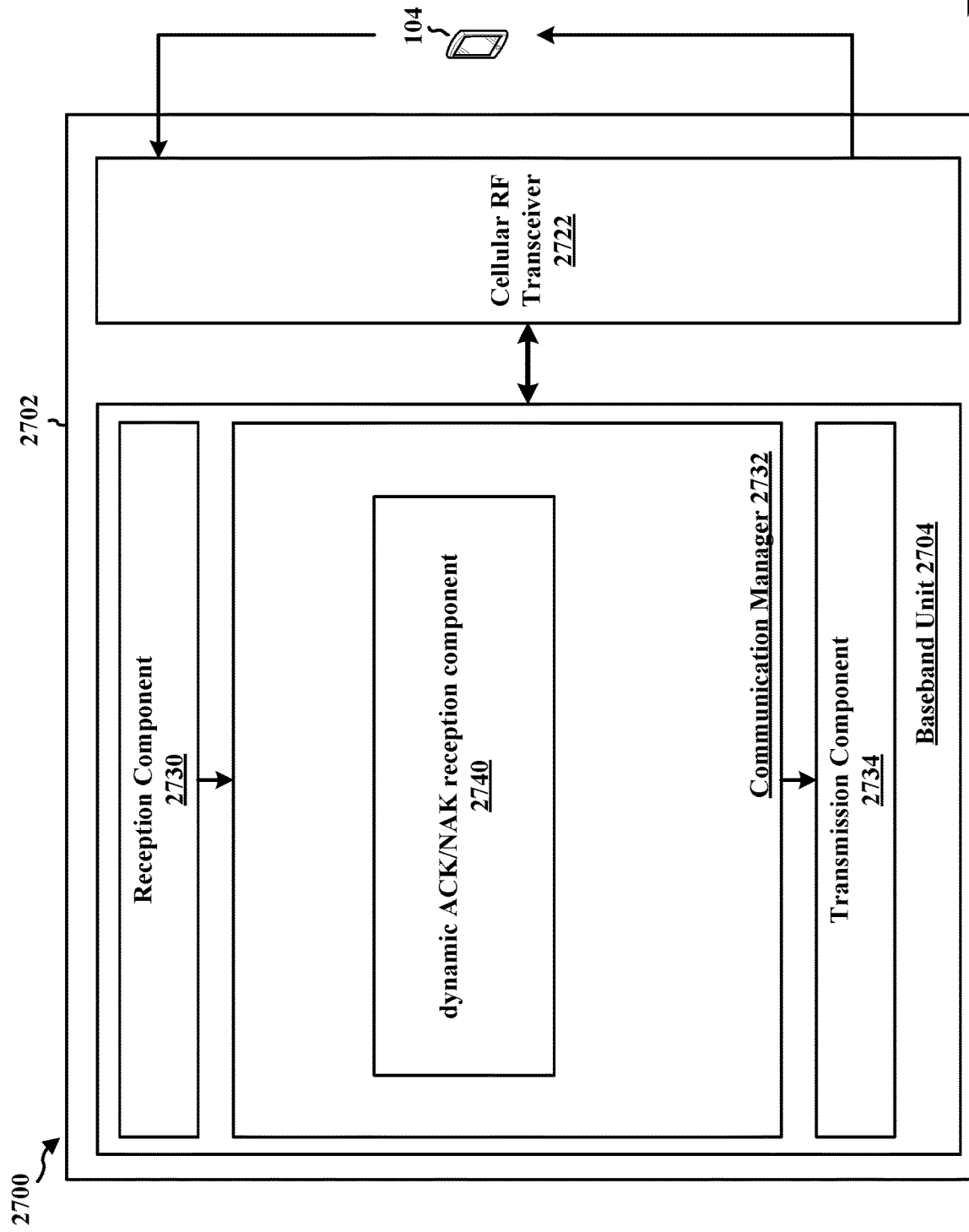
FIG. 27 is a diagram illustrating an example of a hardware implementation for an example apparatus.

FIG. 27 is a diagram 2700 illustrating an example of a hardware implementation for an apparatus 2702. The apparatus 2702 may be a base station, a component of a base station, or may implement base station functionality. The apparatus 2702 may be implemented as a base station (i.e., an aggregated base station), as a disaggregated base station, an IAB node, a relay node, a CU, a DU, a RU, a Near-RT RIC, or a Non-RT RIC in a disaggregated base station architecture, etc. In some aspects, the apparatus 2602 may include a baseband unit 2704. The baseband unit 2704 may communicate through a cellular RF transceiver 2722 with the UE 104. The baseband unit 2704 may include a computer-readable medium/memory. The baseband unit 2704 is responsible for general processing, including the execution of software stored on the computer-readable medium/memory. The software, when executed by the baseband unit 2704, causes the baseband unit 2704 to perform the various functions described supra. The computer-readable medium/memory may also be used for storing data that is manipulated by the baseband unit 2704 when executing software. The baseband unit 2704 further includes a reception component 2730, a communication manager 2732, and a transmission component 2734. The communication manager 2732 includes the one or more illustrated components. The components within the communication manager 2732 may be stored in the computer-readable medium/memory and/or configured as hardware within the baseband unit 2704. The baseband unit 2704 may be a component of the base station 310 and may include the memory 376 and/or at least one of the Tx processor 316, the Rx processor 370, and the controller/processor 375.

The communication manager 2732 includes a dynamic ACK/NACK reception component 2740 that receives ACK/NACK responses for a downlink transmission using a plurality of feedback resources, e.g., as described in connection with 2302 in FIG. 23.

The apparatus may include additional components that perform each of the blocks of the algorithm in the flowcharts of FIGS. 23-25. As such, each block in the flowcharts of FIGS. 23-25 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2702 may include a variety of components configured for various functions. In one configuration, the apparatus 2702, and in particular the baseband unit 2704, includes means for receiving timing information for a user equipment (UE) indicating a first minimum K1 value associated with a first decoding scheme and a second minimum K1 value associated with a second decoding scheme, means for transmitting control information for a downlink transmission of the UE indicating a first feedback resource based on the first minimum K1 value and a second feedback resource based on the second minimum K1 value, means for transmitting the downlink transmission of the UE, means for receiving an ACK/NACK response for the downlink transmission using the first feedback resource or the second feedback resource, means for receiving an indication that the UE supports receiving multiple feedback resources, means for enabling indication of the first feedback resource and the second feedback resource for the UE, means for determining whether the ACK/NACK response will be received using the first feedback resource or the second feedback resource based on whether a conditional trigger is satisfied, means for transmitting a DCI for the UE including an incremented counter of ACK/NACK responses in response to receiving the ACK/NACK response, means for transmitting an additional downlink transmission after receiving the ACK/NACK response for the downlink transmission using the first feedback resource in response to determining that the ACK/NACK response includes an ACK, where the first feedback resource is temporally before the second feedback resource, means for retransmitting the downlink transmission of the UE after receiving the ACK/NACK response for the downlink transmission using the first feedback resource in response to determining that the ACK/NACK response includes a NACK, where the first feedback resource is temporally before the second feedback resource, means for transmitting, to the UE, a DCI including a cDAI and a tDAI, means for scheduling an additional downlink transmission for the UE having a third feedback resource and a fourth feedback resource, the third feedback resource being temporally before to the second feedback resource for the downlink transmission. The means may be one or more of the components of the apparatus 2702 configured to perform the functions recited by the means. As described supra, the apparatus 2702 may include the Tx processor 316, the Rx processor 370, and the controller/processor 375. As such, in one configuration, the means may be the Tx processor 316, the Rx processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, including receiving, from a network entity, control information scheduling a downlink transmission and indicating a first feedback resource for a first decoding scheme of the UE and a second feedback resource for a second decoding scheme of the UE. The method may further include receiving, from the network entity, a downlink transmission. The method may further include decoding the downlink transmission using at least one of the first decoding scheme or the second decoding scheme. The method may further include transmitting, to the network entity, a first ACK/NACK response based on the decoded downlink transmission using the first feedback resource if decoding the downlink transmission using the first decoding scheme or using the second feedback resource if decoding the downlink transmission using the second decoding scheme.

Aspect 2 is the method of aspect 1, further including transmitting, to the network entity, timing information including a first minimum K1 value associated with the first decoding scheme and a second minimum K1 value associated with the second decoding scheme.

Aspect 3 is the method of any of aspects 1-2, further including, transmitting, to the network entity, a first conditional trigger associated with the first decoding scheme, where decoding the downlink transmission using at least one of the first decoding scheme or the second decoding scheme includes decoding the downlink transmission using the first decoding scheme if one or more environmental conditions satisfies the first conditional trigger Aspect 4 is the method of any of aspects 1-3, further including transmitting, to the network entity, an indication that the UE supports receiving a plurality of feedback resources for the downlink transmission.

Aspect 5 is the method of aspect 4, further including receiving, from the network entity, signaling that enables a configuration of the plurality of feedback resources for a PDSCH.

Aspect 6 is the method of any of aspects 1-5, further including receiving, from the network entity, a plurality of K1 values, where the control information scheduling the downlink transmission indicates at least two K1 values from the plurality of K1 values Aspect 7 is the method of any of aspects 1-6, where the control information includes DCI having a plurality of fields or a plurality of sub-fields indicating the first feedback resource and the second feedback resource.

Aspect 8 is the method of any of aspects 1-7, further including transmitting to the network entity, an indicator that the first ACK/NACK response using the second feedback resource is pending using the first feedback resource Aspect 9 is the method of aspect 8, where the indicator includes a NACK.

Aspect 10 is the method of aspect 8, where the first ACK/NACK response includes an ACK/NACK indicator for each codebook (CB) of a codebook group (CBG) of the downlink transmission, where the indicator that the first ACK/NACK response is pending includes at least one bit of a second ACK/NACK response transmitted to the network entity using the first feedback resource, and where the second ACK/NACK response is transmitted using the first feedback resource before the first ACK/NACK response is transmitted using the second feedback resource.

Aspect 11 is the method of aspect 8, where the first ACK/NACK response includes an ACK/NACK indicator for a TB of the downlink transmission, where the indicator that the first ACK/NACK response is pending includes at least one bit of a second ACK/NACK response transmitted to the network entity using the first feedback resource, and where the second ACK/NACK response is transmitted using the first feedback resource before the first ACK/NACK response is transmitted using the second feedback resource Aspect 12 is the method of aspect 10, where the indicator is based on a first HARQ codebook associated with a plurality of feedback resources, the first HARQ codebook being different than a second HARQ codebook associated with a single feedback resource.

Aspect 13 is the method of aspect 12, where the at least one processor coupled to the memory is further configured to generate a multiplexed ACK/NACK response by multiplexing the first ACK/NACK response or the second ACK/NACK response based on the first HARQ codebook and a third ACK/NACK response based on the second HARQ codebook, where transmitting, to the network entity, the first ACK/NACK response includes transmitting the multiplexed ACK/NACK response.

Aspect 14 is the method of aspect 10, further including receiving, from the network entity, a second downlink transmission having a single feedback resource, decoding the second downlink transmission using the first decoding scheme, and transmitting, to the network entity, a third ACK/NACK response for the decoded second downlink transmission using the single feedback resource.

Aspect 15 is the method of any of aspects 1-14, further including retransmitting to the network entity, the first ACK/NACK response using the second feedback resource after transmitting the first ACK/NACK response using the first feedback resource.

Aspect 16 is the method of any of aspects 1-15, further including receiving, from the network entity, a scheduling DCI including a counter of ACK/NACK responses, and determining whether to retransmit, to the network entity, the first ACK/NACK response using the second feedback resource after transmitting the first ACK/NACK response using the first feedback resource if the counter of ACK/NACK responses does not meet or exceed a threshold value.

Aspect 17 is the method of any of aspects 1-16, further including receiving, from the network entity, additional control information after transmitting, to the network entity, the first ACK/NACK response using the first feedback resource, the additional control information scheduling at least one of an additional downlink transmission or a retransmission of the downlink transmission, and skipping retransmission, to the network entity, of the first ACK/NACK response using the second feedback resource in response to receiving, from the network entity, the additional control information.

Aspect 18 is the method of any of aspects 1-17, where the control information includes multiple downlink assignment index (DAI) counter values.

Aspect 19 is a method of wireless communication at a network entity, including receiving timing information for a user equipment (UE) indicating a first minimum K1 value associated with a first decoding scheme and a second minimum K1 value associated with a second decoding scheme. The method may also include transmitting control information for a downlink transmission of the UE indicating a first feedback resource based on the first minimum K1 value and a second feedback resource based on the second minimum K1 value. The method may also include transmitting the downlink transmission of the UE. The method may also include receiving an ACK/NACK response for the downlink transmission using the first feedback resource or the second feedback resource.

Aspect 20 is the method of aspect 19, further including receiving information that the UE supports receiving multiple feedback resources. The method may also include enabling indication of the first feedback resource and the second feedback resource for the UE.

Aspect 21 is the method of any of aspects 19-20, where indicating the first feedback resource and the second feedback resource includes indicating at least a first K1 value via one or more of an RRC or a scheduling DCI.

Aspect 22 is the method of aspect 21, where the scheduling DCI includes a first selection of the first K1 value from a first set of K1 values transmitted to the UE in a first RRC message.

Aspect 23 is the method of aspect 22, where the scheduling DCI includes a second selection of a second K1 value from the first set of K1 values Aspect 24 is the method of any of aspects 19-23, further including determining whether the ACK/NACK response will be received using the first feedback resource or the second feedback resource based on whether a conditional trigger is satisfied.

Aspect 25 is the method of any of aspects 19-24, further including transmitting a DCI for the UE including an incremented counter of ACK/NACK responses in response to receiving the ACK/NACK response.

Aspect 26 is the method of any of aspects 19-25, further including transmitting an additional downlink transmission after receiving the ACK/NACK response for the downlink transmission using the first feedback resource in response to determining that the ACK/NACK response includes an ACK, where the first feedback resource is temporally before the second feedback resource Aspect 27 is the method of any of aspects 19-26, further including retransmitting the downlink transmission of the UE after receiving the ACK/NACK response for the downlink transmission using the first feedback resource in response to determining that the ACK/NACK response includes a NACK, where the first feedback resource is temporally before the second feedback resource.

Aspect 28 is the method of any of aspects 19-27, further including transmitting, to the UE, a DCI including a cDAI and a tDAI.

Aspect 29 is an apparatus for wireless communication at a UE including at least one processor coupled to a memory and configured to implement any of aspects 1 to 19.

Aspect 30 is an apparatus for wireless communication at a network entity including at least one processor coupled to a memory and configured to implement any of aspects 20 to 28.

Aspect 31 is an apparatus for wireless communication including means for implementing any of aspects 1 to 28.

Aspect 32 is a computer-readable medium storing computer executable code, where the code when executed by a processor causes the processor to implement any of aspects 1 to 28.

What is claimed is:

1. An apparatus for wireless communication at a user equipment (UE), comprising:
 a memory; and
 at least one processor coupled to the memory and configured to:
  receive, from a network entity, control information scheduling a downlink transmission and indicating a first feedback resource for a first decoding scheme of the UE and a second feedback resource for a second decoding scheme of the UE;
  transmit, to the network entity, a first conditional trigger associated with the first decoding scheme, wherein decoding the downlink transmission using at least one of the first decoding scheme or the second decoding scheme comprises decoding the downlink transmission using the first decoding scheme if one or more environmental conditions satisfies the first conditional trigger;
  receive, from the network entity, the downlink transmission;
  decode the downlink transmission using at least one of the first decoding scheme or the second decoding scheme; and
  transmit, to the network entity, a first acknowledgement/negative acknowledgement (ACK/NACK) response based on the decoded downlink transmission using the first feedback resource if decoding the downlink transmission using the first decoding scheme or using the second feedback resource if decoding the downlink transmission using the second decoding scheme.

2. The apparatus of claim 1, further comprising a transceiver coupled to the at least one processor, wherein the at least one processor coupled to the memory is further configured to transmit, to the network entity, timing information including a first minimum K1 value associated with the first decoding scheme and a second minimum K1 value associated with the second decoding scheme.

3. The apparatus of claim 1, wherein the at least one processor coupled to the memory is further configured to transmit, to the network entity, an indication that the UE supports receiving a plurality of feedback resources for the downlink transmission.

4. The apparatus of claim 1, wherein the at least one processor coupled to the memory is further configured to receive, from the network entity, a plurality of K1 values, wherein the control information scheduling the downlink transmission indicates at least two K1 values from the plurality of K1 values.

5. The apparatus of claim 1, wherein the control information comprises downlink control information (DCI) having a plurality of fields or a plurality of sub-fields indicating the first feedback resource and the second feedback resource.

6. An apparatus for wireless communication at a user equipment (UE), comprising:
 a memory; and
 at least one processor coupled to the memory and configured to:
  receive, from a network entity, control information scheduling a downlink transmission and indicating a first feedback resource for a first decoding scheme of the UE and a second feedback resource for a second decoding scheme of the UE;
  receive, from the network entity, the downlink transmission;
  decode the downlink transmission using at least one of the first decoding scheme or the second decoding scheme; and
  transmit, to the network entity, an indicator that the first ACK/NACK response using the second feedback resource is pending using the first feedback resource;
  transmit, to the network entity, a first acknowledgement/negative acknowledgement (ACK/NACK) response based on the decoded downlink transmission using the first feedback resource if decoding the downlink transmission using the first decoding scheme or using the second feedback resource if decoding the downlink transmission using the second decoding scheme.

7. The apparatus of claim 6, wherein the indicator comprises a NACK.

8. The apparatus of claim 6,
wherein the first ACK/NACK response comprises an ACK/NACK indicator for each codebook (CB) of a codebook group (CBG) of the downlink transmission,
wherein the indicator that the first ACK/NACK response is pending comprises at least one bit of a second ACK/NACK response transmitted to the network entity using the first feedback resource, and
wherein the second ACK/NACK response is transmitted using the first feedback resource before the first ACK/NACK response is transmitted using the second feedback resource.

9. The apparatus of claim 6,
wherein the first ACK/NACK response comprises an ACK/NACK indicator for a transport block (TB) of the downlink transmission,
wherein the indicator that the first ACK/NACK response is pending comprises at least one bit of a second ACK/NACK response transmitted to the network entity using the first feedback resource, and
wherein the second ACK/NACK response is transmitted using the first feedback resource before the first ACK/NACK response is transmitted using the second feedback resource.

10. The apparatus of claim 8, wherein the indicator is based on a first hybrid automatic repeat request (HARQ) codebook associated with a plurality of feedback resources, the first HARQ codebook being different than a second HARQ codebook associated with a single feedback resource.

11. The apparatus of claim 10, wherein the at least one processor coupled to the memory is further configured to generate a multiplexed ACK/NACK response by multiplexing the first ACK/NACK response or the second ACK/NACK response based on the first HARQ codebook and a third ACK/NACK response based on the second HARQ codebook, wherein transmitting, to the network entity, the first ACK/NACK response comprises transmitting the multiplexed ACK/NACK response.

12. The apparatus of claim 8, wherein the at least one processor coupled to the memory is further configured to:
receive, from the network entity, a second downlink transmission having a single feedback resource;
decode the second downlink transmission using the first decoding scheme; and
transmit, to the network entity, a third ACK/NACK response for the decoded second downlink transmission using the single feedback resource.

13. The apparatus of claim 1, wherein the at least one processor coupled to the memory is further configured to retransmit, to the network entity, the first ACK/NACK response using the second feedback resource after transmitting the first ACK/NACK response using the first feedback resource.

14. The apparatus of claim 1, wherein the at least one processor coupled to the memory is further configured to:
receive, from the network entity, a scheduling DCI comprising a counter of ACK/NACK responses; and
determine whether to retransmit, to the network entity, the first ACK/NACK response using the second feedback resource after transmitting the first ACK/NACK response using the first feedback resource if the counter of ACK/NACK responses does not meet or exceed a threshold value.

15. The apparatus of claim 1, wherein the at least one processor coupled to the memory is further configured to:
receive, from the network entity, an additional control information after transmitting, to the network entity, the first ACK/NACK response using the first feedback resource, the additional control information scheduling at least one of an additional downlink transmission or a retransmission of the downlink transmission; and
skip retransmission, to the network entity, of the first ACK/NACK response using the second feedback resource in response to receiving, from the network entity, the additional control information.

16. The apparatus of claim 1, wherein the control information comprises multiple downlink assignment index (DAI) counter values.

17. An apparatus for wireless communication at a network entity, comprising:
a memory; and
at least one processor coupled to the memory and configured to:
receive timing information for a user equipment (UE) indicating a first minimum K1 value associated with a first decoding scheme and a second minimum K1 value associated with a second decoding scheme;
transmit control information for a downlink transmission of the UE indicating a first feedback resource based on the first minimum K1 value and a second feedback resource based on the second minimum K1 value;
transmit the downlink transmission of the UE;
receive an ACK/NACK response for the downlink transmission using the first feedback resource or the second feedback resource; and
retransmit the downlink transmission of the UE after receiving the ACK/NACK response for the downlink transmission using the first feedback resource in response to determining that the ACK/NACK response comprises a NACK, wherein the first feedback resource is temporally before the second feedback resource.

18. The apparatus of claim 17, wherein the at least one processor coupled to the memory is further configured to:
receive information that the UE supports receiving multiple feedback resources; and
enable indication of the first feedback resource and the second feedback resource for the UE.

19. The apparatus of claim 17, further comprising a transceiver coupled to the at least one processor, wherein indicating the first feedback resource and the second feedback resource comprises indicating at least a first K1 value via one or more of a radio resource control (RRC) or a scheduling downlink control information (DCI).

20. The apparatus of claim 19, wherein the scheduling DCI comprises a first selection of the first K1 value from a first set of K1 values transmitted to the UE in a first RRC message.

21. The apparatus of claim 20, wherein the scheduling DCI comprises a second selection of a second K1 value from the first set of K1 values.

22. The apparatus of claim 17, wherein the at least one processor coupled to the memory is further configured to determine whether the ACK/NACK response will be received using the first feedback resource or the second feedback resource based on whether a conditional trigger is satisfied.

23. The apparatus of claim 17, wherein the at least one processor coupled to the memory is further configured to transmit a DCI for the UE comprising an incremented counter of ACK/NACK responses in response to receiving the ACK/NACK response.

24. The apparatus of claim 17, wherein the at least one processor coupled to the memory is further configured to transmit an additional downlink transmission after receiving the ACK/NACK response for the downlink transmission using the first feedback resource in response to determining that the ACK/NACK response comprises an ACK, wherein the first feedback resource is temporally before the second feedback resource.

25. The apparatus of claim 17, wherein the at least one processor coupled to the memory is further configured to transmit, to the UE, a DCI comprising a current downlink assignment index (cDAI) and a total downlink assignment index (tDAI).

26. The apparatus of claim 17, wherein the at least one processor coupled to the memory is further configured to schedule an additional downlink transmission for the UE having a third feedback resource and a fourth feedback resource, the third feedback resource being temporally before to the second feedback resource for the downlink transmission.

27. A method of wireless communication at a user equipment (UE), comprising:
  receiving, from a network entity, control information scheduling a downlink transmission and indicating a first feedback resource for a first decoding scheme of the UE and a second feedback resource for a second decoding scheme of the UE;
  transmitting, to the network entity, a first conditional trigger associated with the first decoding scheme, wherein decoding the downlink transmission using at least one of the first decoding scheme or the second decoding scheme comprises decoding the downlink transmission using the first decoding scheme if one or more environmental conditions satisfies the first conditional trigger;
  receiving, from the network entity, the downlink transmission;
  decoding the downlink transmission using at least one of the first decoding scheme or the second decoding scheme; and
  transmitting, to the network entity, a first ACK/NACK response based on the decoded downlink transmission using the first feedback resource if decoding the downlink transmission using the first decoding scheme or using the second feedback resource if decoding the downlink transmission using the second decoding scheme.

28. A method of wireless communication at a network entity, comprising:
  receiving timing information for a user equipment (UE) indicating a first minimum K1 value associated with a first decoding scheme and a second minimum K1 value associated with a second decoding scheme;
  transmitting control information for a downlink transmission of the UE indicating a first feedback resource based on the first minimum K1 value and a second feedback resource based on the second minimum K1 value;
  transmitting the downlink transmission of the UE;
  receiving an ACK/NACK response for the downlink transmission using the first feedback resource or the second feedback resource; and
  retransmit the downlink transmission of the UE after receiving the ACK/NACK response for the downlink transmission using the first feedback resource in response to determining that the ACK/NACK response comprises a NACK, wherein the first feedback resource is temporally before the second feedback resource.

* * * * *